United States Patent
Park et al.

(10) Patent No.: US 9,743,415 B2
(45) Date of Patent: Aug. 22, 2017

(54) METHOD OF OUTPUTTING CONTENT THROUGH NETWORK, AND APPARATUS AND SYSTEM FOR PERFORMING THE METHOD

(71) Applicant: SAMSUNG ELECTRONICS CO., LTD., Suwon-si, Gyeonggi-do (KR)

(72) Inventors: Jeong-jin Park, Seongman-si (KR); Yong-chan Kwon, Anyang-si (KR); Kasey Kim, Anyang-si (KR); Min-jae Kim, Suwon-si (KR); Sang-ho Kim, Suwon-si (KR); Yoon-bum No, Goyang-si (KR); Woo-yeon Chang, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/970,664

(22) Filed: Dec. 16, 2015

(65) Prior Publication Data
US 2016/0219575 A1 Jul. 28, 2016

Related U.S. Application Data

(60) Provisional application No. 62/106,985, filed on Jan. 23, 2015.

(30) Foreign Application Priority Data

Aug. 3, 2015 (KR) ........................ 10-2015-0109575

(51) Int. Cl.
*H04W 72/04* (2009.01)
*G06F 3/12* (2006.01)
(Continued)

(52) U.S. Cl.
CPC ........ *H04W 72/048* (2013.01); *G06F 3/1222* (2013.01); *G06F 3/1238* (2013.01);
(Continued)

(58) Field of Classification Search
CPC .... H04W 72/048; H04W 12/06; H04W 4/008
See application file for complete search history.

(56) References Cited

U.S. PATENT DOCUMENTS 6,421,716 B1 * 7/2002 Eldridge ........... G06F 17/30011
455/433
6,751,732 B2 * 6/2004 Strobel ................. G06F 21/608
380/255

(Continued)

FOREIGN PATENT DOCUMENTS

DK WO 2015059524 A1 * 4/2015 ........... G06F 3/1204
JP 2010-16537 1/2010
(Continued)

OTHER PUBLICATIONS

Korean Office Action dated Aug. 23, 2016 in corresponding Korean Patent Application No. 10-2015-0109575.
(Continued)

*Primary Examiner* — Nathan Mitchell
(74) *Attorney, Agent, or Firm* — Staas & Halsey LLP

(57) ABSTRACT

A system for outputting content through a network includes: a first server configured to store content received in an account of a user; and a second server configured to obtain the content from the first server, convert the content into output data, and transmit the output data to an output device, according to an output request received from a mobile terminal of the user, wherein when the second server receives a request to check the content from the mobile
(Continued)

terminal, the second server provides a preview of the content, instead of an original file of the content, to the mobile terminal.

18 Claims, 43 Drawing Sheets

(51) Int. Cl.
*H04W 4/00* (2009.01)
*H04W 12/06* (2009.01)
(52) U.S. Cl.
CPC .......... *G06F 3/1292* (2013.01); *H04W 4/008* (2013.01); *H04W 12/06* (2013.01)

(56) References Cited

U.S. PATENT DOCUMENTS

| | | | | |
|---|---|---|---|---|
| 6,922,258 | B2* | 7/2005 | Pineau | G06F 3/1292 358/1.15 |
| 8,346,903 | B2* | 1/2013 | Shepherd | G06F 3/1226 455/456.6 |
| 8,347,379 | B2* | 1/2013 | Tsuzuki | G06F 21/608 358/1.14 |
| 8,402,277 | B2* | 3/2013 | Wang | H04L 63/062 380/277 |
| 8,711,416 | B1 | 4/2014 | Byer et al. | |
| 8,826,126 | B1* | 9/2014 | Toscano | G06F 17/212 358/1.15 |
| 8,976,389 | B2* | 3/2015 | Sako | G06F 3/1204 358/1.1 |
| 2001/0034774 | A1* | 10/2001 | Watanabe | H04M 3/5322 709/217 |
| 2002/0042263 | A1* | 4/2002 | Ishikawa | G06Q 30/0603 455/412.1 |
| 2002/0147646 | A1* | 10/2002 | Ogura | G06Q 30/02 705/14.39 |
| 2003/0002073 | A1* | 1/2003 | Berkema | G06F 3/1205 358/1.15 |
| 2003/0054766 | A1* | 3/2003 | Clough | G06F 21/608 455/41.1 |
| 2004/0107257 | A1 | 6/2004 | Inoue et al. | |
| 2004/0184072 | A1* | 9/2004 | Jacobsen | G06K 15/00 358/1.15 |
| 2004/0203358 | A1* | 10/2004 | Anderson | G06F 3/1204 455/41.1 |
| 2004/0253990 | A1* | 12/2004 | McCoog | H04N 1/00185 455/566 |
| 2005/0026593 | A1* | 2/2005 | Anderson | G06F 3/1222 455/410 |
| 2005/0099653 | A1* | 5/2005 | Kawaoka | H04N 1/00209 358/1.15 |
| 2005/0266839 | A1* | 12/2005 | Paul | H04M 1/72555 455/418 |
| 2007/0091329 | A1 | 4/2007 | Zhang | |
| 2007/0133567 | A1* | 6/2007 | West | H04L 41/0803 370/395.54 |
| 2007/0207755 | A1* | 9/2007 | Julia | H04N 1/00127 455/217 |
| 2009/0037812 | A1 | 2/2009 | Asai | |
| 2009/0066985 | A1* | 3/2009 | Ferlitsch | G06Q 30/04 358/1.13 |
| 2012/0044523 | A1 | 2/2012 | Kim | |
| 2012/0250065 | A1* | 10/2012 | Partridge | G06F 21/608 358/1.14 |
| 2012/0307281 | A1* | 12/2012 | Sweet | G06F 21/608 358/1.14 |
| 2013/0083337 | A1* | 4/2013 | Tecu | G06F 3/1204 358/1.13 |
| 2013/0182284 | A1* | 7/2013 | Oya | H04W 4/12 358/1.15 |
| 2013/0242336 | A1 | 9/2013 | Koshigaya | |
| 2013/0335772 | A1* | 12/2013 | Waller | H04N 1/00244 358/1.15 |
| 2014/0253939 | A1 | 9/2014 | Hashimoto | |
| 2014/0355047 | A1 | 12/2014 | Lee et al. | |
| 2015/0199161 | A1* | 7/2015 | Gutnik | G06F 3/1296 358/1.15 |
| 2015/0212765 | A1* | 7/2015 | Uchida | G06F 3/1208 358/1.15 |
| 2016/0275906 | A1* | 9/2016 | Scott | G09G 5/006 |

FOREIGN PATENT DOCUMENTS

| | | |
|---|---|---|
| JP | 2012-118788 | 6/2012 |
| KR | 10-2006-0124872 | 12/2006 |
| KR | 10-2014-0142094 | 12/2014 |

OTHER PUBLICATIONS

International Search Report dated May 18, 2016 in corresponding International Patent Application No. PCT/KR2016/000578.
Extended European Search Report dated Jun. 10, 2016 in corresponding European Patent Application No. 16152149.7.
Korean Office Action dated Mar. 31, 2017 in corresponding Korean Patent Application No. 10-2015-0109575.

* cited by examiner

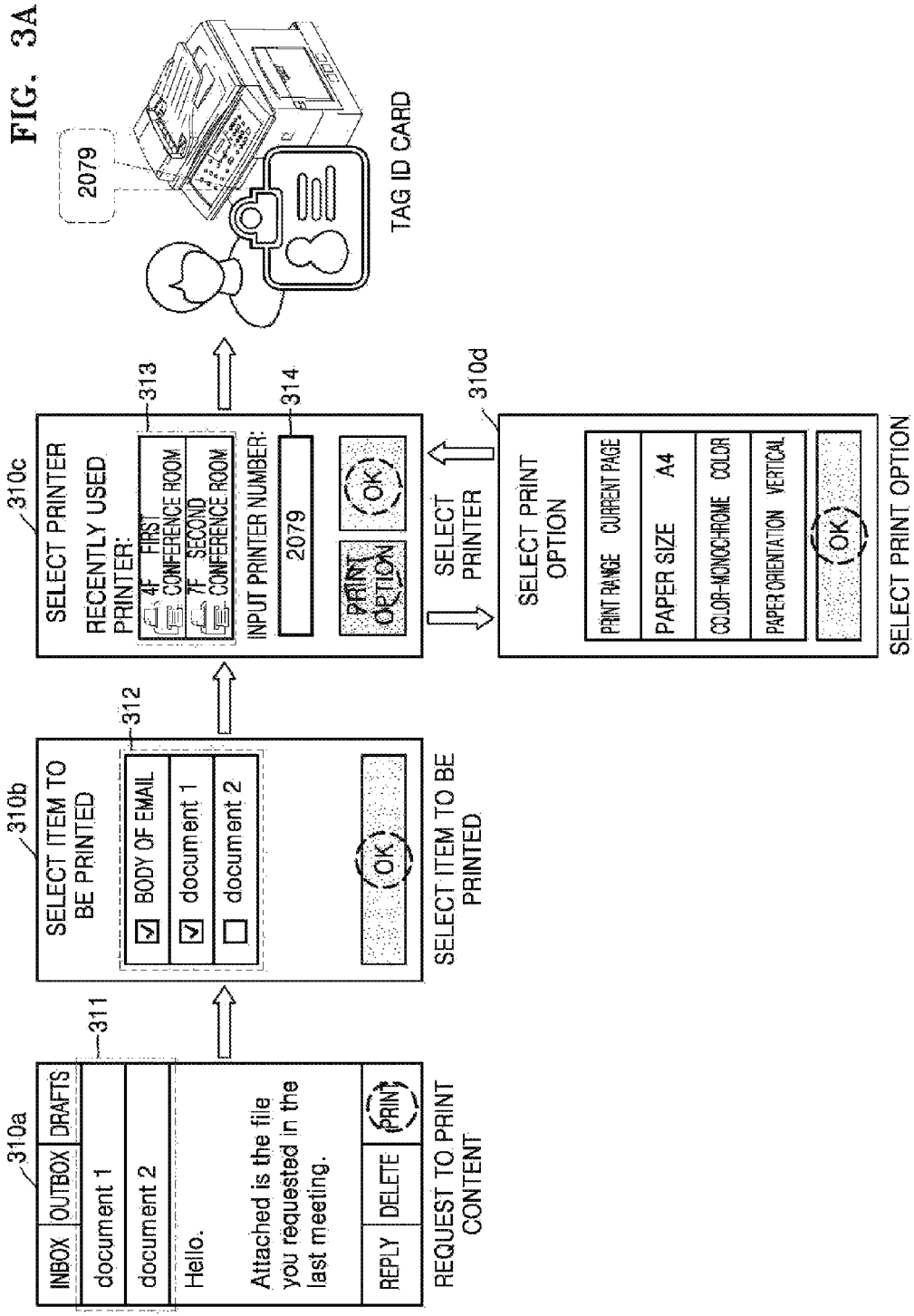

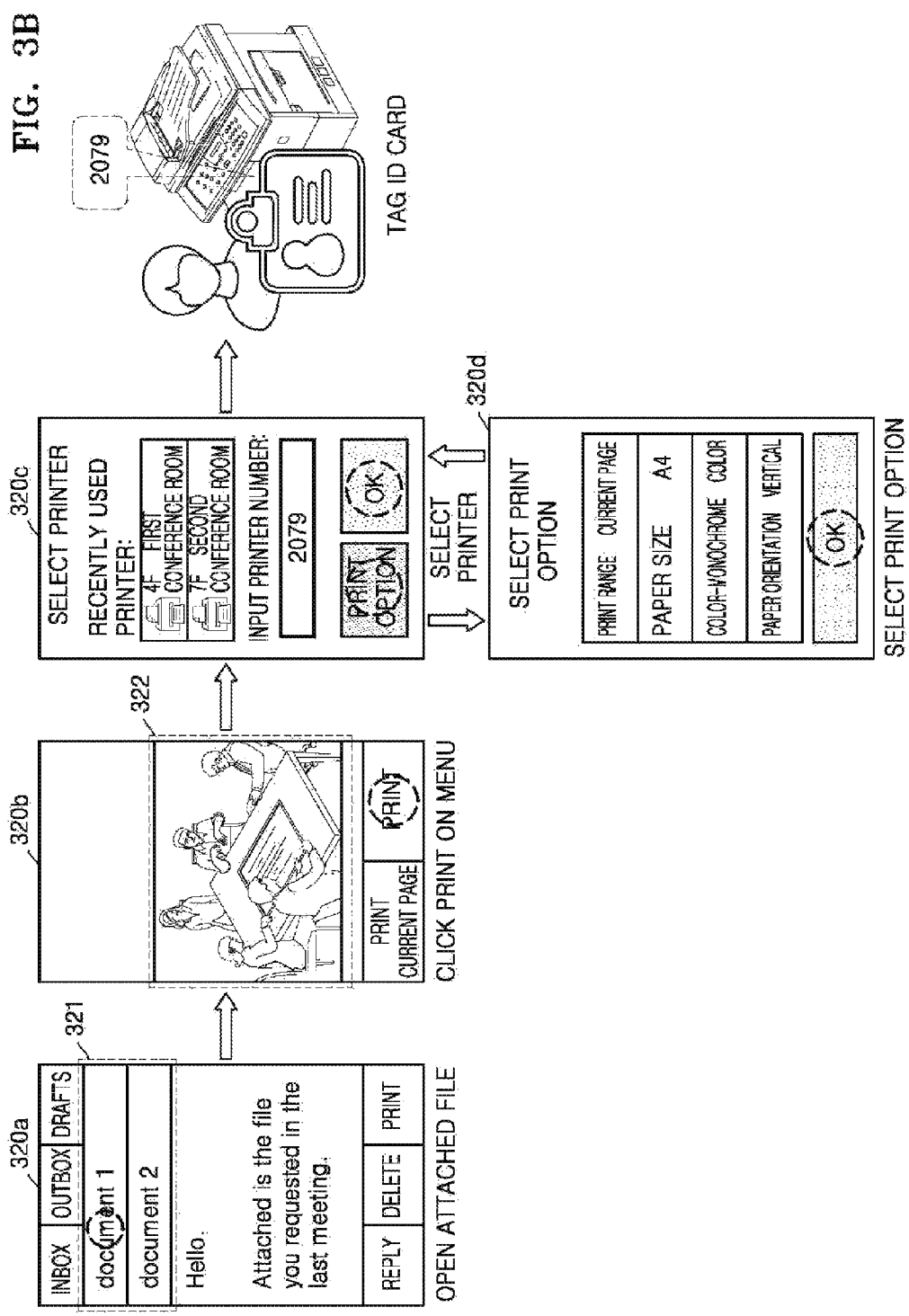

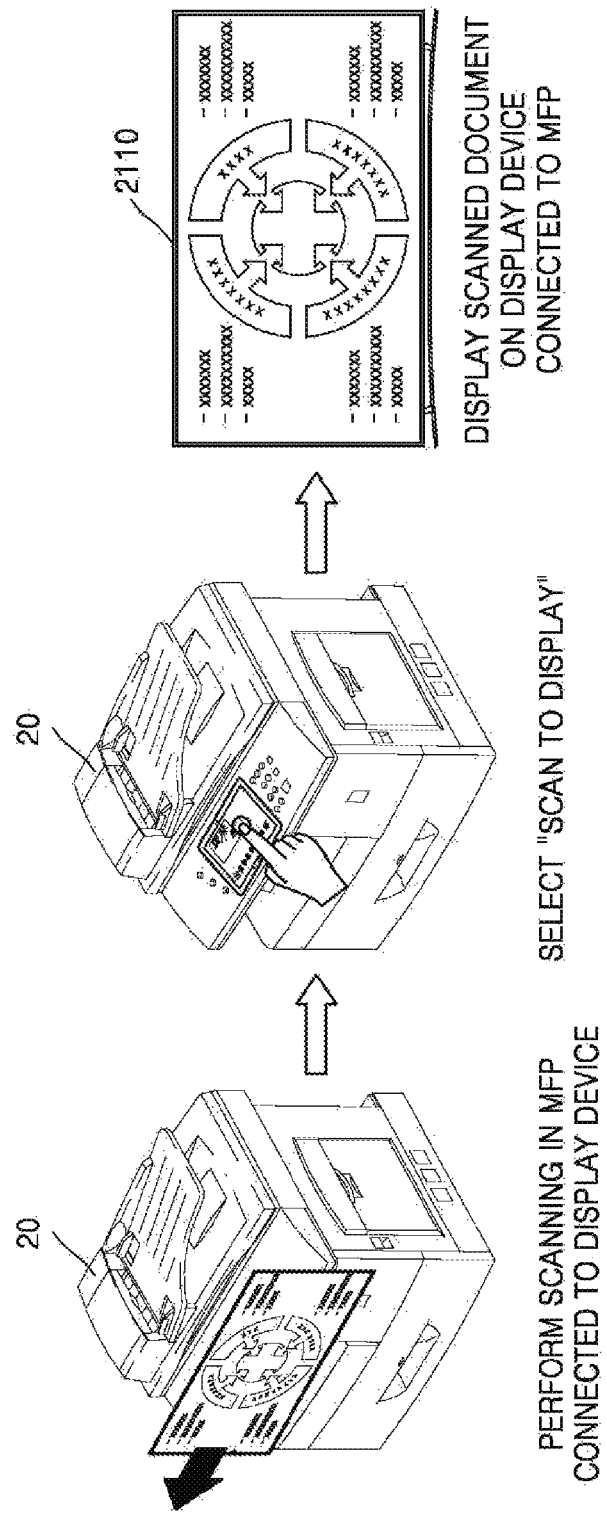

METHOD OF OUTPUTTING CONTENT THROUGH NETWORK, AND APPARATUS AND SYSTEM FOR PERFORMING THE METHOD

CROSS-REFERENCE TO RELATED APPLICATIONS

This application claims the benefit of U.S. Provisional Patent Application No. 62/106,985, filed on Jan. 23, 2015, in the U.S. Patent and Trademark Office and Korean Patent Application No. 10-2015-0109575, filed on Aug. 3, 2015, in the Korean Intellectual Property Office, the disclosures of which are incorporated herein in their entirety by reference.

BACKGROUND

1. Field

The present disclosure relates to methods of outputting content through networks, and apparatuses and systems for performing the methods.

2. Description of the Related Art

At present, most companies build network systems in order to efficiently carry out tasks. A network system installed in a company may allow content for carrying out a task to be output. For example, content may be printed by a printer by being transmitted to the printer through a network, or content may be displayed on a screen by being transmitted to a display device, such as a television (TV) or monitor, through a network.

In a network system installed in a company, security is very important in order to prevent confidential information of the company from being leaked. Accordingly, there is an increasing demand for a method of printing content or displaying content on a screen in a network environment with increased security.

SUMMARY

Provided are methods, systems, and apparatuses for outputting content by printing or displaying the content in a network environment with increased security.

Additional aspects will be set forth in part in the description which follows and, in part, will be apparent from the description, or may be learned by practice of the presented exemplary embodiments.

According to an aspect of an exemplary embodiment, a system for outputting content through a network includes: a first server configured to store content received in an account of a user; and a second server configured to obtain the content from the first server, convert the content into output data, and transmit the output data to an output device, according to an output request received from a mobile terminal of the user, wherein when the second server receives a request to check the content from the mobile terminal, the second server provides a preview of the content, instead of an original file of the content, to the mobile terminal.

In this case, the second server may include: a mobile relay server configured to provide the preview of the content stored in the first server to the mobile terminal; and a printing server configured to render the content, apply security to the rendered content, and convert the secured content into the output data.

Alternatively, the second server may receive identification information of the output device from the mobile terminal and transmit the output data to the output device corresponding to the received identification information.

Also, in this case, the output device may display the identification information of the output device on at least one of a display panel provided in the output device and a display device connected to the output device.

Alternatively, in this case, the second server may convert the obtained content into the output data according to a type of the output device corresponding to the identification information.

The second server may receive user information from the mobile terminal and transmits the user information to the output device, and when the user succeeds in user authentication by using the received user information, the output device may output the output data.

In this case, when the mobile terminal is located within a predetermined distance from the output device, the user authentication may be performed through near-field communication (NFC).

When the second server receives a request to perform print spooling from the mobile terminal, the second server may convert the content into content in a preset format and stores the content in the preset format as a print job, and when the second server receives a request to print the stored print job from the mobile terminal, the second server may convert the content in the preset format into the output data and transmits the output data to the output device.

Alternatively, when the second server receives a request to check an output result from the mobile terminal, the second server may transmit to the mobile terminal a result obtained after handling the output request from a point of time when the request has been received to a preset point of time.

According to an aspect of another exemplary embodiment, a method of outputting content through a network includes: receiving content in an account of a user; when a request to check the content is received from a mobile terminal of the user, providing a preview of the content to the mobile terminal; and when a request to output the content is received from the mobile terminal, converting the content into output data and transmitting the output data to an output device.

In this case, the transmitting of the output data to the output device may include determining an output device corresponding to identification information received from the mobile terminal and transmitting the output data to the determined output device.

Also, in this case, the identification information may be displayed on at least one of a display panel provided in the output device and a display device connected to the output device.

Alternatively, in this case, the transmitting of the output data to the output device may include converting the content into the output data according to a type of the output device corresponding to the identification information and transmitting the output data to the output device.

The method may further include: receiving user information from the mobile terminal and transmitting the user information to the output device; and when the user succeeds in user authentication by using the received user information, outputting the output data, wherein the outputting is performed by the output device.

Also, in this case, when the mobile terminal is located within a predetermined distance from the output device, the user authentication may be performed through near-field communication (NFC).

The transmitting of the output data to the output device may include: when a request to perform print spooling is received from the mobile terminal, converting the content into content in a preset format and storing the content in the preset format as a print job; and when a request to print the stored print job is received from the mobile terminal, converting the content in the preset format into the output data and transmitting the output data to the output device.

Alternatively, the method may further include, when a request to check an output result is received from the mobile terminal, transmitting to the mobile terminal a result obtained after handling the output request from a point of time when the request has been received to a preset point of time.

According to an aspect of an exemplary embodiment, a server for outputting content through a network may include at least one memory to store data, and at least one hardware-based processor configured to obtain content from another server, convert the obtained content into output data, and transmit the output data to an output device according to an output request received from a mobile terminal of the user, wherein when the server receives a request to review the content from the mobile terminal, the server provides a preview of the content, instead of an original file of the content, to the mobile terminal, the preview of the content having a smaller size than a size of the original file.

According to an aspect of an exemplary embodiment, a system for outputting content through a network may include an output device for outputting content, the output device being configured to transmit to a print representative destination address, in response to a user request, an email having attached content, wherein the transmitted email includes a designated management identification code specifically assigned to the output device, an email server to receive the email sent by the output device, to check that a destination address of the email is the print representative destination address, and to transmit the content attached to the email and the designated management identification code specifically assigned to the output device an output server to receive the content attached to the email and the designated management identification code from the email server, to render the content in a displayable or printable format, to generate a release code for outputting the content, and to transmit the release code to the email server, wherein the email server is configured to receive the release code from the output server and to transmit to the output device a reply email including the release code, and wherein the output device is configured to receive the release code and to provide the release code to the output server, which transmits the content rendered by the output server to the output device when the output server determines that the release code received from the output device is identical to the release code generated by the output server.

According to an aspect of an exemplary embodiment, a method for outputting content through a network may include receiving, on an output device, an input of a designated management identification code specifically assigned to the output device and a request to transmit an email having attached content to a print representative destination address, transmitting, to an email server, the email having the attached content and the designated management identification code, receiving, by the email server, the email sent by the output device, checking that a destination address of the email is the print representative destination address, transmitting, to an output server, the content attached to the email and the designated management identification code specifically assigned to the output device, receiving, by the output server, the content attached to the email and the designated management identification code, rendering the content in a displayable or printable format, generating a release code for outputting the content and to transmitting the release code to the email server, receiving, by the email server, the release code from the output server and transmitting a reply email including the release code to the output device and receiving, by the output device, the release code and providing the release code to the output server, which transmits the content rendered by the output server to the output device when it is determined that the release code received from the output device is identical to the release code generated by the output server.

According to an aspect of an exemplary embodiment, a system for outputting content through a network may include a mobile terminal to receive a request to output content from a user and to transmit the request to output content, content identification identifying the content to be output, user information, and device identification information, a first server to receive the content identification identifying the content to be output, the user information, and the device identification information from the mobile terminal and to transmit the content identification and request a content file corresponding to the content identification, and a second server to store content received in an account of the user and to transmit the content file corresponding to the content identification to the first server, wherein the first server is configured to obtain the content file from the second server, convert the content file into output data, and transmit the output data for output by an output device, according to the request to output content received from the mobile terminal.

BRIEF DESCRIPTION OF THE DRAWINGS

These and/or other aspects will become apparent and more readily appreciated from the following description of the exemplary embodiments, taken in conjunction with the accompanying drawings in which:

FIGS. 3A and 3B are views of user interface (UI) screens displayed on a screen of a mobile terminal when content attached to a received email is printed in a security network system, according to an exemplary embodiment;

FIG. 22B is a view for explaining a method performed by a display device connected to an image forming apparatus to display content scanned by the image forming apparatus, according to an exemplary embodiment;

DETAILED DESCRIPTION

The inventive concept now will be described more fully hereinafter with reference to the accompanying drawings, in which exemplary embodiments are shown. The following description and the attached drawings are provided for better understanding of the inventive concept, and descriptions of techniques or structures related to the inventive concept which would be obvious to one of ordinary skill in the art will be omitted.

Although a multi-function printer (MFP) is used in all exemplary embodiments, it will be understood that any other image forming apparatus, such as a printer, a scanner, or a copying machine, may be used.

Also, the term "content" used herein refers to any type of file that may be printed or displayed, such as a document or an image.

As used herein, the term "and/or" includes any and all combinations of one or more of the associated listed items. Expressions such as "at least one of" when preceding a list of elements, modify the entire list of elements and do not modify the individual elements of the list.

Figure 1:
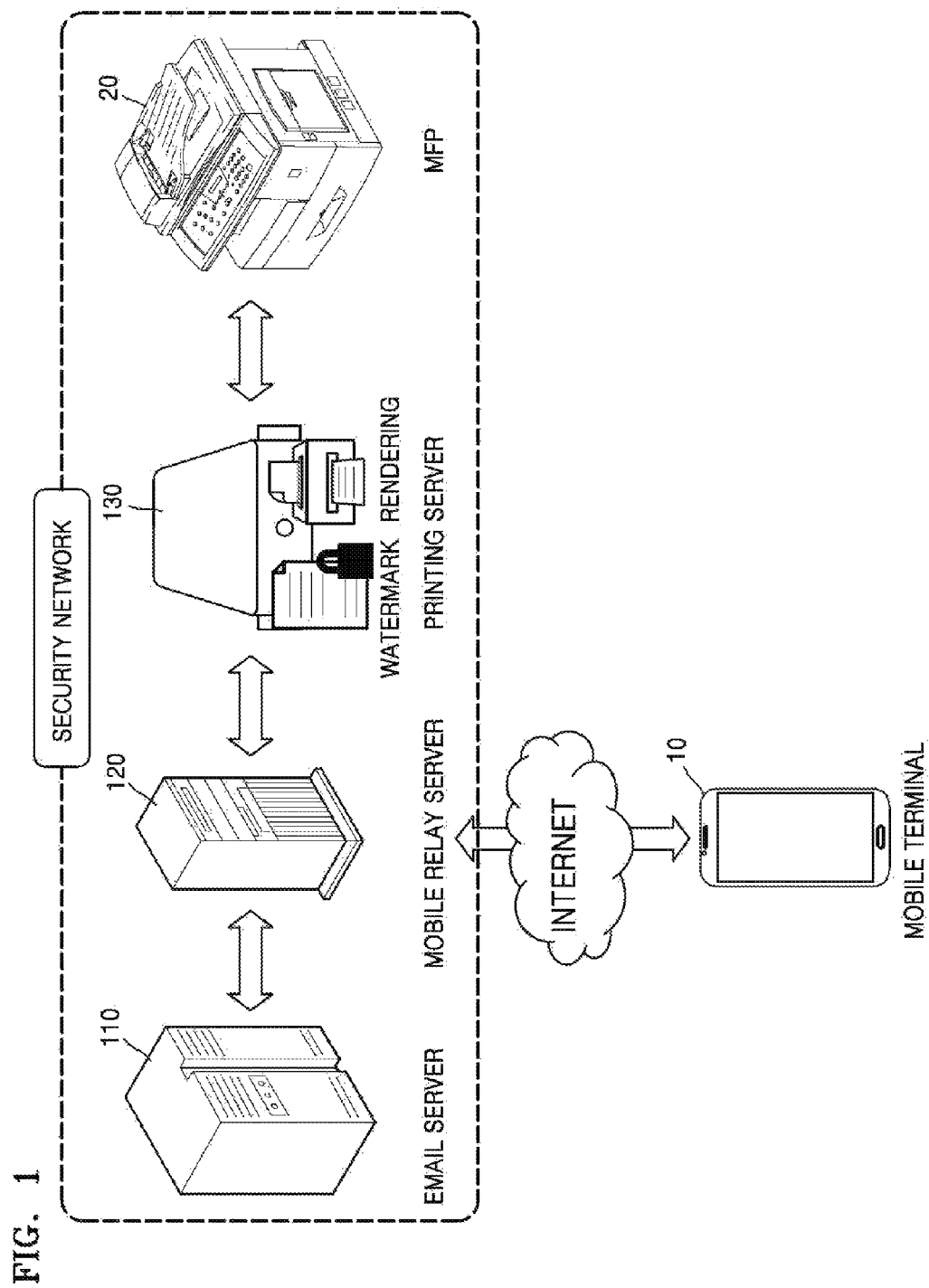
FIG. 1 is a view of a security network system that allows content to be printed, according to an exemplary embodiment.

FIG. 1 is a view of a security network system that allows content to be printed, according to an exemplary embodiment. Referring to FIG. 1, the security network system may include an email server 110, a mobile relay server 120, a printing server 130, and an MFP 20. A mobile terminal 10 may be connected to the mobile relay server 120 through the Internet to access the security network system.

The email server 110 may manage email which is transmitted/received through a user account and, in particular, when content is attached to an email, may store the attached content in a memory of the email server 110.

The mobile relay server 120 relays the mobile terminal 10 to access the email server 110. That is, when the mobile terminal 10 requests a received email list, the mobile relay server 120 may obtain the received email list from the email server 110 and may transmit the received email list to the mobile terminal 10. Also, when the mobile terminal 10 requests to check content attached to a received email, the mobile relay server 120 may obtain as a thumbnail or the like a preview of the content attached to the received email from the email server 110 and may transmit the preview to the mobile terminal 10. In an embodiment the preview comprises a file having a smaller file size than the original file such as a thumbnail, a summary file, a partial view, an abstract, or the like. Accordingly, a user may check the email list and the content attached to the email received in his/her email account by using the mobile terminal 10.

The mobile relay server 120 may request the printing server 130 to print the content stored in the email server 110, that is, the content attached to the received email, according to a request of the mobile terminal 10. When receiving a request to print the content from the mobile relay server 120, the printing server 130 may render the received content into a content in a printable data format, may apply security to the rendered content by attaching a watermark to the rendered content, may transmit the secured content to the MFP 20, and may request to print the secured content.

In this case, it is important that when the mobile terminal 10 requests to check the content attached to the received email and to print the content through the mobile relay server 120, only the preview of the content is provided as a thumbnail or the like to the mobile terminal 10 and an original file of the content is not received by the mobile terminal 10. That is, the content attached to the received email is transmitted among the email server 110, the mobile relay server 120, the printing server 130, and the MFP 20 in the security network system and is not transmitted outside of the security network system. Since the content is prevented from being leaked to the outside, security may be increased.

A detailed process of printing content attached to an email according to a request of the mobile terminal 10 will be explained below with reference to FIGS. 2 through 6.

A physical configuration of each server will be explained. Although the printing server 130 includes only one server in FIG. 1, the printing server 130 may include a server for performing rendering and a server for applying security separately. Also, each of the email server 110 and the mobile relay server 120 may include a plurality of servers for performing detailed functions, and two or more of the email server 110, the mobile relay server 120, and the printing server 130 may be substantially integrated into one physical server.

Figure 2:
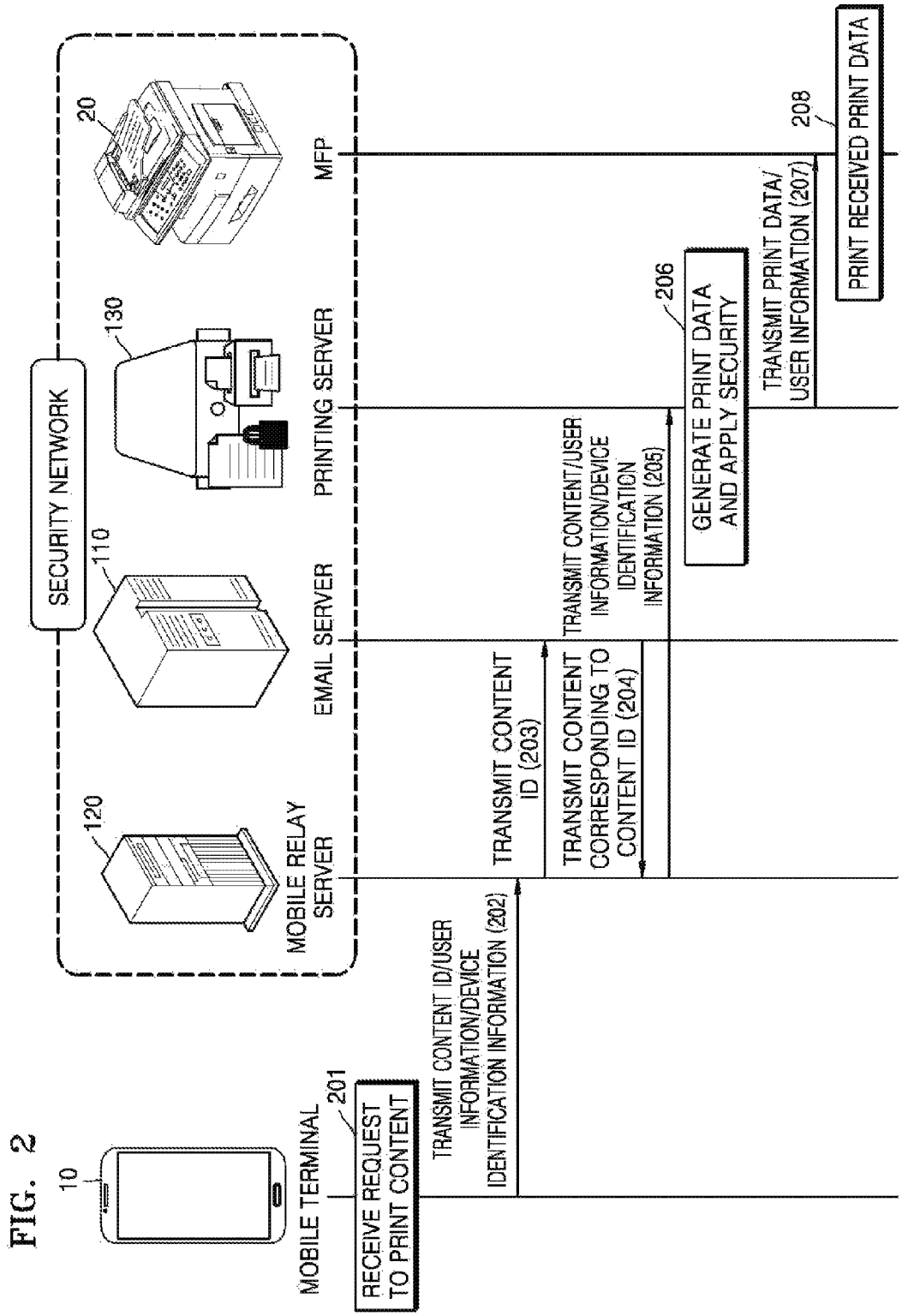
FIG. 2 is a view of a process of printing content attached to a received email in a security network system, according to an exemplary embodiment.

FIG. 2 is a view of a process of printing content attached to a received email in a security network system, according to an exemplary embodiment.

Referring to FIG. 2, in operation 201, the mobile terminal 10 receives a request to print content, e.g., from a user. That is, the mobile terminal 10 receives a request to print content attached to the email received in an account of the user.

A process performed by the user to request to check the content attached to the received email and to print the content through the mobile terminal 10 will now be explained in detail.

When the user requests to check the email received in the account of the user through the mobile terminal 10, the mobile terminal 10 requests a received email list from the mobile relay server 120, and the mobile relay server 120 obtains the received email list from the email server 110 and transmits the received email list to the mobile terminal 10. The mobile terminal 10 displays the received email list on a screen. When the user selects one received email in the received email list displayed on the screen of the mobile terminal 10, content attached to the selected received email may be displayed, and when pieces of content are attached to the received email, a list of the attached pieces of content may also be displayed. In this case, the list of the attached pieces of content is received from the email server 110 through the mobile relay server 120 by the mobile terminal 10, like the received email list.

The user may request to print content on the screen of the mobile terminal 10 on which the list of the pieces of content attached to the received email is displayed. In this case, before the user requests to print the content, the user may request to check the content through the mobile terminal 10. In this case, the mobile terminal 10 may receive a preview of the content stored in the email server 110 as a thumbnail or the like from the mobile relay server 120 and may display the preview of the content on the screen. User interface (UI) screens displayed on the screen of the mobile terminal 10 when the mobile terminal 10 requests to print the content will be explained below with reference to FIGS. 3A and 3B.

Referring back to FIG. 2, in operation 202, the mobile terminal 10 transmits content identification (ID), user information, and device identification information to the mobile relay server 120.

In this case, the term "content ID" refers to an ID of the content requested to be printed in operation 201. For example, the content ID may be a filename of the content, or any other of various types information for identifying the content.

Also, the term "user information" refers to information about the user of the mobile terminal 10. For example, the user information may be any of various information for identifying the user such as a user ID and a password to access an email account of the user. Since the user has logged into the email account in the mobile terminal 10 in order to check the received email, the mobile terminal 10 may transmit information such as an ID and a password of the user who currently logs on as user information to the mobile relay server 120.

The term "device identification information" refers to information for identifying a device for printing the content. For example, a unique management number in the security network system may be assigned to the MFP 20, and may be used as device identification information. In this case, the management number may be set to correspond to a media access control (MAC) address of the MFP 20, and the security network system may identify a device for printing the content by checking the MAC address corresponding to the received management number. Alternatively, the mobile terminal 10 may transmit the MAC address itself of the MFP 20 as device identification information to the mobile relay server 120. MAC addresses of devices that have been previously used may be stored in the mobile terminal 10, a list of the devices having the stored MAC addresses may be displayed on the screen, and when one item in the list is selected, a MAC address of the selected device may be transmitted to the mobile relay server 120.

In operation 203, the mobile relay server 120 transmits the content ID received from the mobile terminal 10 to the email server 110 and requests a content file. In operation 204, the email server 110 transmits the content file corresponding to the content ID received from the mobile relay server 120 to the mobile relay server 120.

In operation 205, the mobile relay server 120 transmits the content file received from the email server 110 along with the user information and the device identification information received from the mobile terminal 10 to the printing server 130 and requests to print the content.

In operation 206, the printing server 130 generates print data from the received content file and applies security to the generated print data. In detail, the printing server 130 generates the print data by rendering the received content file into a content file in a printable format. The printing server 130 may apply security by attaching a watermark to the generated print data.

In operation 207, the printing server 130 transmits the secured print data along with the user information received from the mobile relay server 120 to the MFP 20. In this case, the printing server 130 may transmit the secured print data to the MFP 20 by using the device identification information received from the mobile relay server 120. For example, the printing server 130 may receive the MAC address of the MFP 20 from the mobile relay server 120 and may transmit the secured print data to the received MAC address.

In operation 208, the MFP 20 may print the received print data. In this case, the received user information may be used to perform user authentication for security. For example, the MFP 20 may perform user authentication by requesting to input a password corresponding to the received user information, or when the user brings an ID card in close proximity to the MFP 20, by receiving user information stored in the ID card through near-field communication (NFC) and determining whether the user information of the ID card is the same as the user information received from the printing server 130.

FIGS. 3A and 3B are views of UI screens displayed on a screen of a mobile terminal when content attached to a received email is printed in a security network system, according to an exemplary embodiment.

Referring to FIG. 3A, a list 311 of pieces of content attached to a received email is displayed along with the body of the received email on a first screen 310*a*. When a user selects "print" on the first screen 310*a*, a second screen 310*b* is displayed.

The user may select an item to be printed in a printed item list 312 on the second screen 310*b*. That is, the user may select an item to be printed from among attached files and the body of the email. When "body of email" and "document 1" are selected in the printed item list 312 and then "OK" is selected as shown in FIG. 3A, text included in the body of the email and a document 1 among the attached files are selected as items to be printed, and then a third screen 310*c* is displayed.

The user may select a printer for performing printing on the third screen 310*c*. The user may select a printer from a recently used printer list 313, or may input a management number of a printer to a printer number input field 314. A unique management number may be assigned to each printer in the security network system as described above, and the management number may be set to correspond to identification information of each printer such as a MAC address. Also, in order for the user to easily check a management number of a printer, a management number assigned to each printer may be displayed on an outer surface of the printer. In FIG. 3A, the user has selected a printer by inputting a management number "2079".

After the printer is selected, when "print option" is selected on the third screen 310*c* in order to set a print option, a fourth screen 310*d* is displayed. When the user selects various print option values and selects "OK" on the fourth screen 310*d*, the third screen 310 is displayed again.

When "OK" is selected on the third screen 310*c*, a request to perform printing is transmitted to the printer corresponding to the management number "2079". The printer that has received the request to perform printing may request user authentication in order to perform printing, and the user may attempt the user authentication by tagging an ID card to an NFC tag attached to the printer. Alternatively, the user may attempt the user authentication by inputting a password, or the user authentication may be omitted.

An exemplary embodiment in which a preview of attached content is checked and the attached content is requested to be printed will now be explained with reference to FIG. 3B.

Referring to FIG. 3B, a list 321 of pieces of content attached to a received email is displayed along with the body of the received email on a first screen 320*a*. When a user selects content to be checked in the list 321 of the attached content, a preview 322 of the selected content is displayed on a second screen 320*b*. In this case, although a mobile terminal receives only a preview of the content from a mobile relay server and displays the preview on a screen, the mobile terminal does not receive an original file of the content as described above. The user may check the content through the preview 322 displayed on the second screen 320*b*.

After the user checks the preview 322 of the attached content on the second screen 320*b* and finally selects "print", the user may select a printer on a third screen 320*c* and may set a print option on a fourth screen 320*d*. Next, when the user succeeds in user authentication by tagging his/her ID card through NFC, the printer performs printing. Operations of selecting a printer, setting a print option, and performing user authentication are the same as those described above with reference to FIG. 3A, and thus a detailed explanation thereof will not be repeated here.

Figure 4:
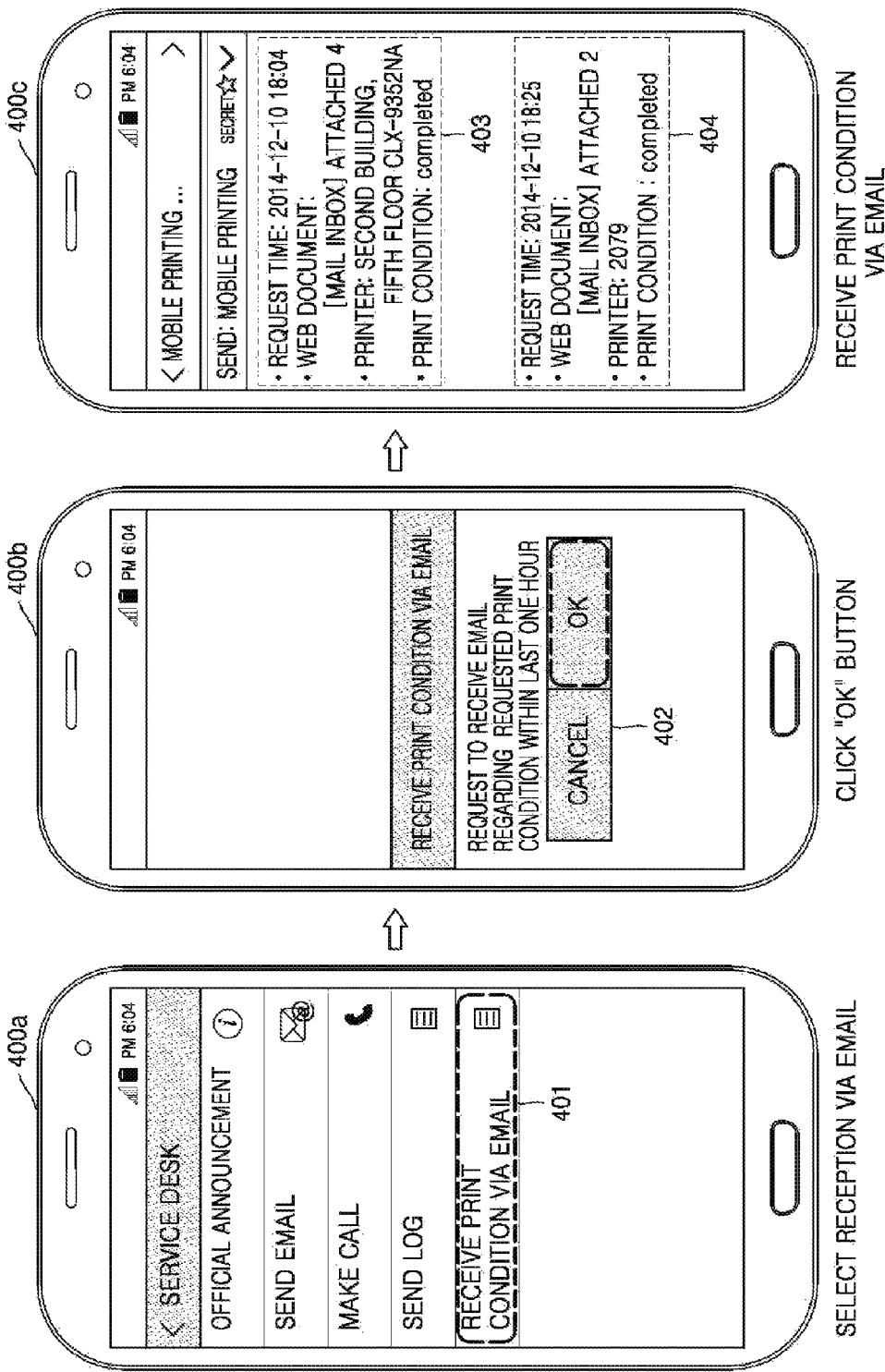
FIG. 4 is a view for explaining a method of receiving, via email, a condition that is a result obtained after handling a print request within the last one hour, according to an exemplary embodiment.

According to an exemplary embodiment, a function to check a result obtained after handling a print request within a predetermined time is provided. FIG. 4 is a view for explaining a method of receiving, via email, a condition that is a result obtained after handling a print request within the last one hour, according to an exemplary embodiment.

Referring to FIG. 4, when a user selects "receive print condition via email" on a first screen 400*a*, a popup 402 for requesting to check whether to receive, via email, a condition that is a result obtained after handling a print request within the last one hour may be displayed on a second screen 400*b*. In this case, one hour is exemplarily set, and may be modified in various ways if necessary.

When "OK" is selected on the popup 402 of the second screen 400*b*, a third screen 400*c* is displayed. Pieces of information 403 and 404 about conditions that are results obtained after handling print requests within the last one hour may be displayed on the third screen 400*c*.

Figure 5:
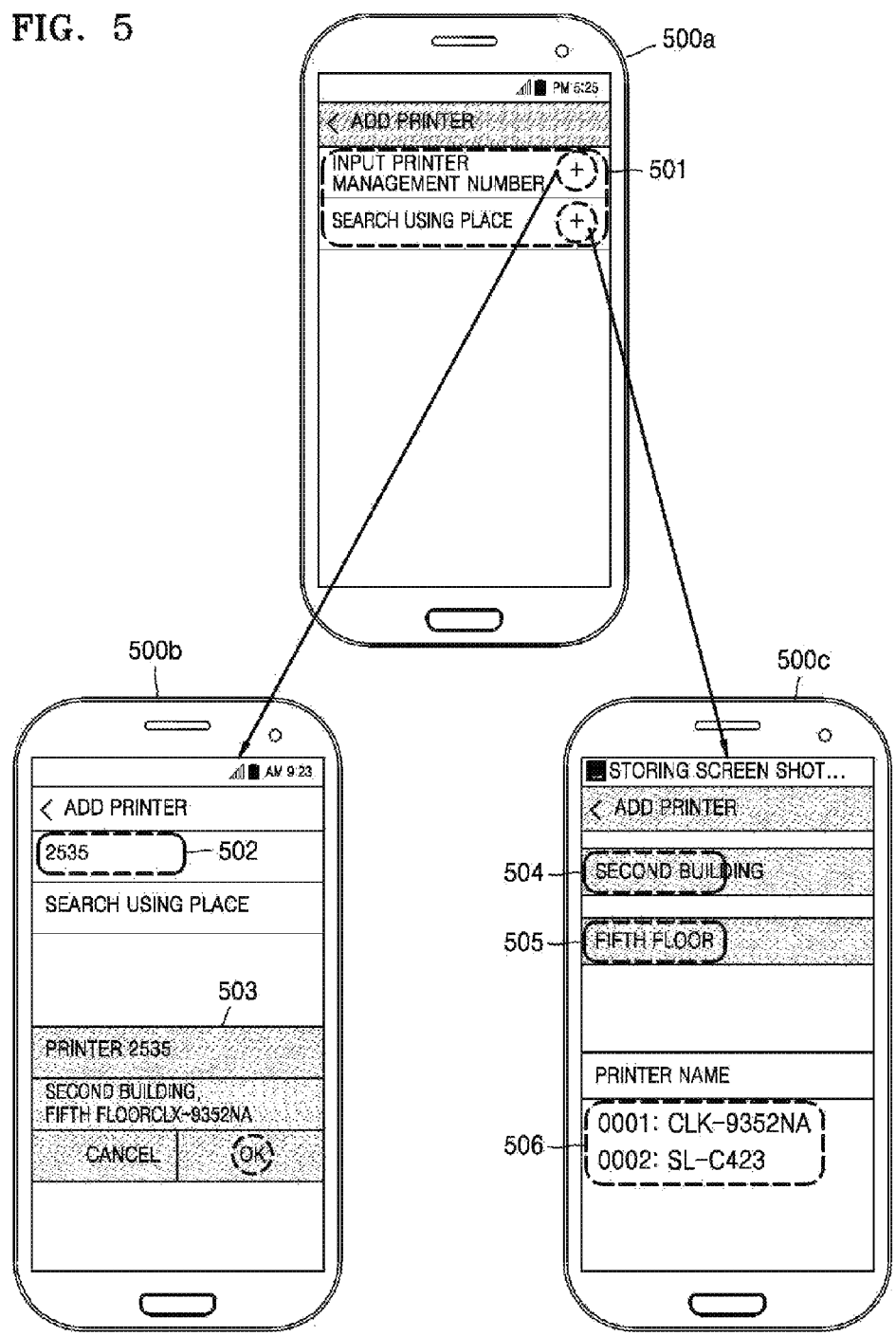
FIG. 5 is a view for explaining a method of adding a printer in a mobile application executed in a mobile terminal, according to an exemplary embodiment.

FIG. 5 is a view for explaining a method of adding a printer in a mobile application executed in a mobile terminal, according to an exemplary embodiment.

Referring to FIG. 5, a list 501 for selecting a method of adding a printer is displayed on a first screen 500*a*. A user may select a method of inputting a management number of a printer or a method of referring a place where a printer is installed.

When the method of inputting a management number of a printer is selected, a second screen 500b is displayed. When a management number of a printer is input to an input field 502 on the second screen 500b, information about the printer corresponding to the input management number is displayed on a popup 503. When the information displayed on the popup 503 is accurate, the printer may be added by selecting "OK".

When the method of referring a place where a printer is installed is selected, a third screen 500c is displayed. When a building and a floor where printers are installed are input to input fields 504 and 505 on the third screen 500c, a list 506 of the printers installed at the input floor of the input building is displayed. The user may select a printer to be added in the list 506.

Figure 6:
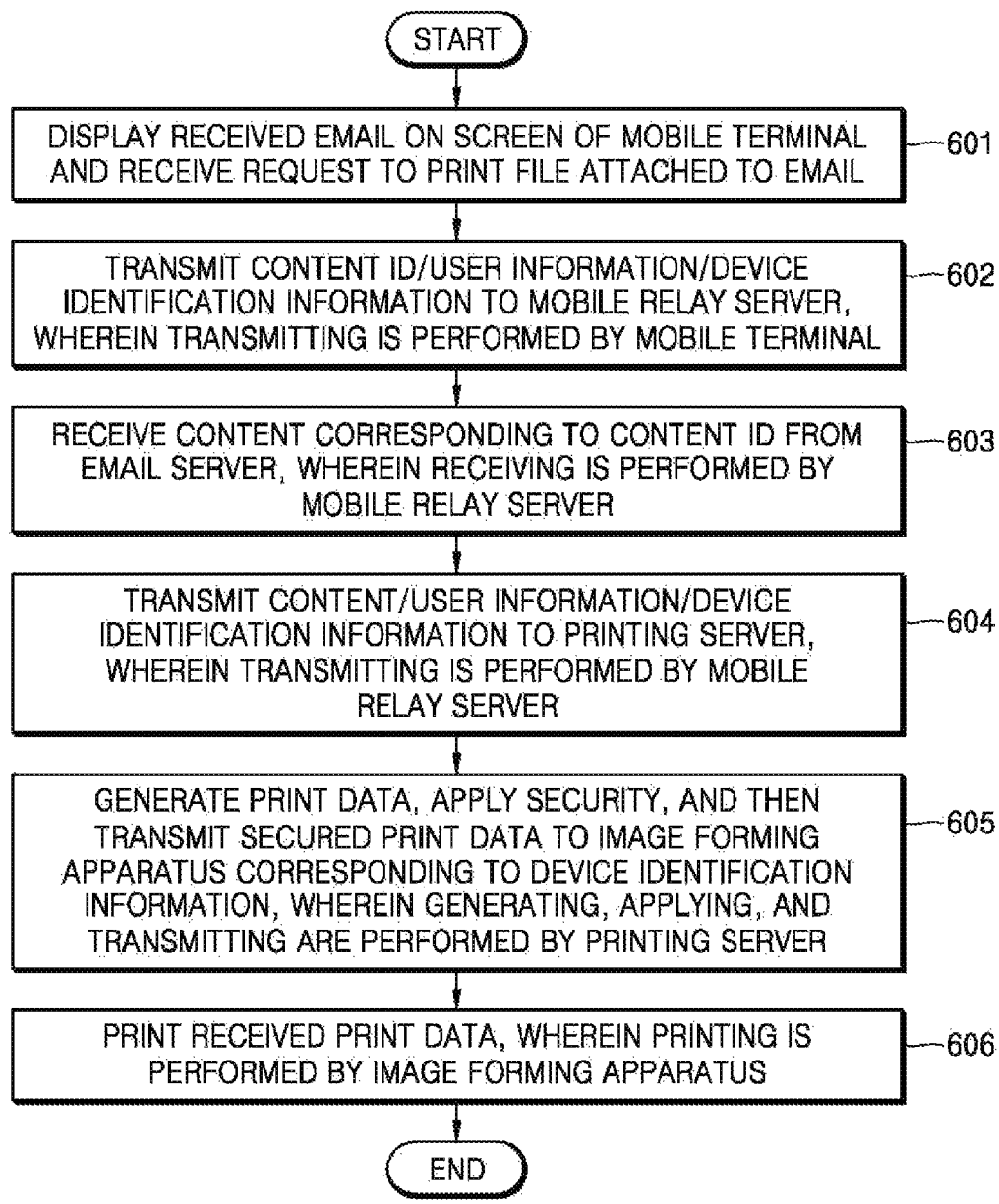
FIG. 6 is a flowchart for explaining a method of printing content attached to a received email in a security network system, according to an exemplary embodiment.

FIG. 6 is a flowchart for explaining a method of printing content attached to a received email in a security network system, according to an exemplary embodiment.

Referring to FIG. 6, in operation 601, an email received by a user is displayed on a screen of a mobile terminal and a request to print a file attached to the email is received from the user. In this case, when the user requests to check contents of the attached file, the mobile terminal may receive a preview of the attached file from a mobile relay server and may display the preview on the screen. However, the mobile terminal does not receive an original file of the attached file.

In operation 602, the mobile terminal transmits content ID, user information, and device identification information to the mobile relay server. In this case, the term "content ID" refers to information for identifying content such as a filename, the term "user information" refers to information for identifying the user of the mobile terminal, and the term "device identification information" refers to information for identifying a device for printing the content. The content ID, the user information, and the device identification information are the same as those described above in operation 202 of FIG. 2.

In operation 603, the mobile relay server receives content corresponding to the content ID from an email server. In detail, when the mobile relay server transmits the content ID received in operation 602 to the email server and requests the content, the email server transmits a stored content file to the mobile relay server in response to the request.

In operation 604, the mobile relay server transmits the content file received from the email server along with the user information and the device identification information received from the mobile terminal to a printing server.

In operation 605, the printing server generates print data by converting the received content file, applies security to the generated print data, and transmits the print data to which the security is applied to an image forming apparatus corresponding to the device identification information.

In operation 606, the image forming apparatus prints the received print data.

According to an exemplary embodiment, instead of printing the content attached to the email right after checking the email, a task may be stored and then may be printed later. A "print spooling" function will now be explained with reference to FIGS. 7 through 9.

Figure 7:
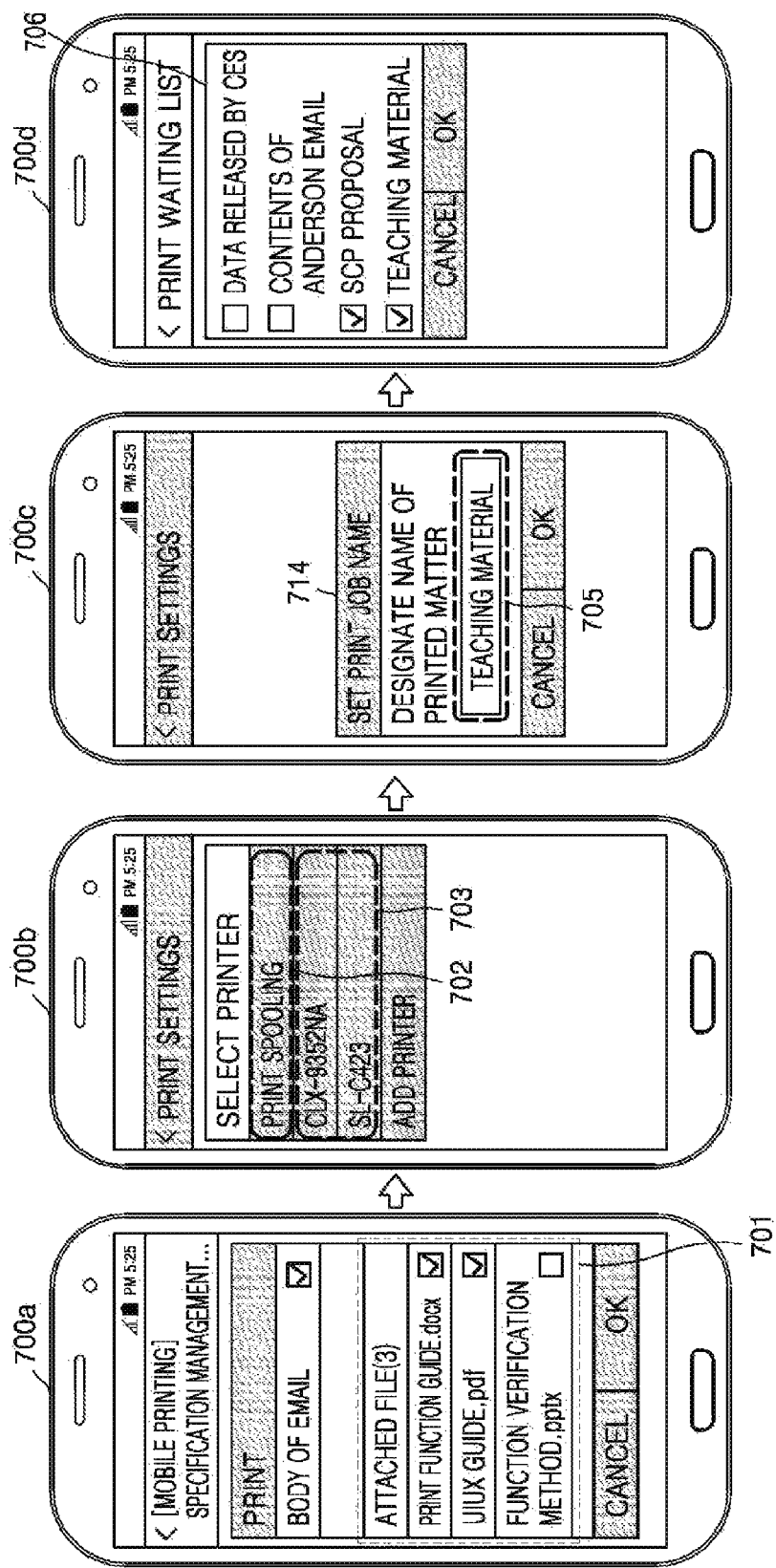
FIG. 7 is a view of UI screens displayed on a mobile terminal, for explaining a "print spooling" function, according to an exemplary embodiment.

FIG. 7 is a view of UI screens displayed on a mobile terminal, for explaining a "print spooling" function, according to an exemplary embodiment.

Referring to FIG. 7, a user may select a file to be printed from among files attached to an email on a first screen 700a.

An attached file list 701 is displayed on the first screen 700a, and two files (e.g., "print function guide.docx" and "UIUX guide.pdf") are selected in the attached file list 701. In this case, when "OK" is selected, a second screen 700b is displayed.

The user may select a printer for performing printing or may select "print spooling" 702 on the second screen 700b. That is, when the user wants to perform printing now, the user may select one from among printers included in a printer list 703, and when the user wants to perform printing later, the user may select "print spooling" 702.

When "print spooling" 702 is selected on the second screen 700b, the selected attached files may be stored as a print job, and a name of the stored print job may be set on a third screen 700c. The user may input the name of the stored print job (e.g., "teaching material") to an input field 705 of a popup 704 displayed on the third screen 700c. In this case, when "OK" is selected, the print job with the input name is generated and the generated print job is displayed in a waiting list 706. In this case, the attached files included in the print job may be converted into files in intermediate formats, instead of files in printable formats. The user may import the waiting list 706 of stored print jobs at any time and may request to perform printing.

Figure 8:
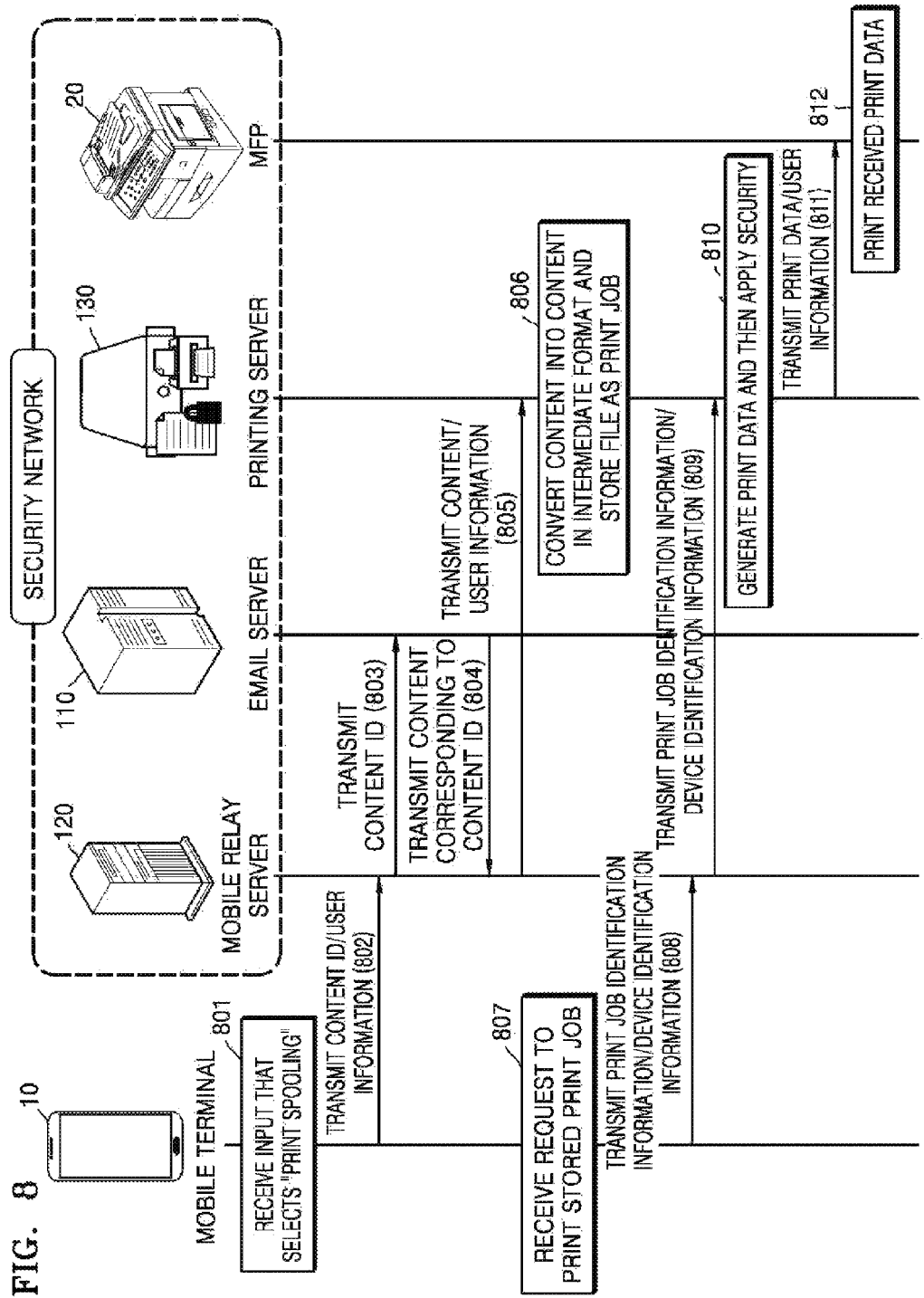
FIG. 8 is a view of a process of printing content when a "print spooling" function is executed, according to an exemplary embodiment.

FIG. 8 is a view of a process of printing content when a "print spooling" function is executed, according to an exemplary embodiment.

Referring to FIG. 8, in operation 801, a user selects "print spooling" for content attached to an email through the mobile terminal 10. In operation 802, the mobile terminal 10 may transmit content ID and user information to the mobile relay server 120. In this case, the term "content ID" refers to information for identifying content, such as a filename of the content, and the term "user information" refers to information for identifying the user of the mobile terminal 10. The content ID and the user information are the same as those described above in operation 202 of FIG. 2.

In operation 803, the mobile relay server 120 transmits the content ID received from the mobile terminal 10 to the email server 110 and requests a content file. In operation 804, the email server 110 transmits the content file corresponding to the content ID to the mobile relay server 120.

In operation 805, the mobile relay server 120 transmits the content file received from the email server 110 along with the user information received from the mobile terminal 10 to the printing server 130.

In operation 806, the printing server 130 converts the received content file into a file in an intermediate format and stores the file in the intermediate format as a print job. In this case, the term "intermediate format" refers to a format for an intermediate operation in a process of converting the content file into a file in a printable format. That is, the content file is converted into the file in the intermediate format and the file in the intermediate format is converted to generate print data. The print job may be stored along with the received user information.

After the print job is stored, the user may import a list of print jobs stored in the mobile terminal 10 at a desired point of time and may request to perform printing. In operation 807, when the mobile terminal 10 receives a request to print the stored print job from the user, the process of FIG. 8 proceeds to operation 808. In operation 808, the mobile terminal 10 transmits print job identification information and device identification information to the mobile relay server 120. In this case, the term "device identification information" refers to information for identifying a device for printing content, and the term "print job identification information" refers to information for identifying the print job selected in operation 807.

In operation 809, the mobile relay server 120 transmits the print job identification information and the device identification information to the printing server 130 and requests to print content.

In operation 810, the printing server 130 imports the print job corresponding to the received print job identification information, converts the content in the intermediate format included in the print job to generate print data, and applies security to the print data.

In operation 811, the printing server 130 transmits the generated print data and the user information to the MFP 20 corresponding to the device identification information. In this case, the user information may be extracted from the stored print job.

In operation 812, the MFP 20 prints the received print data. In this case, user authentication may be performed in order to increase security.

Figure 9:
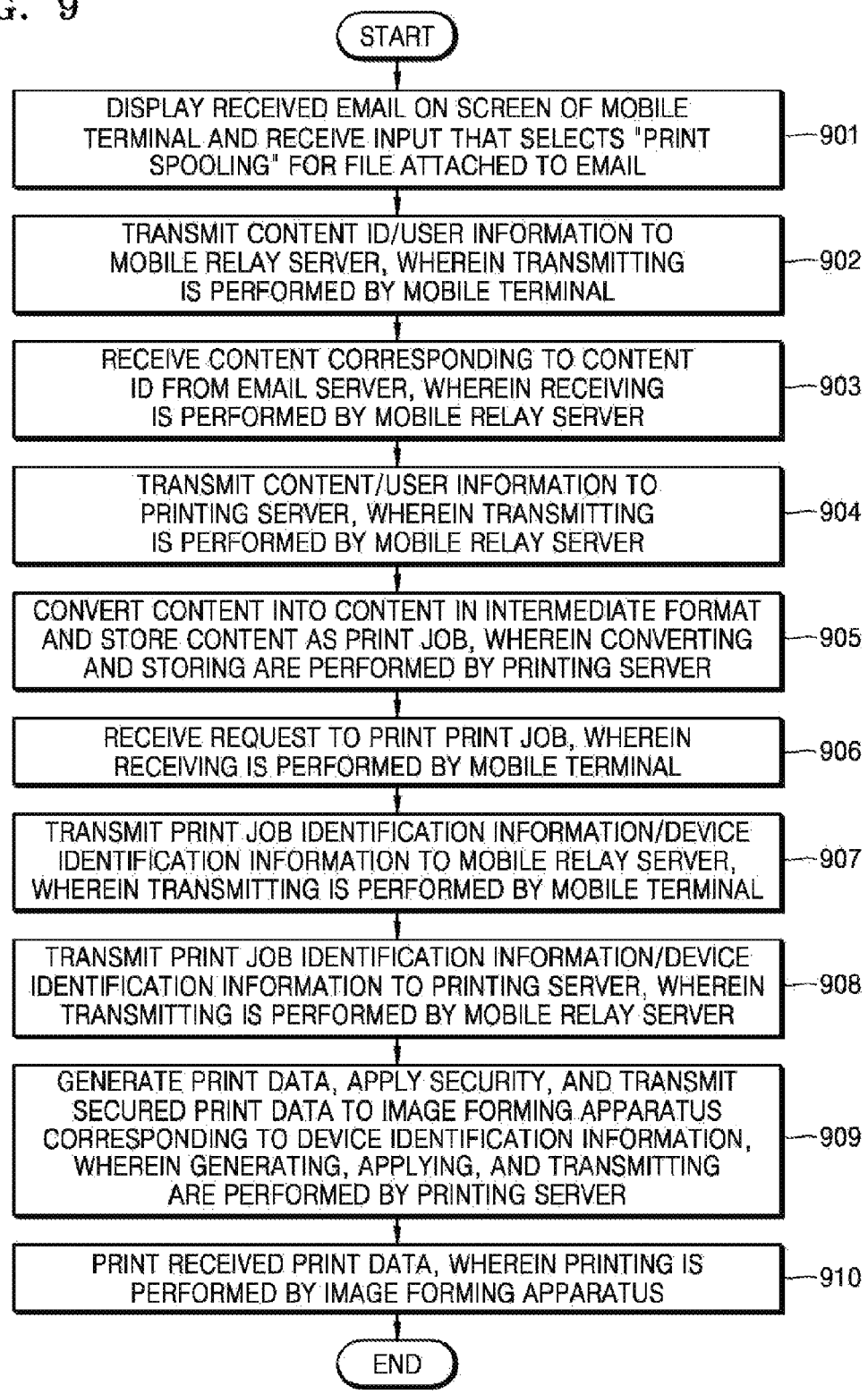
FIG. 9 is a flowchart for explaining a "print spooling" function according to an exemplary embodiment.

FIG. 9 is a flowchart for explaining a "print spooling" function according to an exemplary embodiment.

Referring to FIG. 9, in operation 901, a received email is displayed on a screen of a mobile terminal and an input that selects "print spooling" for a file attached to the received email is received. That is, a user may check the received email and the file attached to the received email on the screen of the mobile terminal, and may select a "print spooling" function while requesting to print the attached file.

In operation 902, the mobile terminal transmits content ID and user information to a mobile relay server. In this case, the term "content ID" may refer to information for identifying content, such as a filename of the content and the term "user information" may refer to information for identifying the user of the mobile terminal 10.

In operation 903, the mobile relay server receives content corresponding to the content ID from an email server. In detail, when the mobile relay server transmits the content ID received in operation 902 to the email server, the email server transmits a stored content file to the mobile relay server in response to the content ID.

In operation 904, the mobile relay server transmits the content file received from the email server along with the user information received from the mobile terminal to a printing server.

In operation 905, the printing server converts the received content file into a file in an intermediate format, and then stores the file in the intermediate format as a print job. In this case, the term "intermediate format" refers to a format for an intermediate operation in a process of converting the content file into a file in a printable format. That is, the content file may be converted into the file in the intermediate format, and the file in the intermediate format may be converted to generate print data. The print job may be stored along with the user information.

After the print job is stored, the user may import a list of stored print jobs through the mobile terminal 10 at a desired point of time and may request to perform printing. In operation 906, when the mobile terminal receives a request to print the print job from the user, a process of FIG. 9 proceeds to operation 907. In operation 907, the mobile terminal transmits print job identification information and device identification information to the mobile relay server. In this case, the term "device identification information" refers to information for identifying a device for printing content and the term "print job identification information" refers to information for identifying the print job selected in operation 906.

In operation 908, the mobile relay server transmits the print job identification information and the device identification information to the printing server, and requests to print content.

In operation 909, the printing server imports the print job corresponding to the received print job identification information, converts the content in the intermediate format included in the print job to generate print data, applies security, and transmits the secured print data to an image forming apparatus corresponding to the device identification information.

In operation 910, the image forming apparatus prints the received print data.

A method of displaying content on a screen of a display device by using a management number, that is, a display number, of the display device will now be explained with references to FIGS. 10A through 13.

Figure 10A:
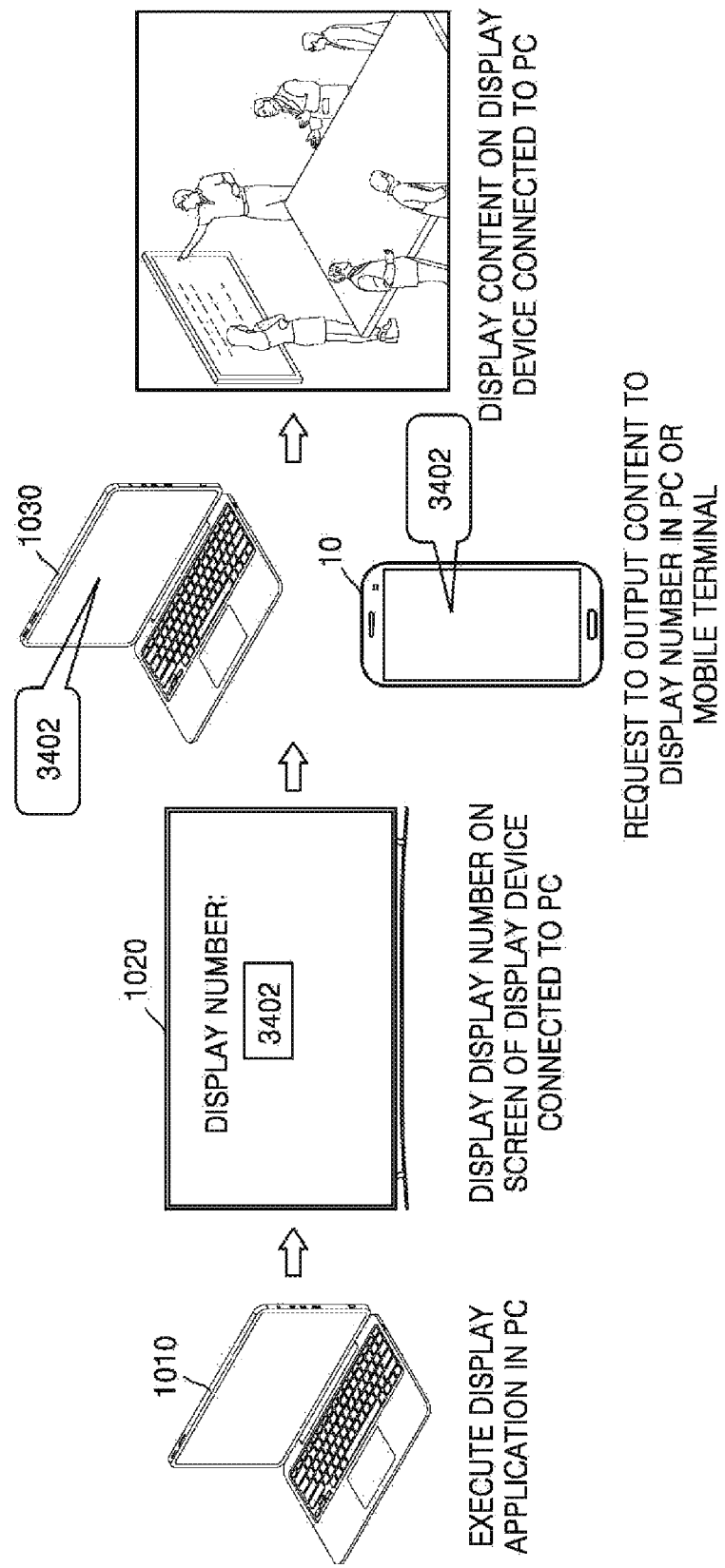
FIGS. 10A and 10B are views for explaining a method of outputting content to a screen of a display device by using a display number, according to an exemplary embodiment.
Figure 10B:
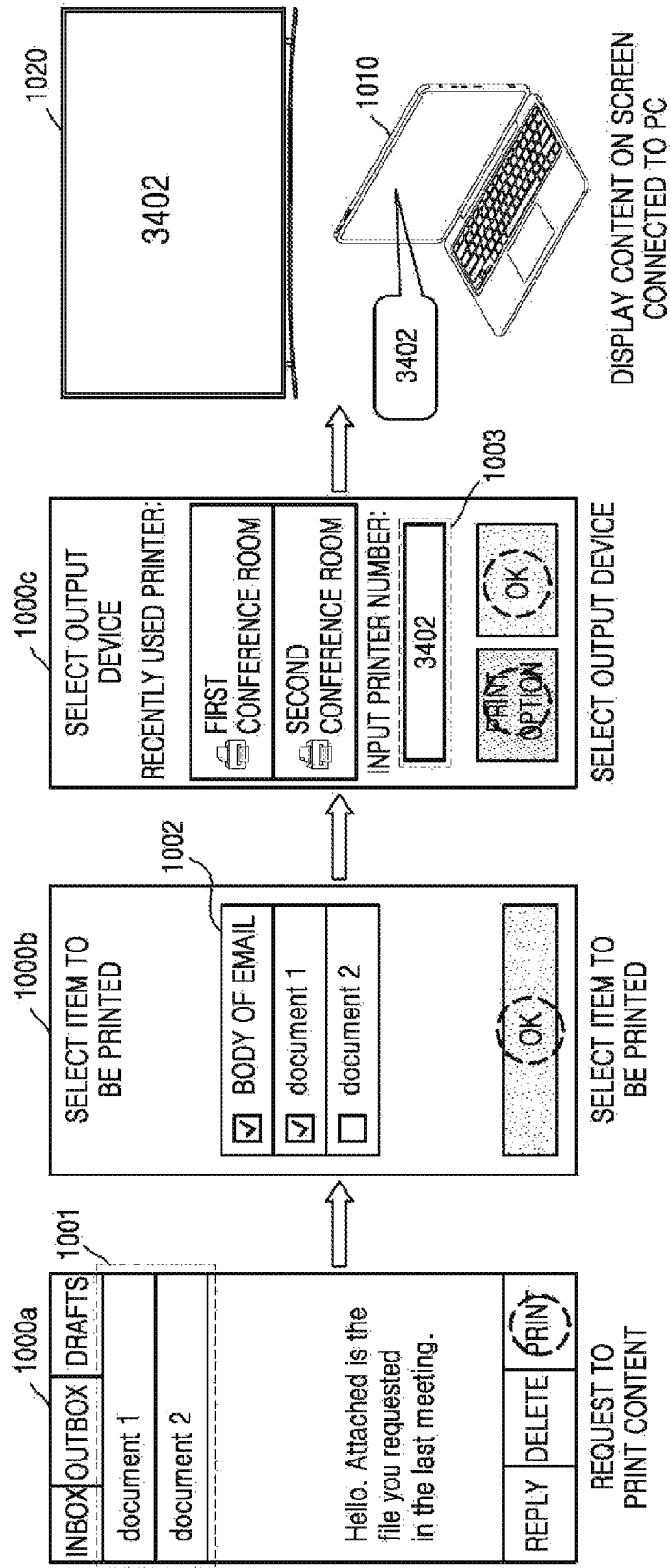

FIGS. 10A and 10B are views for explaining a method of outputting content to a screen of a display device by using a display number assigned to the display device, according to an exemplary embodiment.

Referring to FIG. 10A, when a display application is executed in a personal computer (PC) 1010, a display number "3402" is displayed on a screen of a display device 1020 connected to the PC 1010. In this case, the display application executed in the PC 1010 may enable the PC 1010 to function as an output device for outputting content so that content may be displayed on the display device 1020 such as a monitor, a television (TV), or a projector connected to the PC 1010. Also, the term "display number" refers to a management number assigned to an output device for outputting content, and in this case, refers to a management number assigned to the PC 1010.

A user may request to display/output content by using another PC 1030 or the mobile terminal 10. In this case, when the display number "3402" on the screen of the display device 1020 is input as identification information for an output device, the PC 1010 is set as an output device for outputting content, and content is displayed on the display device 1020 connected to the PC 1010.

UI screens displayed when the user requests to display/output content through the mobile terminal 10 are shown in FIG. 10B.

Referring to FIG. 10B, a list 1001 of pieces of content attached to a received email is displayed along with the body of the received email on a first screen 1000a. When a user selects "print" on the first screen 1000a, a second screen 1000b is displayed. Although content is output by being displayed in the present exemplary embodiment, displaying/outputting may be included in "printing" broadly. In particular, a process of requesting a print medium to perform printing and a process of requesting to perform displaying/outputting through a mobile terminal are the same, and are just distinguished from each other according to a type of a selected output device.

The user may select content to be output in a content list 1002 on the second screen 1000b. That is, the user may select an item to be output from among attached files and the body of the received email on the second screen 1002b. When "body of email" and "document 1" are selected in the content list 1002 and then "OK" is selected as shown in FIG. 10B, text included in the body of the received email and a file "document 1" among the attached files are selected as items to be output, and then a third screen 1000c is displayed.

The user may select an output device for outputting content on the third screen 1000c. When the user inputs a display number "3402" to an input field 1003 of the third screen 1000c, content is displayed on a screen of the display device 1020 connected to the PC 1010 corresponding to the display number "3402".

Figure 11:
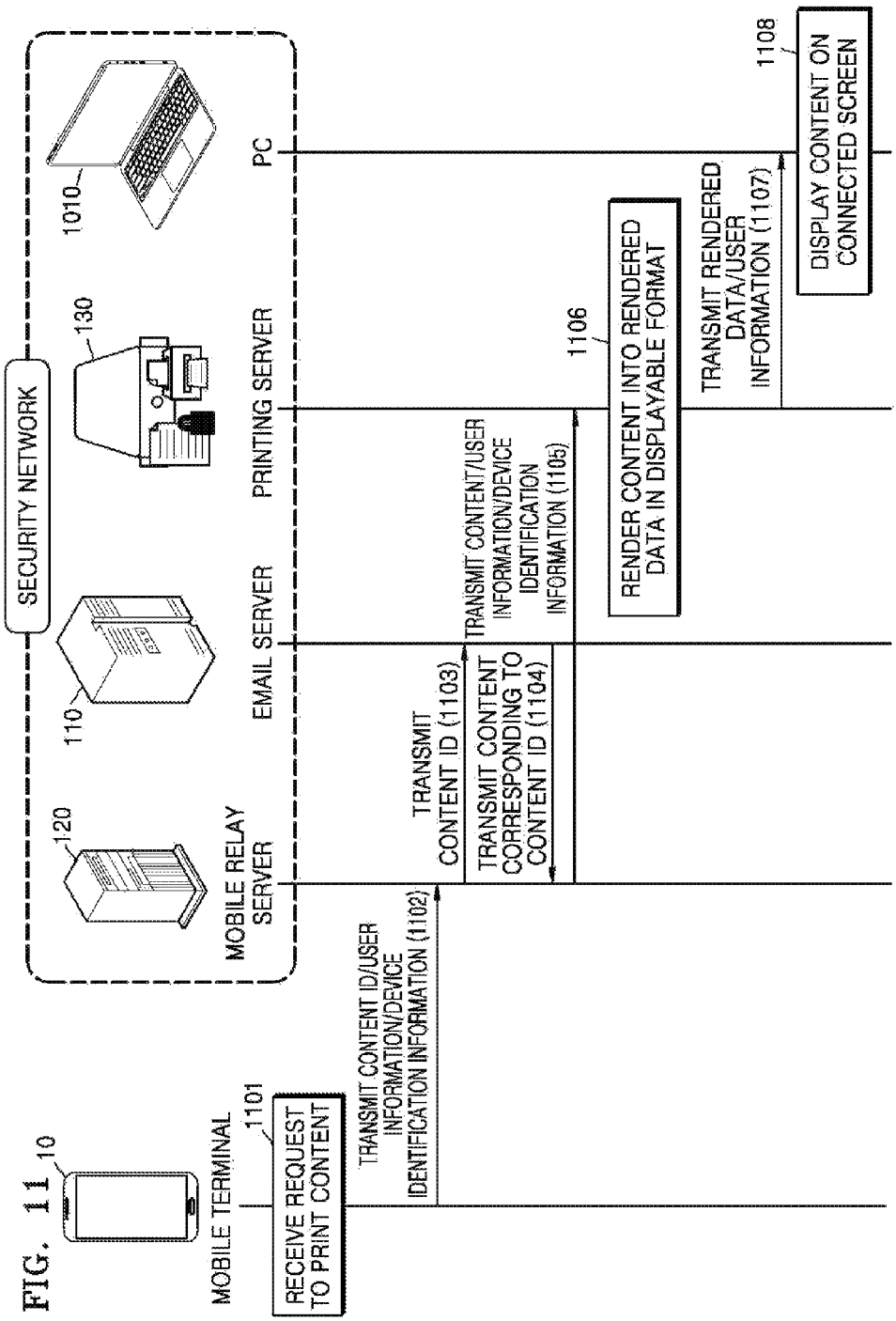
FIG. 11 is a view of a process of displaying content attached to a received email on a screen of a display device in a security network system, according to an exemplary embodiment.

FIG. 11 is a view of a process of displaying content attached to a received email on a screen of a display device in a security network system, according to an exemplary embodiment.

Referring to FIG. 11, in operation 1101, the mobile terminal 10 receives a request to print content from a user. That is, the mobile terminal 10 receives a request to print content attached to an email received in an account of the user.

In operation 1102, the mobile terminal 10 transmits content ID, user information, and device identification information to the mobile relay server 120. In this case, the term "content ID" refers to information for identifying content such as a filename of the content, the term "user information" refers to information for identifying the user of the mobile terminal 10, and the term "device identification information" refers to information for identifying a device for printing the content.

In operation 1103, the mobile relay server 120 transmits the content ID received from the mobile terminal 10 to the email server 110 and requests a content file. In operation 1104, the email server 110 transmits the content file corresponding to the content ID received from the mobile relay server 120 to the mobile relay server 120.

In operation 1105, the mobile relay server 120 transmits the content file received from the email server 110 along with the user information and the device identification information received from the mobile terminal 10 to the printing server 130 and requests to output content.

In operation 1106, the printing server 130 renders the received content file into rendered data in a displayable format. In operation 1107, the printing server 130 transmits the rendered data along with the user information to the PC 1010 corresponding to the device identification information, that is, display information. When rendering content, the printing server 130 sets a resolution according to a display device for displaying the content. That is, the printing server 130 renders content according to a condition such as a resolution supported by the PC 1010 or a display device that is connected to the PC 1010 and actually displays the content.

In operation 1108, the PC 1010 displays the received rendered data on a screen of the display device connected to the PC 1010.

Figure 12:
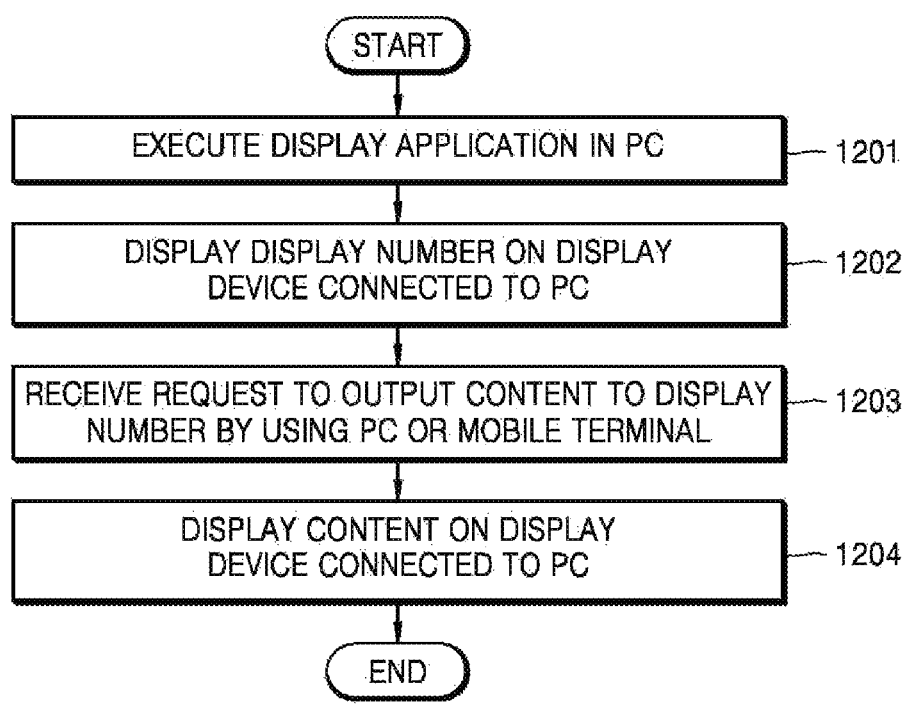
FIGS. 12 and 13 are flowcharts for explaining a method of displaying content on a screen of a display device in a security network system, according to an exemplary embodiment.
Figure 13:
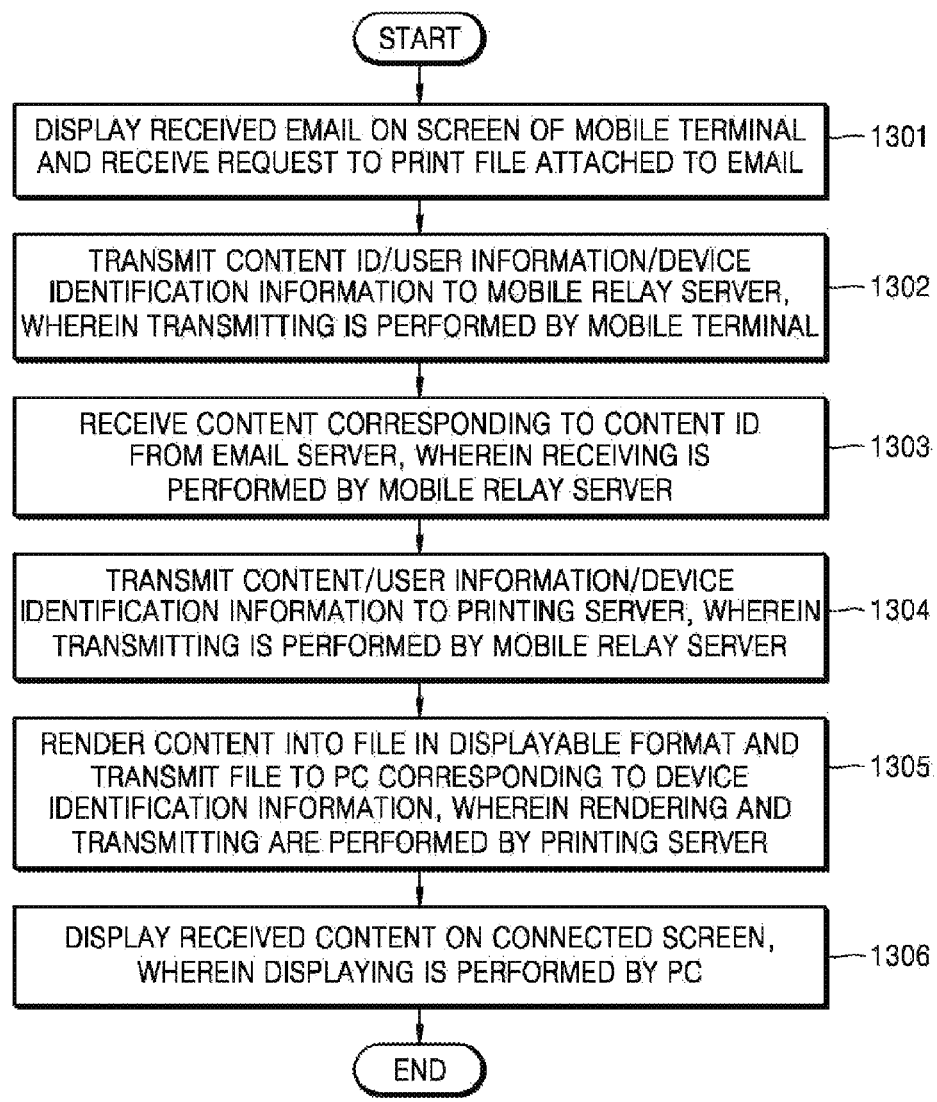

FIGS. 12 and 13 are flowcharts for explaining a method of displaying content on a screen of a display device in a security network system, according to an exemplary embodiment. In particular, FIG. 12 includes operations performed by a PC that functions as an output device for outputting content, and FIG. 13 includes operations performed by the security network system.

Referring to FIG. 12, in operation 1201, a display application is executed in the PC. In this case, the display application executed in the PC enables the PC to function as an output device for outputting content.

In operation 1202, a display number is displayed on a display device connected to the PC. In this case, the term "display number" refers to a unique management number assigned to an output device for outputting content.

In operation 1203, a user may request to output content to the display number through a PC or a mobile terminal. In this case, the PC is different from the PC in which the display application is executed. In detail, the user may request to display/output content by using the PC or the mobile terminal. In this case, in operation 1202, the display number displayed on a screen of a display device is input as identification information for the output device, so that the PC connected to the display device is designated as the output device. Accordingly, in operation 1204, the content is displayed on the display device connected to the PC.

Referring to FIG. 13, in operation 1301, an email received by a user is displayed on a screen of a mobile terminal, and a request to print a file attached to the email is received from the user. In this case, when the user requests to check contents of the attached file, the mobile terminal may receive a preview of the attached file from a mobile relay server and may display the preview on the screen. However, the mobile terminal does not receive an original file of the attached file.

In operation 1302, the mobile terminal transmits content ID, user information, and device identification information to the mobile relay server. In this case, the term "content ID" refers to information for identifying content such as a filename of the content, the term "user information" refers to information for identifying the user of the mobile terminal, and the term "device identification information" refers to information for identifying an output device for outputting the content. The content ID, the user information, and the device identification information are the same as those described above in operation 202 of FIG. 2.

In operation 1303, the mobile relay server receives content corresponding to the content ID from an email server. In detail, the mobile relay server transmits the content ID received in operation 1302 to the email server and requests the content. The email server transmits a stored content file to the mobile relay server in response to the request.

In operation 1304, the mobile relay server transmits the content file received from the email server along with the user information and the device identification information received from the mobile terminal to a printing server.

In operation 1305, the printing server renders the received content file into a file in a displayable format, and transmits the file in the displayable format to a PC corresponding to the device identification information.

In operation 1306, the PC displays the received content on a screen of a display device connected to the PC.

Although a mobile terminal communicates with a mobile relay server included in a security network system and outputs content in the previous exemplary embodiments, a PC may directly communicate with a printing server in the security network system and may output content. That is, a request to print content may be transmitted to the printing server through an integrated PC driver that is installed in the PC. A method of outputting content in a security network system by using an integrated PC driver will now be explained with reference to FIGS. 14 through 16.

Figure 14:
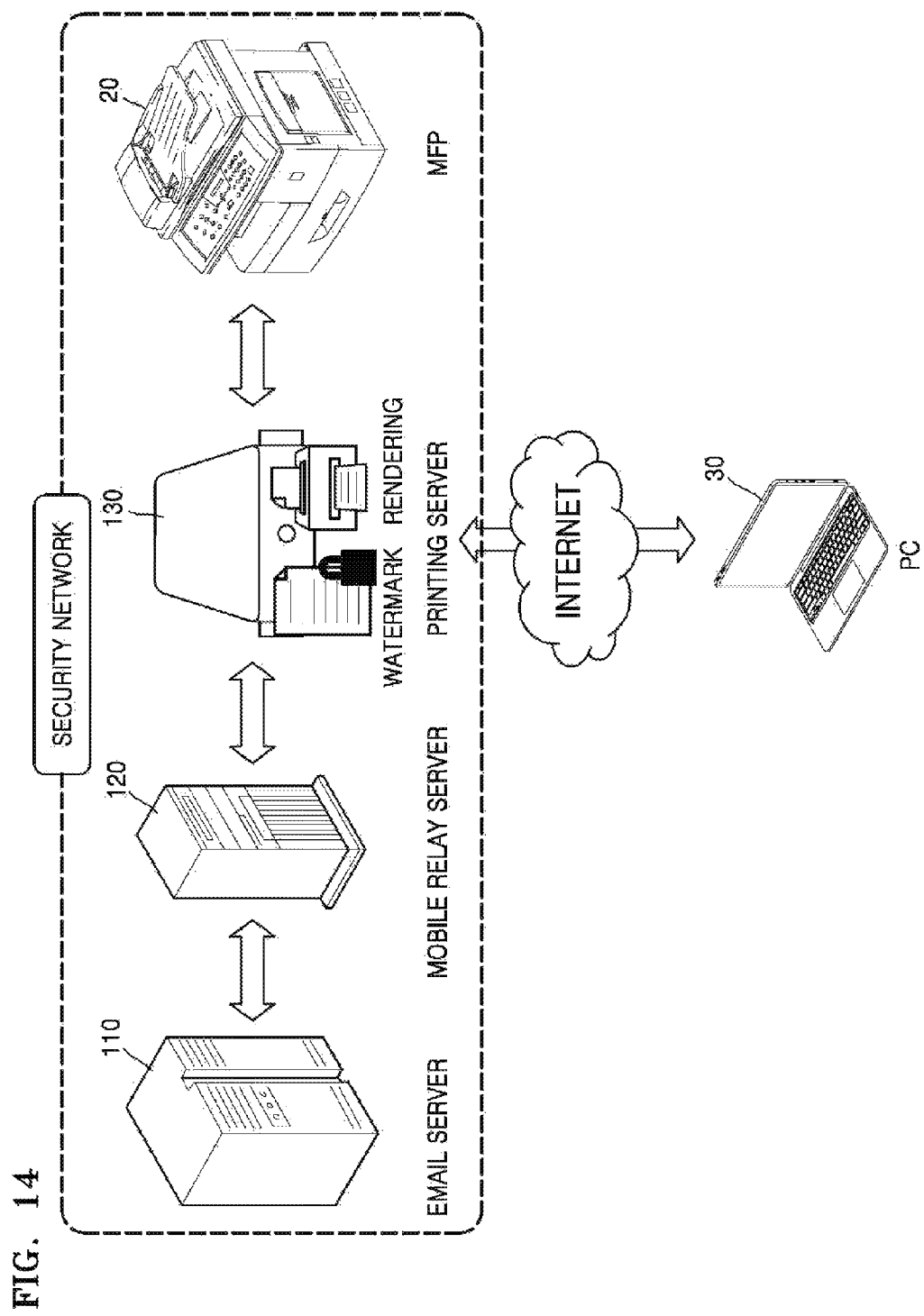
FIG. 14 is a view illustrating a configuration of a security network system according to an exemplary embodiment.

FIG. 14 is a view illustrating a configuration of a security network system, according to an exemplary embodiment. Referring to FIG. 14, the security network system may include the email server 110, the mobile relay server 120, the printing server 130, and the MFP 20. A PC 30 may access the security network system by being connected to the printing server 130 through the Internet. When a user selects an integrated PC driver installed in the PC 30 to request to output content, the PC 30 may request to output content by communicating with the printing server 130 by using the same application programming interface (API) as an API used during communication between the mobile relay server 120 and the printing server 130.

The security network system of FIG. 14 includes the same elements as those of the security network system of FIG. 1, and thus a detailed explanation thereof will not be repeated here.

Figure 15:
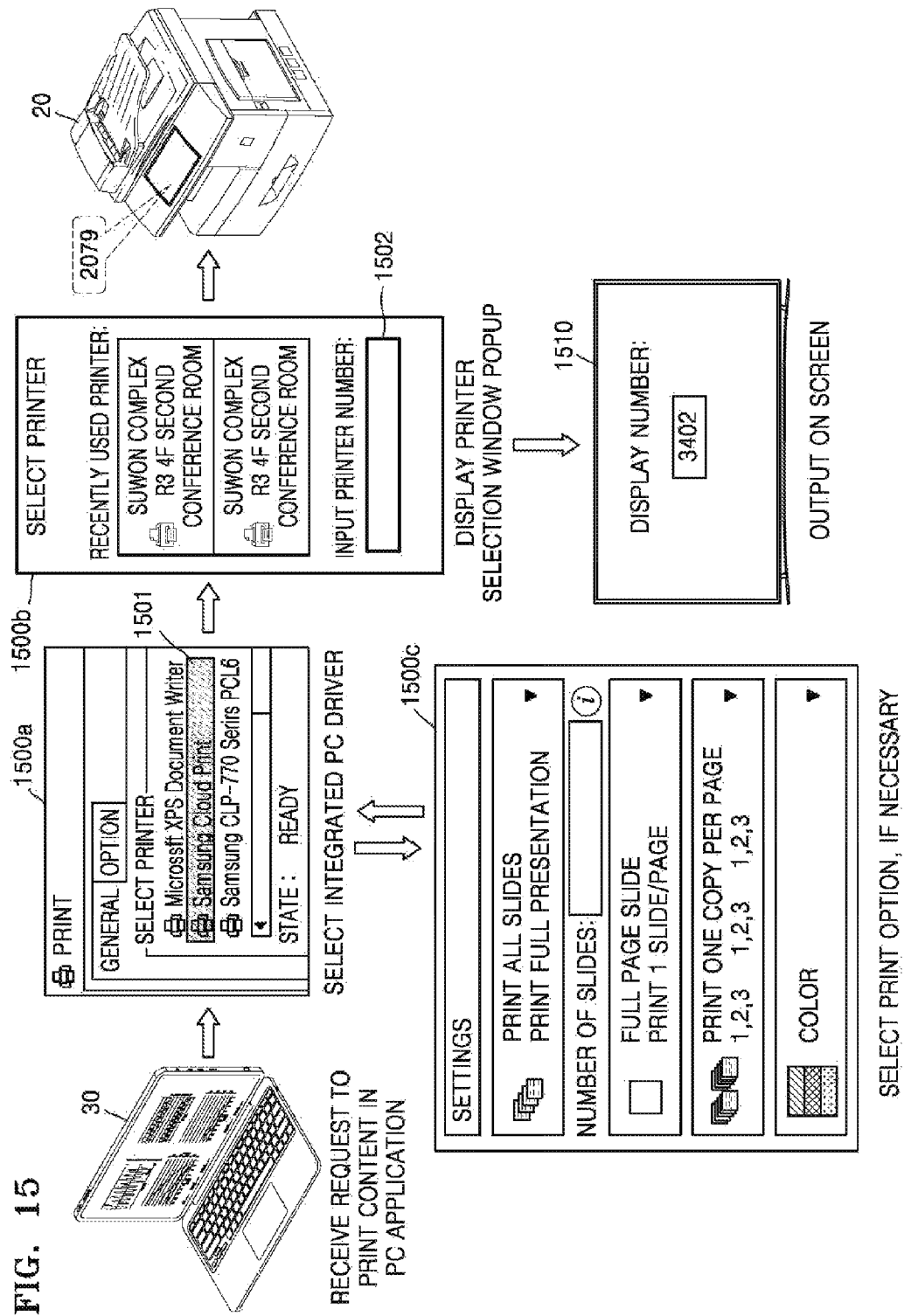
FIG. 15 is a view of UI screens displayed when content is output in a security network system by using an integrated personal computer (PC) driver, according to an exemplary embodiment.

FIG. 15 is a view illustrating UI screens displayed when content is output in a security network system by using an integrated PC driver, according to an exemplary embodiment. Referring to FIG. 15, when an application installed in the PC 30 receives a request to perform printing from a user, a screen for selecting a printer for performing printing such as a first screen 1500a may be displayed on the PC 30. When the user selects "Samsung Cloud Print" 1501 corresponding to the integrated PC driver and proceeds to a next operation, a UI screen for selecting a printer such as a second screen 1500b is displayed. Since the integrated PC driver has been selected, the PC 30 connects to a printing server of the security network system and displays a list of printers that may be used in the security network system on the second screen 1500b. If an actual printer connected to the PC 30 is selected on the first screen 1500a, content is printed by the selected printer.

The user may select an output device for outputting the content by selecting one item in a list of recently used printers on the second screen 1500b or by inputting device identification information such as a printer management number or a display number to an input field 1502. When the user inputs "2079" to the input field 1502, the content is printed by the MFP 20 corresponding to "2079", and when the user inputs "3402", the content is displayed on a screen of a display device 1510 corresponding to "3402".

After selecting the integrated PC driver on the first screen 1500a, when the user selects option settings instead of proceeding to a next operation, a UI screen for setting a print option such as a third screen 1500c is displayed on the PC 30.

Figure 16:
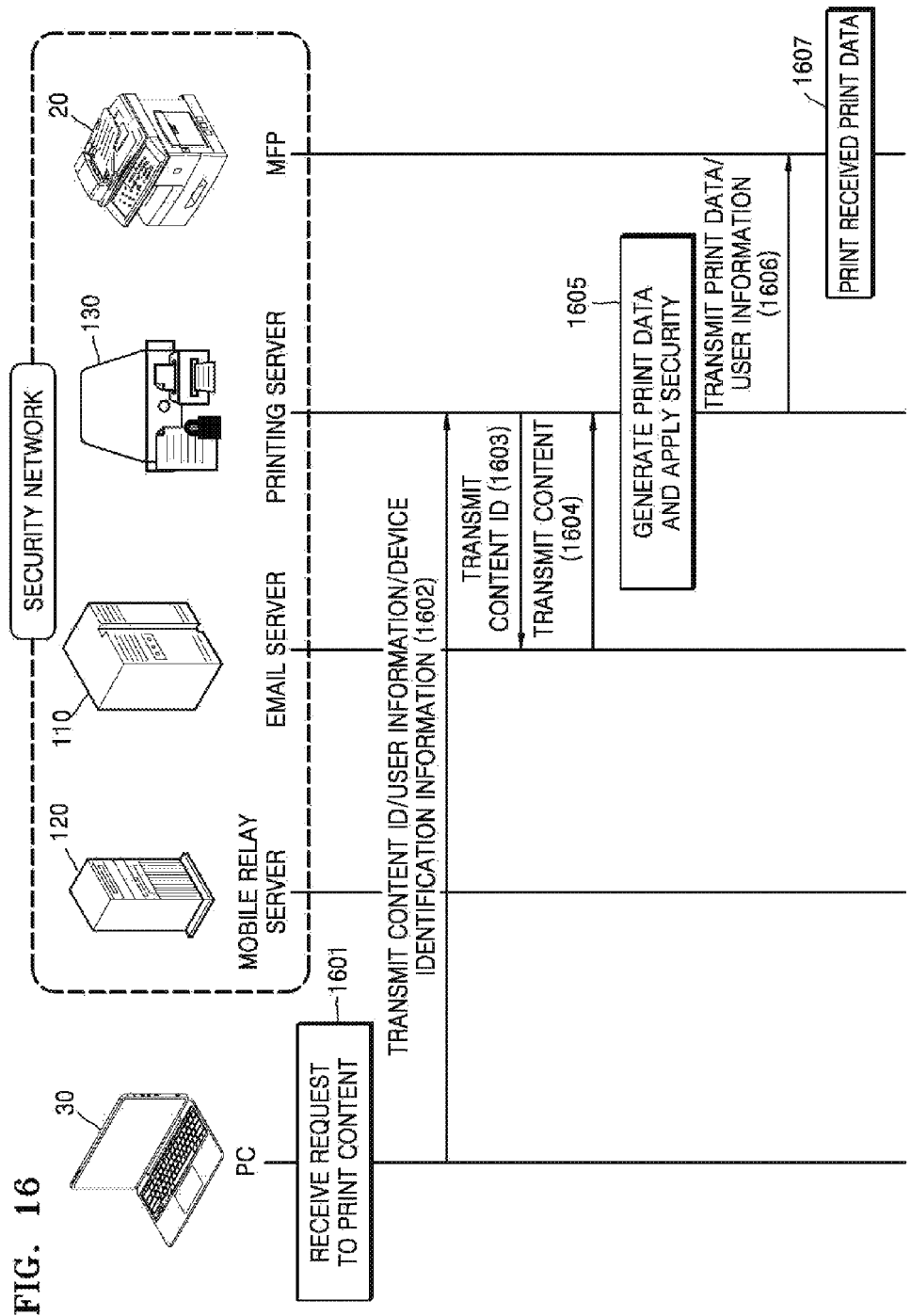
FIG. 16 is a view of a process of outputting content in a security network system by using an integrated PC driver, according to an exemplary embodiment.

FIG. 16 is a view of a process of outputting content in a security network system by using an integrated PC driver, according to an exemplary embodiment.

Referring to FIG. 16, in operation 1601, the PC 30 receives a request to print content from a user. That is, the PC 30 receives a request to print content attached to an email received in an account of the user. According to the request of the user, the PC 30 may access the email server 110 and may display the email and the content attached to the email received in the account of the user on a screen.

In operation 1602, the PC 30 transmits content ID, user information, and device identification information to the printing server 130 and requests to perform printing. In this case, the term "content ID" refers to information for identifying content such as a filename of the content, the term "user information" refers to information for identifying the user of the PC, and the term "device identification information" refers to information for identifying a device for printing the content.

In operation 1603, the printing server 130 transmits the content ID to the email server 110 and requests a content file corresponding to the content ID.

In operation 1604, the email server 110 transmits the content file corresponding to the received content ID to the printing server 130.

In operation 1605, the printing server 130 converts the received content file to generate print data and applies security to the generated print data.

In operation 1606, the printing server 130 transmits the generated print data along with the user information to the MFP 20 and requests to perform printing.

In operation 1607, the MFP 20 prints the received print data.

A security scanning function will now be explained with reference to FIGS. 17 through 20.

Figure 17:
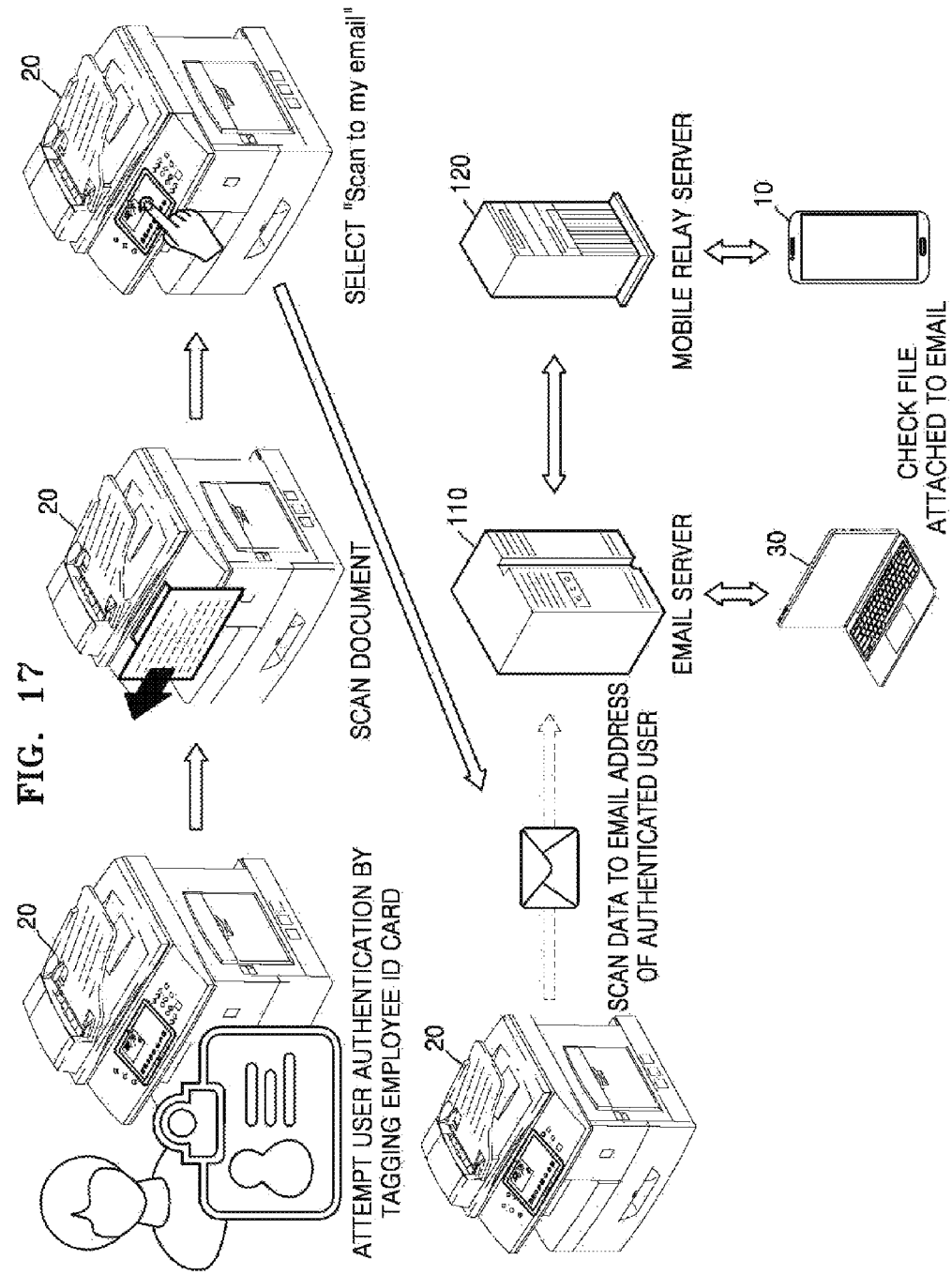
FIG. 17 is a view for explaining a security scanning method, according to an exemplary embodiment.

FIG. 17 is a view for explaining a security scanning method according to an exemplary embodiment. Security scanning will now be briefly explained. When an image scanned by the MFP 20 is transmitted via email, an operation of performing user authentication is added in order to increase security. Referring to FIG. 17, when a user brings an ID card, such as an employee ID card, in close proximity to the MFP 20 so that it is located within a predetermined distance from the MFP 20, the MFP 20 reads user information stored in the ID card through NFC and performs user authentication by using the read user information.

When the user succeeds in the user authentication, the user scans a document by using the MFP 20 and selects "Scan to my email" on a UI screen displayed on a manipulation panel of the MFP 20. The MFP 20 transmits scan data obtained by scanning the document to the email server 110 by using an email address of the user who has succeeded in the user authentication as a destination address.

The email server 110 stores the received scan data to correspond to the email account of the authenticated user. The user may check the scan data stored in the email server 110 by directly accessing the email server 110 through the PC 30, or may check the scan data stored in the email server 110 by accessing the mobile relay server 120 through the mobile terminal 10.

Figure 18:
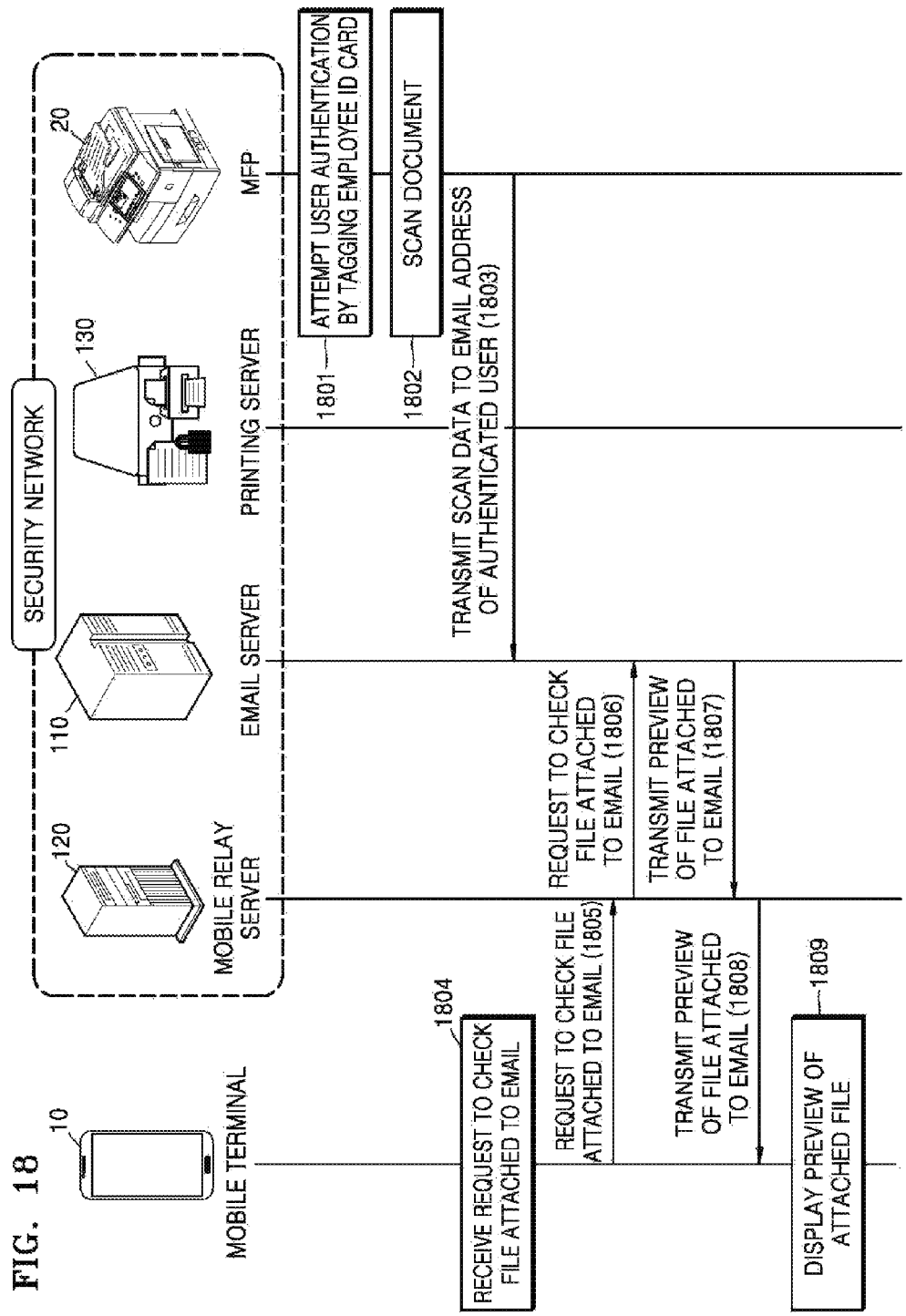
FIG. 18 is a view of a process of performing security scanning according to an exemplary embodiment.

FIG. 18 is a view of a process of performing security scanning according to an exemplary embodiment. Referring to FIG. 18, in operation 1801, a user attempts user authentication by tagging an ID card such as an employee ID card onto the MFP 20 through NFC. That is, when the user brings the employee ID card in close proximity to the MFP 20 so that it is located within a predetermined distance from the MFP 20, the MFP 20 reads user information stored in the employee ID card through NFC and performs the user authentication by using the read user information.

When the user succeeds in the user authentication, the process proceeds to operation 1802. In operation 1802, the user generates scan data by scanning a document by using the MFP 20.

In operation 1803, when the user selects "Scan to my email" on a manipulation panel of the MFP 20, the MFP 20 transmits the scan data to an email address of the user who has succeeded in the user authentication. The transmitted scan data is stored in the email server 110 to correspond to an email account of the user.

The user may request to check the scan data stored in the email server 110 by using the mobile terminal 10.

In operation 1804, the user requests to check a file attached to an email of the user by using the mobile terminal 10. In operation 1805, the mobile terminal 10 requests the mobile relay server 120 to check the file attached to the email.

In operation 1806, the mobile relay server 120 requests the email server 110 to check the file attached to the email. In operation 1807, the email server 110 transmits a preview of the file attached to the email to the mobile relay server 120.

In operation 1808, the mobile relay server 120 transmits the preview received from the email server 110 to the mobile terminal 10. In operation 1809, the mobile terminal 10 displays the received preview on a screen.

Figure 19:
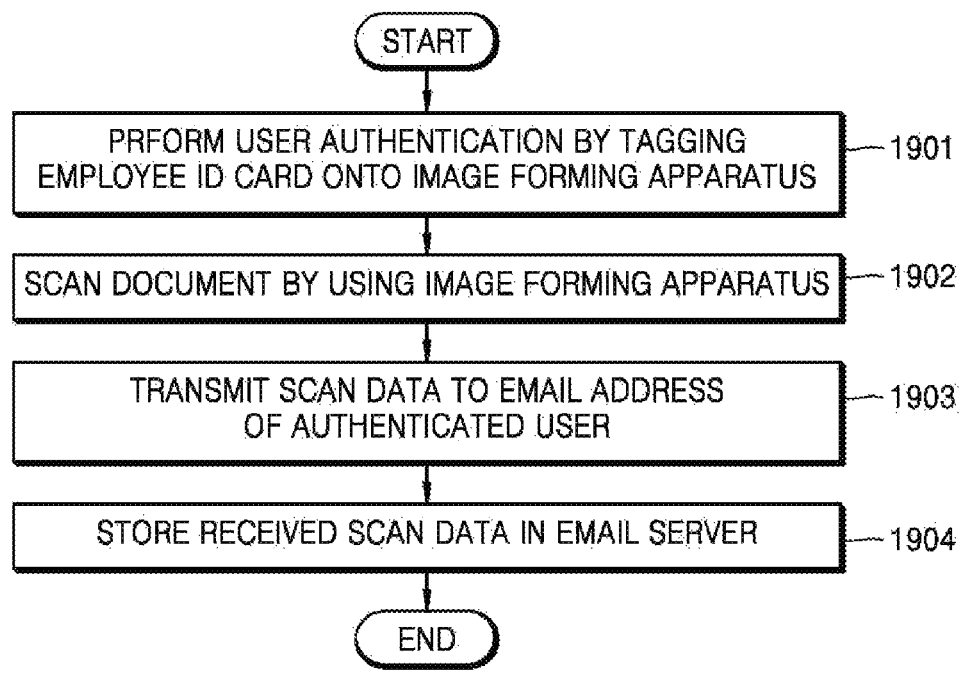
FIGS. 19 and 20 are flowcharts for explaining a method of performing security scanning according to an exemplary embodiment.
Figure 20:
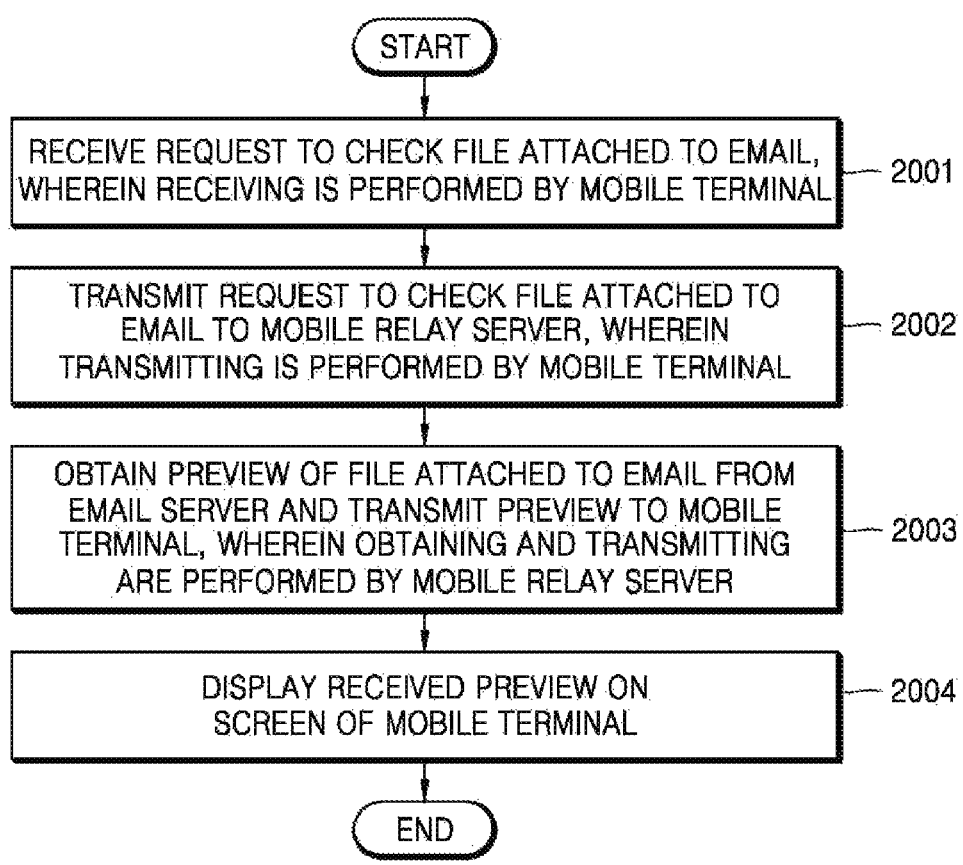

FIGS. 19 and 20 are flowcharts for explaining a method of performing security scanning according to an exemplary embodiment.

In operation 19, in operation 1901, when an employee ID card is tagged onto an image forming apparatus through NFC, user authentication is performed. That is, when the employee ID card is brought in close proximity to the image forming apparatus so that it is located within a predetermined distance from the image forming apparatus, the image forming apparatus reads user information stored in the employee ID card and performs the user authentication by using the read user information.

In operation 1902, when a user scans a document by using the image forming apparatus, the image forming apparatus generates scan data.

In operation 1903, when the user requests the image forming apparatus to transmit the scan data to an email address of the user, the image forming apparatus transmits the scan data to the email address of the user who is authenticated.

In operation 1904, an email server stores the received scan data to correspond to an email account of the user.

A method performed by a mobile terminal to check the scan data stored to correspond to the email account of the user will now be explained with reference to FIG. 20.

Referring to FIG. 20, in operation 2001, a mobile terminal receives a request to check a file attached to an email from a user. That is, the user requests to check contents of the file attached to the email received in an email account of the user by using a mobile application installed in the mobile terminal.

In operation 2002, the mobile terminal transmits a request to check the file attached to the email to a mobile relay server. In operation 2003, the mobile relay server obtains a preview of the file attached to the email from an email server and transmits the preview to the mobile terminal.

In operation 2004, the mobile terminal displays the received preview on a screen.

A method of outputting content in a display device connected to a PC by executing a display application in the PC has been described above with reference to FIGS. 10A through 13. However, since there are recent image forming apparatuses in which operating systems are installed like in PCs, a display application may be executed in an image forming apparatus and content may be displayed on a display device connected to the image forming apparatus. In this case, content scanned by the image forming apparatus may be directly displayed on a screen of the display device, or content displayed on a screen of the display device may be directly printed by the image forming apparatus. A method of executing a display application in an image forming apparatus and displaying content on a display device connected to the image forming apparatus will now be explained with reference to FIGS. 21 through 25.

Figure 21:
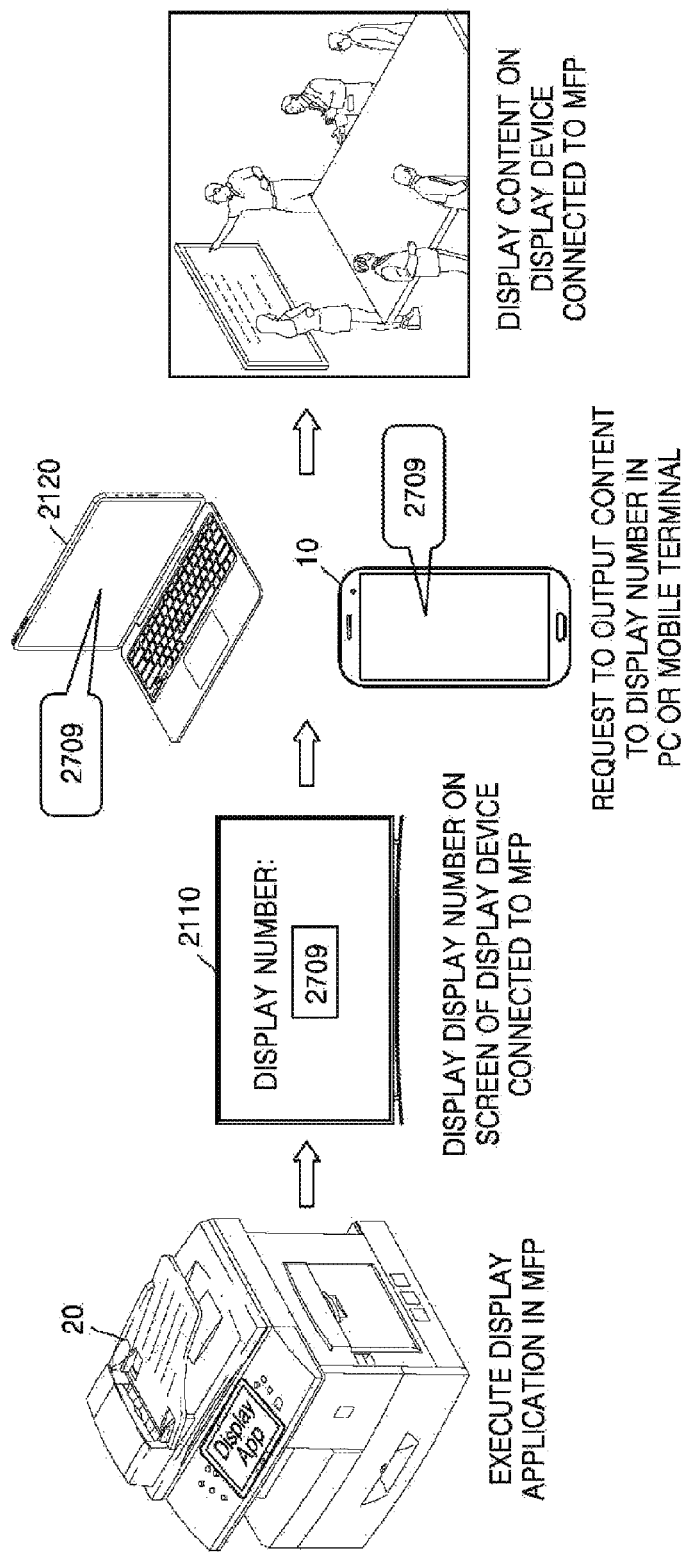
FIG. 21 is a view for explaining a method of outputting content on a screen of a display device connected to an image forming apparatus, according to an exemplary embodiment.

FIG. 21 is a view for explaining a method of outputting content on a screen of a display device connected to an image forming apparatus, according to an exemplary embodiment.

Referring to FIG. 21, when a display application is executed in the MFP 20, a display number "2709" is displayed on a screen of a display device 2110 connected to the MFP 20. In this case, the display application executed in the MFP 20 may enable the MFP 20 to function as an output device for outputting content so that content may be displayed on the display device 2110 such as a monitor, a TV, or a projector connected to the MFP 20. Also, the term "display number" refers to a unique management number assigned to an output device for outputting content.

A user may request to display/output content by using a PC 2120 or the mobile terminal 10. In this case, when the user inputs the display number "2709" on the screen of the display device 2110 as identification information for an output device, the MFP 20 is set as an output device for outputting content and content is displayed on the display device 2110 connected to the MFP 20. In this case, the MFP 20 renders the content into content in a displayable format and transmits the content in the displayable format to the display device 2110.

Figure 22A:
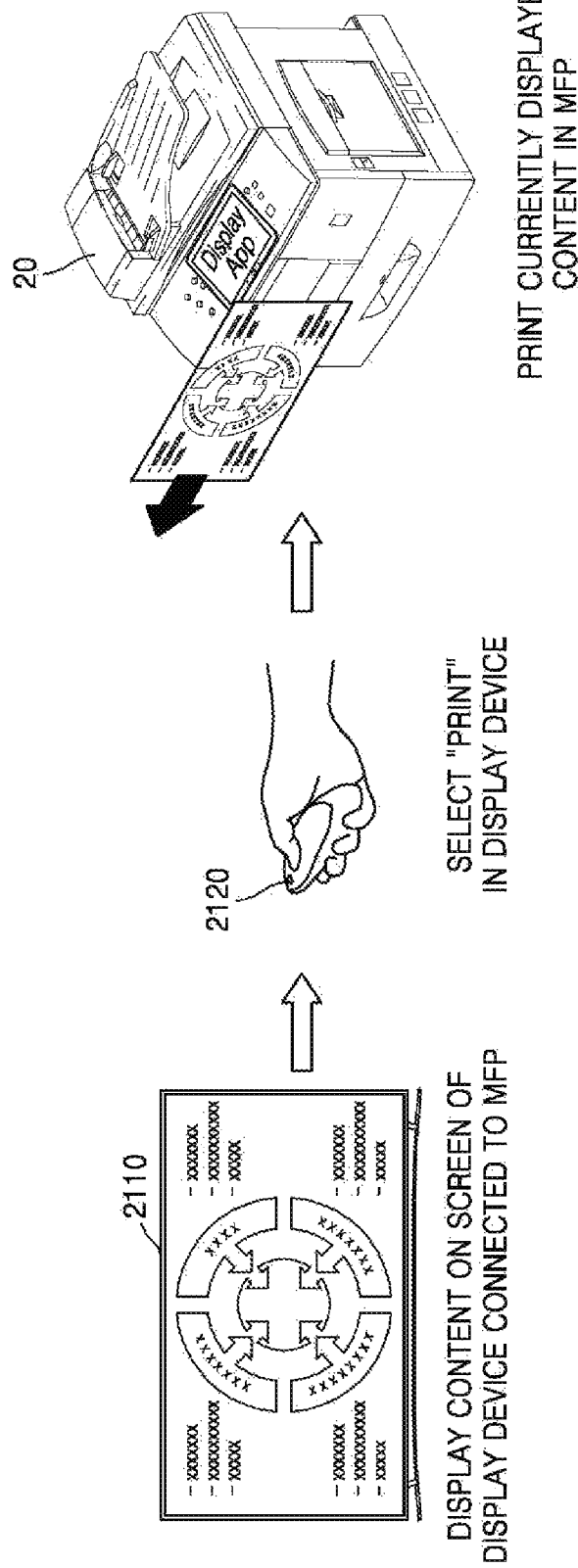
FIG. 22A is a view for explaining a method performed by an image forming apparatus connected to a display device to print content displayed on a screen of the display device, according to an exemplary embodiment.

FIG. 22A is a view for explaining a method performed by an image forming apparatus connected to a display device to print content displayed on a screen of the display device, according to an exemplary embodiment.

Referring to FIG. 22A, when content is displayed on the display device 2110 connected to the MFP 20 through a display application executed in the MFP 20 and a user selects a "print" function by using a remote controller 2120 of the display device 2110, the content displayed on the display device 2110 is printed by the MFP 20. In this case, the MFP 20 may convert a content file received from the display device 2110 and may generate print data. As such, when the user who watches the content displayed on the display device 2110 desires to print the content, the user may allow the MFP 20 connected to the display device 2110 to directly print the content.

FIG. 22B is a view for explaining a method performed by a display device connected to an image forming apparatus to display content scanned by the image forming apparatus, according to an exemplary embodiment.

Referring to FIG. 22B, when a user scans a document by using the MFP 20 connected to the display device 2110 and selects "scan to display", the MFP 20 transmits generated scan data to the display device 2110 connected to the MFP 20 and the display device 2110 displays the received scan data on a screen. In this case, the MFP 20 may render the scan data into data in a displayable format and may transmit the data in the displayable format to the display device 2110. As such, the user may allow content to be directly displayed on the display device 2110 by scanning a document by using the MFP 20 connected to the display device 2110.

Figure 23:
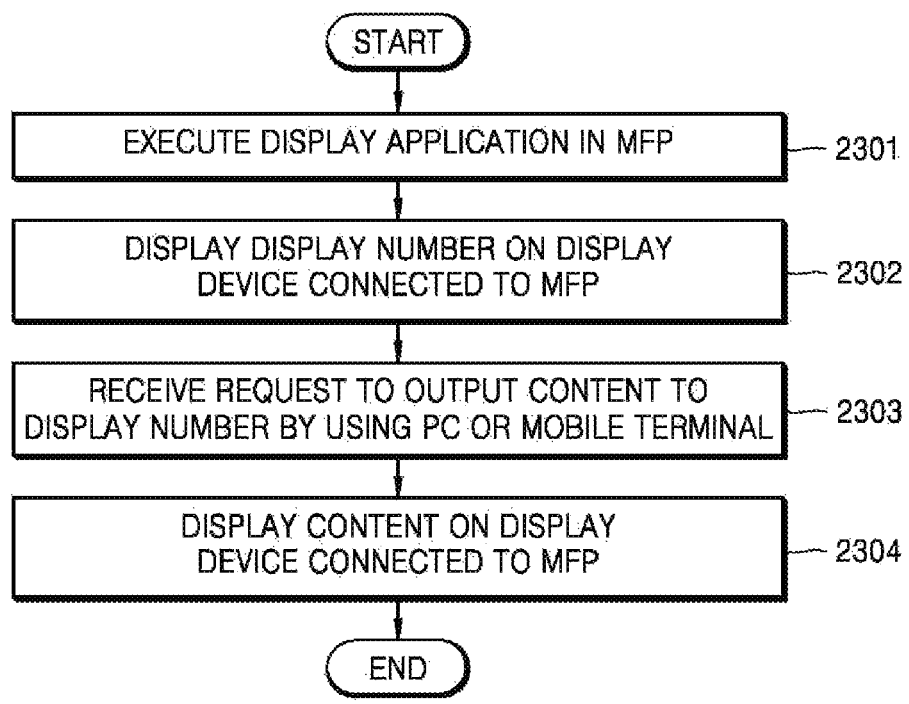
FIG. 23 is a flowchart for explaining a method of displaying content on a display device connected to an image forming apparatus by executing a display application in the image forming apparatus, according to an exemplary embodiment.

FIG. 23 is a flowchart for explaining a method of displaying content on a display device connected to an image forming apparatus by executing a display application in the image forming apparatus, according to an exemplary embodiment.

Referring to FIG. 23, in operation 2301, a display application is executed in an MFP. In this case, the display application executed in the MFP enables the MFP to function as an output device for outputting content, and thus content may be displayed on a display device such as a monitor, a TV, or a projector connected to the MFP.

In operation 2302, a display number is displayed on a screen of the display device connected to the MFP. In this case, the term "display number" refers to a management number assigned to an output device for outputting content, and in this case, refers to a management number assigned to the MFP.

In operation 2303, a user may request to output content to the display number by using a PC or a mobile terminal. In detail, the user may obtain the display number displayed on the screen of the display device in operation 2302, and when the user requests to output content by using the PC or the mobile terminal, the user inputs the display number as identification information of an output device for outputting the content.

When the user inputs the display number and requests to output the content, the MFP corresponding to the input display number may be set as an output device. Accordingly, in operation 2304, the MFP may receive the content and may allow the display device connected to the MFP to display the received content. In this case, the MFP renders the received content into content in a displayable format and transmits the content in the displayable format to the display device.

Figure 24:
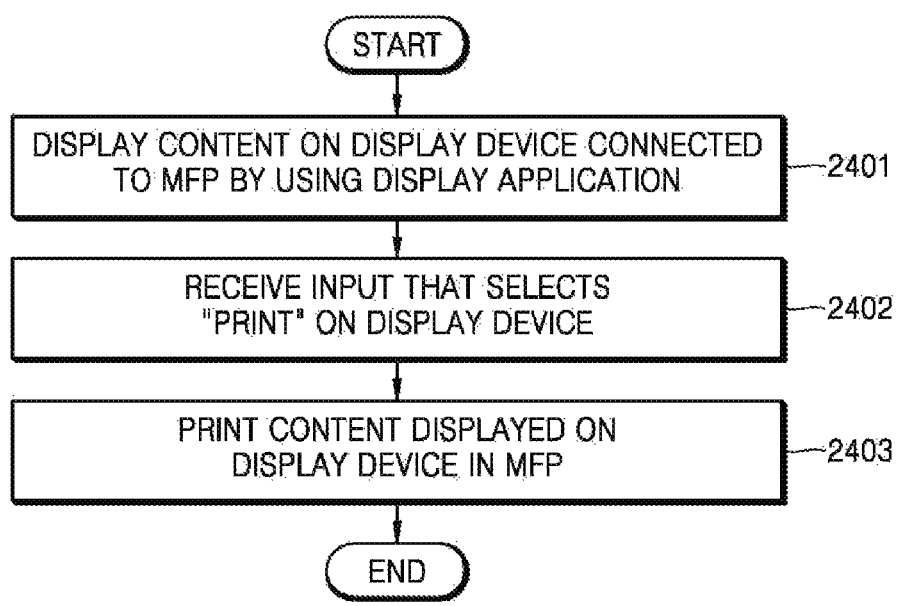
FIG. 24 is a flowchart for explaining a method performed by an image forming apparatus connected to a display device to print content displayed on a screen of the display device, according to an exemplary embodiment.

FIG. 24 is a flowchart for explaining a method performed by an image forming apparatus connected to a display device to print content displayed on a screen of the display device, according to an exemplary embodiment.

Referring to FIG. 24, in operation 2401, content is displayed on a display device connected to an MFP by using a display application executed in the MFP. Details of operation 2401 are the same as those described above with reference to FIG. 23.

In operation 2402, a user selects a "print" function on the display device. In operation 2403, the MFP converts the content displayed on the display device into print data and prints the print data.

Figure 25:
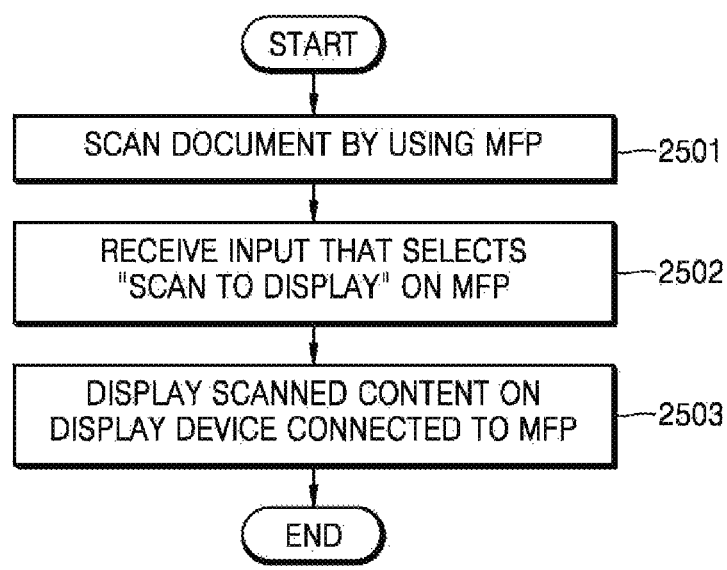
FIG. 25 is a flowchart for explaining a method performed by a display device connected to an image forming apparatus to display content scanned by the image forming apparatus, according to an exemplary embodiment.

FIG. 25 is a flowchart for explaining a method performed by a display device connected to an image forming apparatus to display content scanned by the image forming apparatus, according to an exemplary embodiment.

Referring to FIG. 25, in operation 2501, when a user scans a document by using an MFP, the MFP generates scan data.

In operation 2502, when the user selects "scan to display" on the MFP, the MFP renders the scan data into rendered data in a displayable format and then transmits the rendered data to a display device connected to the MFP.

In operation 2503, the display device connected to the MFP displays the received rendered data on a screen.

Exemplary embodiments in which an email to which content is attached is transmitted to a specific email address and the attached content is printed by an image forming apparatus or displayed on a display device will now be explained with reference to FIGS. 26 through 35. In the following exemplary embodiments, there is a "print representative email address" that is an email address for outputting content. That is, when an email to which content is attached is transmitted to the print representative email address, an email server transmits the content attached to the email to an output device and requests to output the content. Accordingly, a user may allow the attached content to be directly output through a desired output device by designating the output device in the email or inputting a release code for user authentication to the output device.

Figure 26:
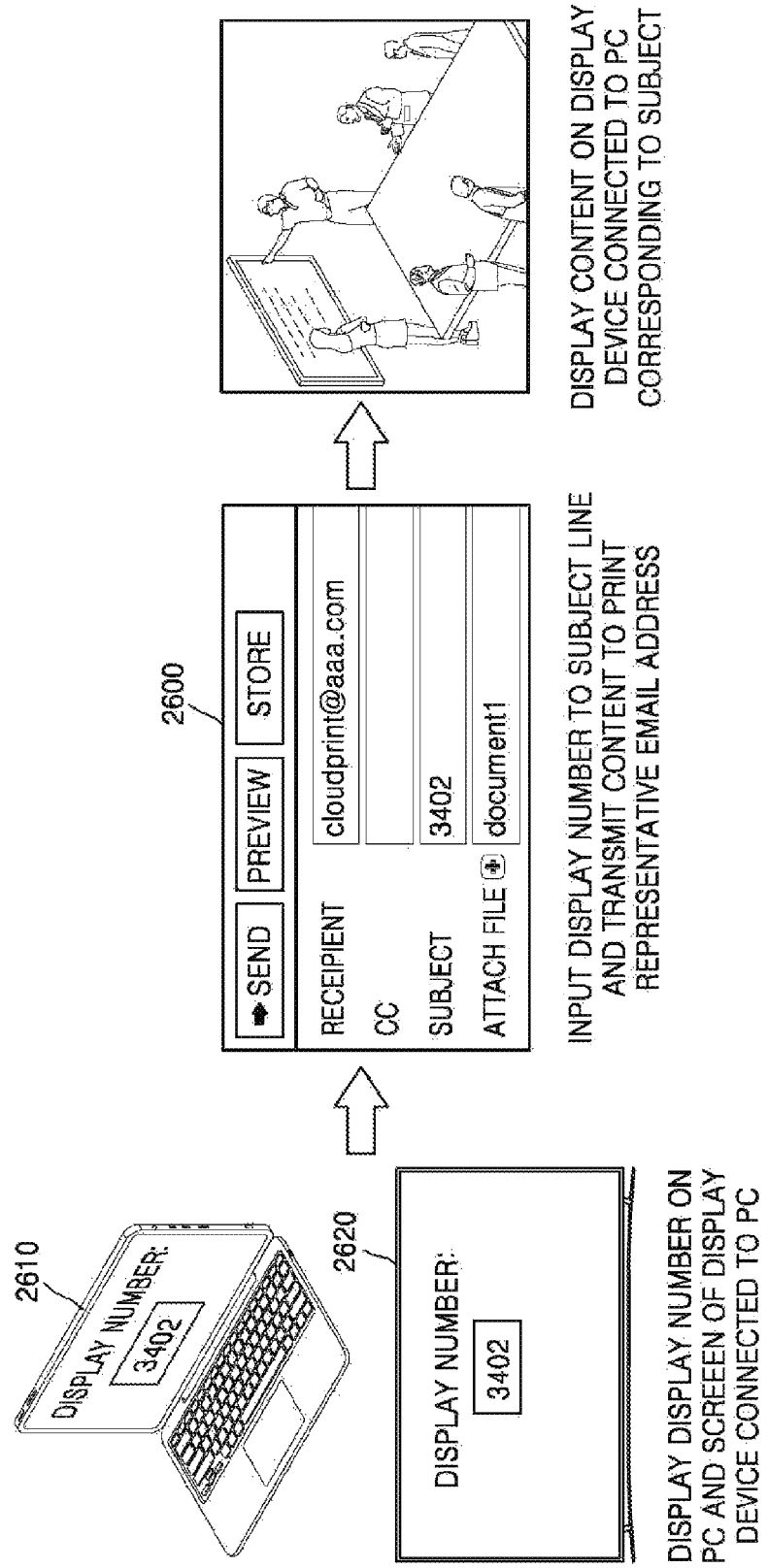
FIG. 26 is a view for explaining a method of designating an output device for an email subject and displaying content, according to an exemplary embodiment.

FIG. 26 is a view for explaining a method of designating an output device for an email subject and displaying content, according to an exemplary embodiment.

Referring to FIG. 26, a display number "3402" is displayed on a PC 2610 or a screen of a display device 2620 connected to the PC 2610. In this case, since a display application is executed in the PC 2610, the PC 2610 may function as an output device for outputting content and content may be displayed on the display device 2620 connected to the PC 2610. Also, the term "display number" refers to a management number assigned to an output device for outputting content, and in this case, refers to a management number assigned to the PC 2610.

A user executes an email application in a mobile terminal or a PC, inputs a print representative email address "cloudprint@aaa.com" to a destination address on a first screen 2600 for transmitting an email, attaches a file "document 1", and transmits an email. In this case, the display number "3402" on the PC 2610 or the display device 2620 connected to the PC 2610 is input to an email subject line.

Due to the display number "3402" input to the email subject line, an output device for outputting content, that is, the file "document 1", attached to the email is determined. Accordingly, the content attached to the email is displayed on the screen of the display device 2620 connected to the PC 2610 corresponding to the display number "3402". In this case, a process of rendering the content attached to the email into content in a displayable format may be performed by an email server or an additional rendering server connected to the email server.

Figure 27:
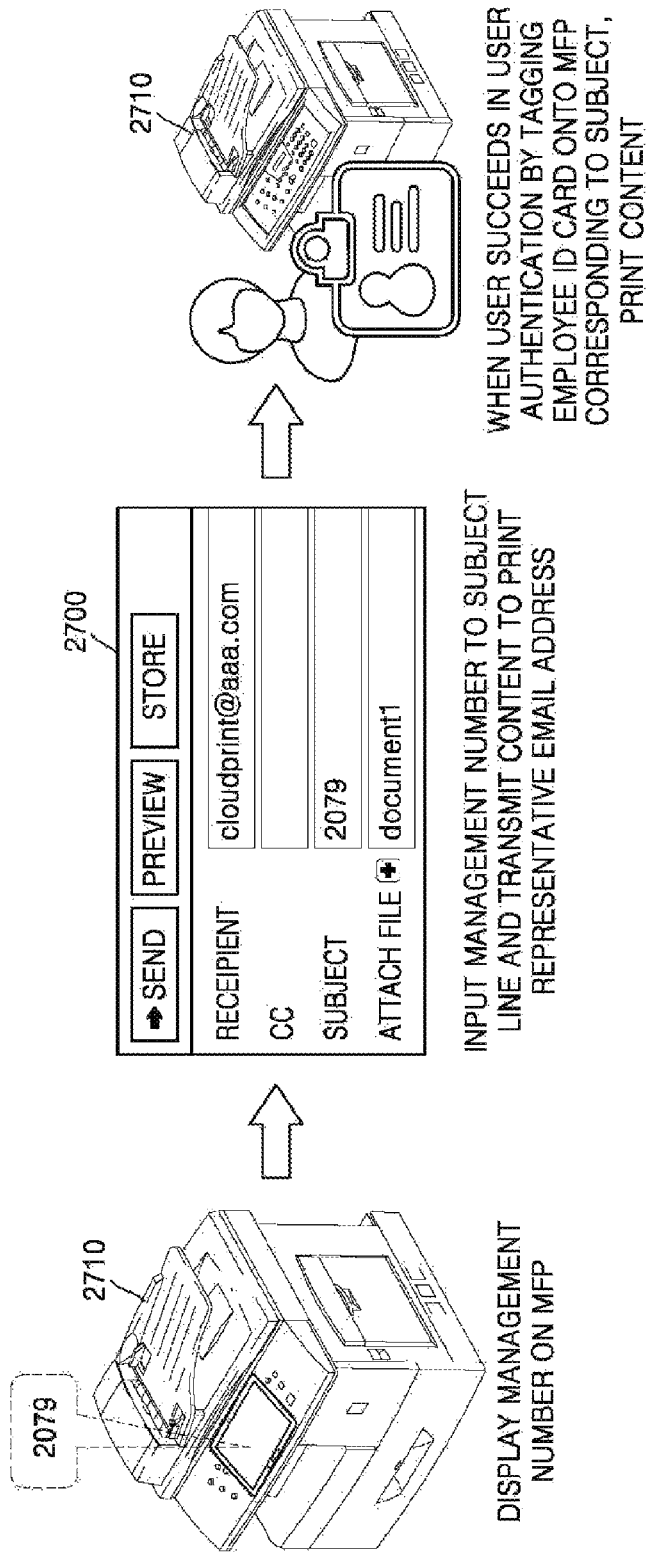
FIG. 27 is a view for explaining a method of designating an output device for an email subject and printing content, according to an exemplary embodiment.

FIG. 27 is a view for explaining a method of designating an output device for an email subject and printing content, according to an exemplary embodiment.

Referring to FIG. 27, a management number "2079" is assigned to an MFP 2710. The management number "2079" may be attached to an outer surface of the MFP 2710 in order for a user to check the management number "2079".

The user executes an email application in a mobile terminal or a PC, inputs a print representative email address "cloudprint@aaa.com" to a destination address on a first screen 2700 for transmitting an email, attaches a file "document 1", and transmits an email. In this case, the user inputs the management number "2079" of the MFP 2710 to an email subject line.

Due to the management number "2079" input to the email subject line, an output device for outputting content, that is, the file "document 1", attached to the email is determined. Accordingly, when the user accesses the MFP 2710 and succeeds in user authentication by tagging an ID card such as an employee ID card through NFC, the content, that is, the file "document 1", attached to the email is printed by the MFP 2710 corresponding to the management number "2079". In this case, a process of converting the content attached to the email into printable print data may be performed by an email server or an additional rendering server connected to the email server. Alternatively, the user authentication to the MFP 2710 may be performed by inputting a password, or may be omitted.

Figure 28:
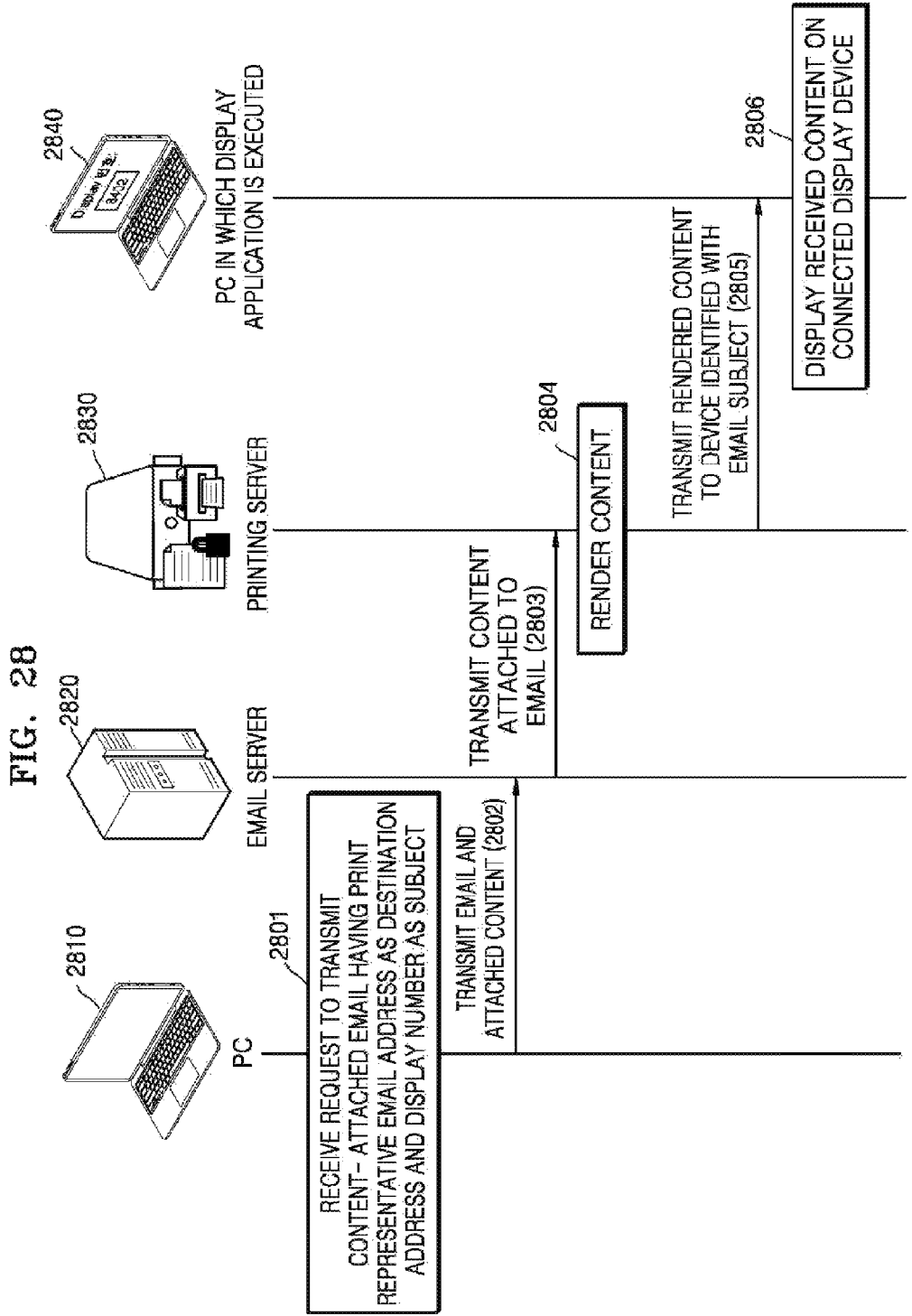
FIG. 28 is a view of a process of designating an output device for an email subject and displaying content, according to an exemplary embodiment.

FIG. 28 is a view of a process of designating an output device for an email subject and displaying content, according to an exemplary embodiment.

Referring to FIG. 28, in operation 2801, a user inputs a print representative email address to a destination address by using a PC 2810, inputs a display number "3402" on a PC 2840 in which a display application is being executed to an email subject line, and requests to transmit an email to which content is attached.

In operation 2802, the PC 2810 transmits the email and the content attached to the email to an email server 2820.

In operation 2803, the email server 2820 checks that the destination address of the email is the print representative email address, and transmits the content attached to the email to a printing server 2830. In this case, the email server 2820 may also transmit an email subject, that is, the display number "3402" displayed on the PC 2840, to the printing server 2830. Alternatively, the email server 2820 may check that an output device for outputting content is the PC 2840 from the email subject line and may transmit other information (e.g., an IP address or a MAC address) for identifying the PC 2840 to the printing server 2830.

In operation 2804, the printing server 2830 renders the received content into rendered content in a displayable format.

In operation 2805, the printing serve 2830 transmits the rendered content to the PC 2840 that is a device identified with the email subject. As described above, the printing server 2830 may receive the email subject from the email server 2820 and may determine a device corresponding to the email subject, or the email server 2820 may determine a device corresponding to the email subject and may transmit identification information of the determined device to the printing server 2830.

In operation 2806, the PC 2840 displays the received content on a display device connected to the PC 2840.

Figure 29:
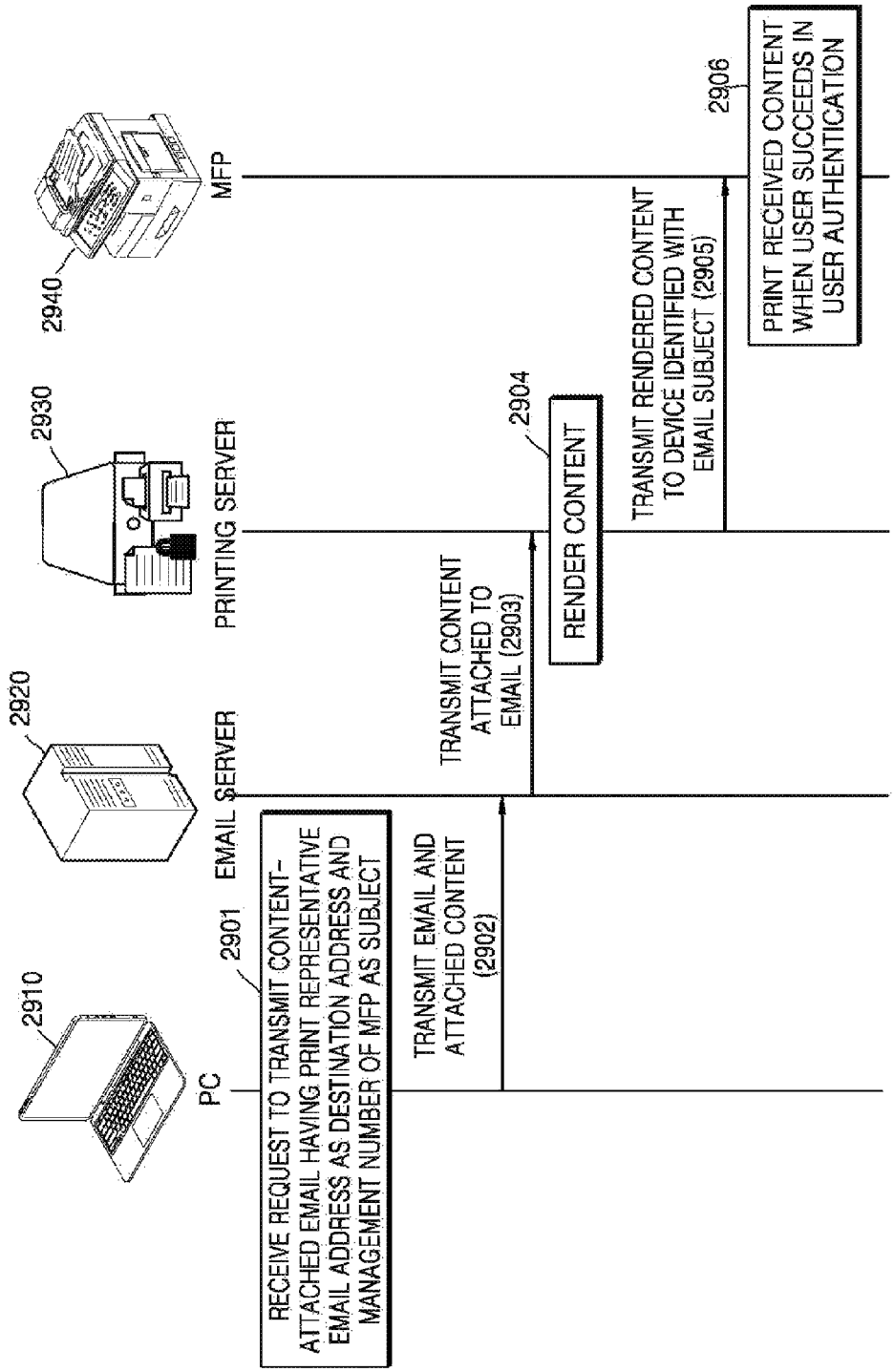
FIG. 29 is a view of a process of designating an output device for an email subject and printing content, according to an exemplary embodiment.

FIG. 29 is a view of a process of designating an output device for an email subject and printing content, according to an exemplary embodiment.

Referring to FIG. 29, in operation 2901, a user inputs a print representative email address to a destination address by using a PC 2910, inputs a management number assigned to an MFP 2940 to an email subject line, and requests to transmit an email to which content is attached.

In operation 2902, the PC 2910 transmits the email and the content attached to the email to an email server 2920.

In operation 2903, the email server 2920 checks that the destination address of the email is the print representative email address and transmits the content attached to the email to a printing server 2930. In this case, the email server 2920 may also transmit an email subject, that is, the management number of the MFP 2940, to the printing server 2930. Alternatively, the email server 2920 may check that a device for printing content is the MFP 2940 from the email subject line and may transmit other information (e.g., an IP address or a MAC address) for identifying the MFP 2940 to the printing server 2930.

In operation 2904, the printing server 2930 renders the received content and generates print data. In this case, the printing server 2930 may apply security by attaching a watermark to the print data.

In operation 2905, the printing server 2930 transmits the print data to the MFP 2940 that is a device identified with the email subject. As described above, the printing device 2930 may receive the email subject from the email server 2920 and may determine a device corresponding to the email subject, or the email server 2920 may determine a device corresponding to the email subject and may transmit identification information of the determined device to the printing server 2930.

In operation 2906, the MFP 2940 prints the received print data.

Figure 30:
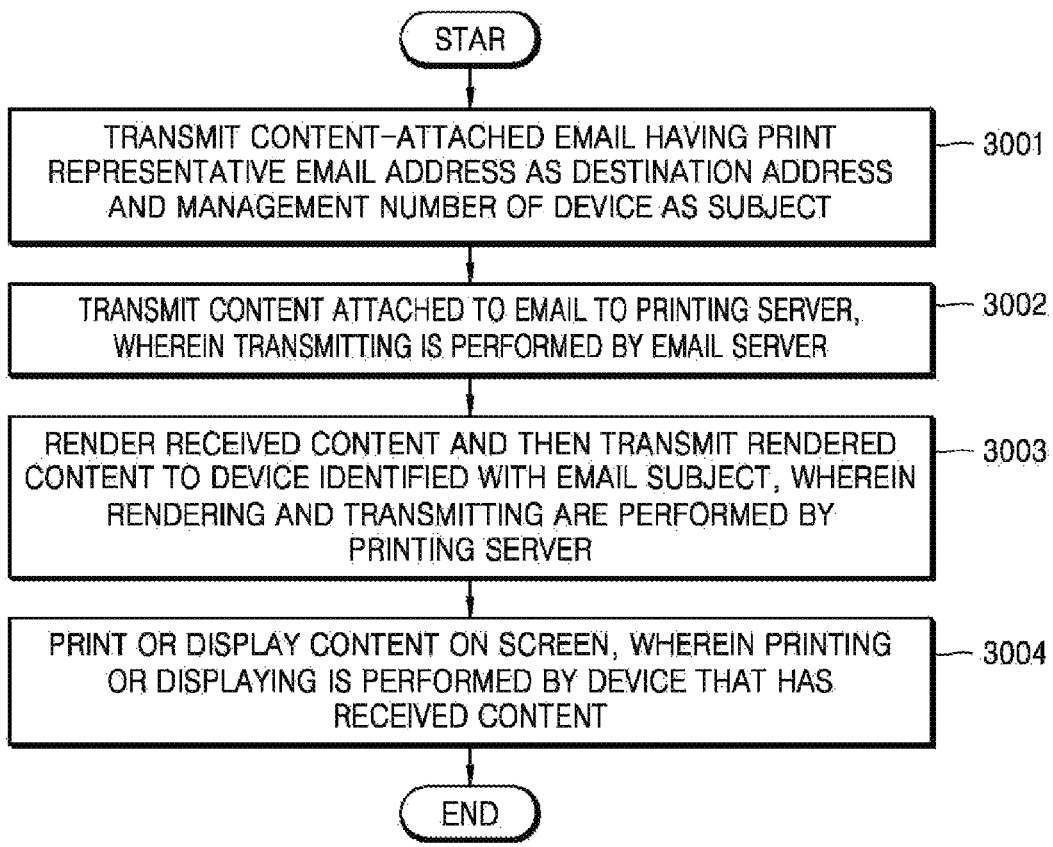
FIG. 30 is a flowchart for explaining a method of designating an output device for an email subject and printing or displaying content, according to an exemplary embodiment.

FIG. 30 is a flowchart for explaining a method of designating an output device for an email subject and printing or displaying content, according to an exemplary embodiment.

Referring to FIG. 30, in operation 3001, a user inputs a print representative email address to a destination address, inputs a management number assigned to an output device to an email subject line, attaches content to an email, and requests to transmit the email.

In operation 3002, when an email server receives the email to which the content is attached and that has the print representative email address as the destination address, the email server transmits the content attached to the email to a printing server. In this case, the email server may also transmit an email subject to the printing server, or may check an output device corresponding to the email subject and may transmit identification information (e.g., an IP address or a MAC address) of the checked output device to the printing server.

In operation 3003, the printing server renders the received content into rendered content and then transmits the rendered content to an output device corresponding to the email subject. In this case, the printing server renders the content according to a type of the output device. That is, when the output device identified with the email subject is a display device, the printing device converts the content into content in a displayable format. Alternatively, when the output device identified with the email subject is a print device such as a printer, the printing device converts the content into content in a printable format. Determining of the output device corresponding to the email subject may be performed by the printing server or the email server.

In operation 3004, the output device that has received the content outputs the content according to a type of the output device. That is, when the output device is a display device, the output device displays the received content on a screen, and when the output device is a print device, the output device prints the received content through a print medium.

Exemplary embodiments in which a method of designating an output device for an email subject and outputting content attached to an email and a method of using a release code to increase security are combined with each other will now be explained with reference to FIGS. 31 through 33. In the following exemplary embodiments, security may be increased by outputting content only when a release code transmitted through a reply email is input to an output device.

Figure 31:
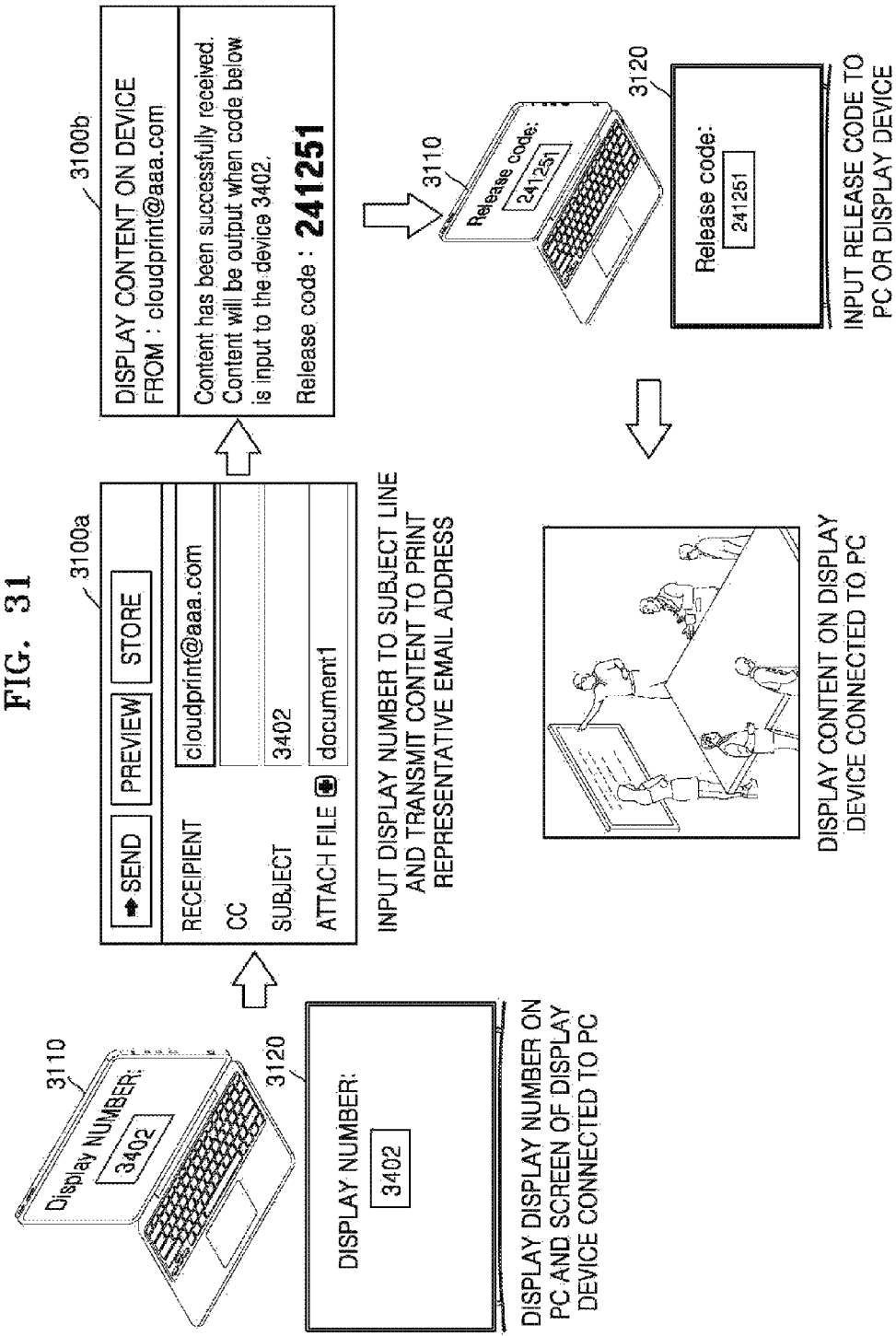
FIG. 31 is a view for explaining a method of designating an output device for an email subject and outputting content by using a release code included in a reply email, according to an exemplary embodiment.

FIG. 31 is a view for explaining a method of designating an output device for an email subject and outputting content by using a release code included in a reply email, according to an exemplary embodiment.

Referring to FIG. 31, a display number "3402" is displayed on a PC 3110 and a screen of a display device 3120 connected to the PC 3110. In this case, since a display application is being executed in the PC 3110, the PC 3110 may function as an output device for outputting content and content may be displayed on the display device 3120 connected to the PC 3110. Also, the term "display number" refers to a management number assigned to an output device for outputting content, and in this case, refers to a management number assigned to the PC 3110.

A user executes an email application in a mobile terminal or a PC, inputs a print representative email address "cloudprint@aaa.com" to a destination address on a first screen 3100a for transmitting an email, attaches a file "document 1" to an email, and transmits the email. In this case, the user inputs the display number "3402" on the PC 3110 or the display device 3120 connected to the PC 3110 to an email subject line.

When the user transmits the email, a reply email including a release code for outputting content is transmitted to the user. The reply email including a release code "241251" is displayed on a second screen 3100b. The release code "241251" and a message that requests to input a release code to an output device corresponding to the display number input to the email subject line are displayed on the second screen 3100b.

When the user inputs the release code "241251" in the reply email to the PC 3110, content, that is, the file "document 1", attached to the email is displayed on the display device 3120 connected to the PC 3110. In this case, a process of rendering the content attached to the email into content in a displayable format may be performed by an email server or an additional rendering server connected to the email server.

Figure 32:
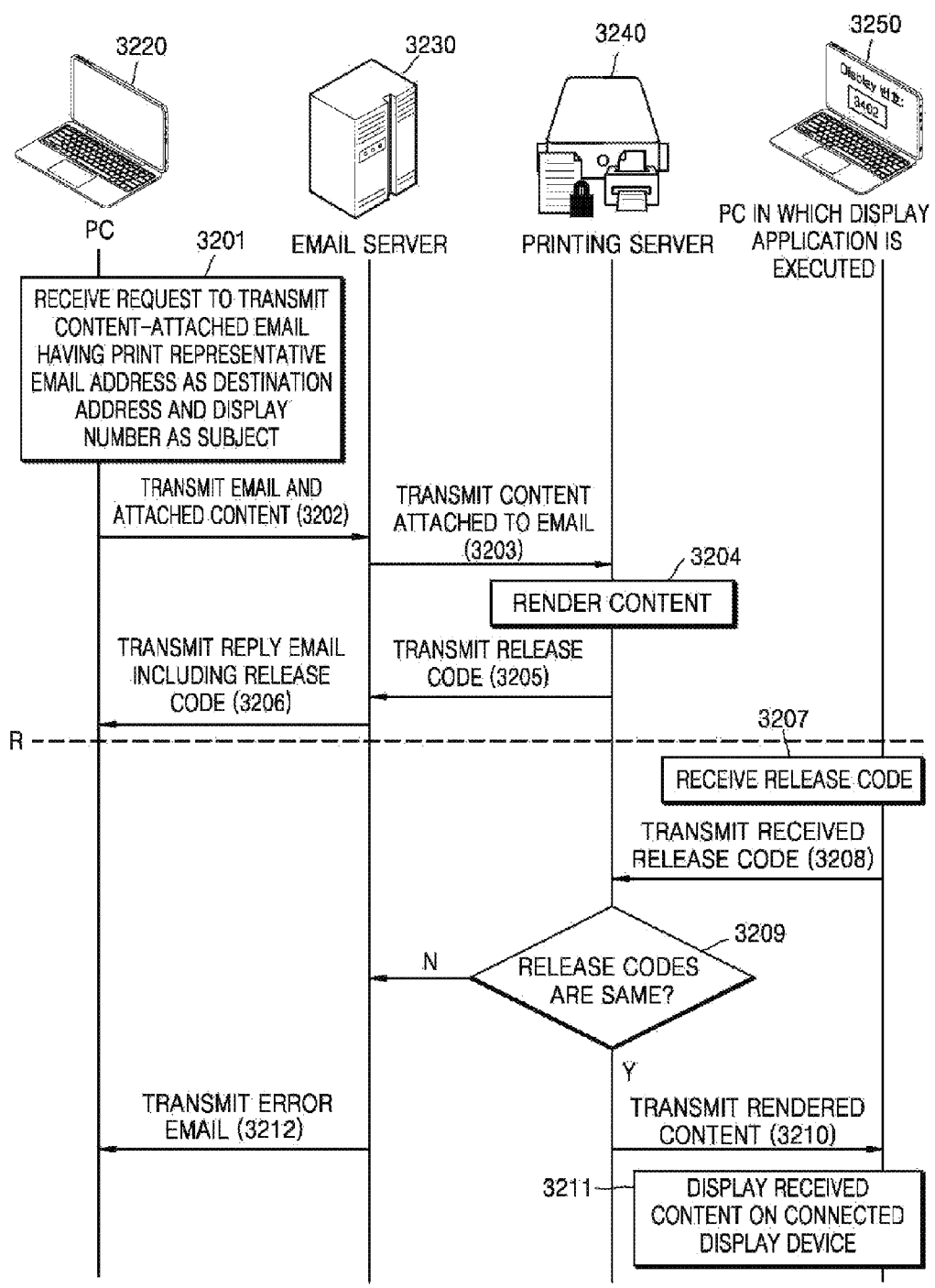
FIG. 32 is a view of a process of designating an output device for an email subject and outputting content by using a release code included in a reply email, according to an exemplary embodiment.

FIG. 32 is a view of a process of designating an output device for an email subject and outputting content by using a release code included in a reply email, according to an exemplary embodiment.

Referring to FIG. 32, in operation 3201, a user inputs a print representative email address to a destination address by using a PC 3220, inputs a display number "3402" on a PC 3250 in which a display application is being executed to an email subject line, and requests to transmit an email to which content is attached.

In operation 3202, the PC 3220 transmits the email and the content attached to the email to an email server 3230.

In operation 3203, the email server 3230 checks that the destination address of the email is the print representative email address, and transmits the content attached to the email to a printing server 3240. In this case, the email server 3230 may also transmit an email subject, that is, the display number "3402" displayed on the PC 3250, to the printing server 3240. Alternatively, the email server 3230 may check that an output device for outputting content is the PC 3250 from the email subject line, and may transmit other information (e.g., an IP address or a MAC address) for identifying the PC 3250 to the printing server 3240.

In operation 3204, the printing server 3240 renders the received content into content in a displayable format.

In operation 3205, the printing server 3240 generates a release code for outputting content and transmits the release code to the email server 3230.

In operation 3206, the email server 3230 transmits a reply email including the received release code to the user of the PC 3220. Accordingly, the user may obtain the release code in the reply email received in an email account of the user.

In operation 3207, the user who has obtained the release code inputs the release code to the PC 3250 in which the display application is being executed.

In operation 3208, the PC 3250 transmits the release code received from the user to the printing server 3240.

In operation 3209, the printing server 3240 determines whether the release code received from the PC 3250 is the same as the release code transmitted to the email server 3230 in operation 3205.

When it is determined in operation 3209 that the release codes are the same, the process proceeds to operation 3210. In operation 3210, the printing server 3240 transmits the rendered content to the PC 3250. Next, in operation 3211, the PC 3250 displays the received content on a screen of a display device connected to the PC 3250.

However, when it is determined in operation 3209 that the release codes are not the same, the printing server 3240 notifies the email server 3230 that the release codes are not the same. In operation 3212, the email server 3230 transmits an error email to the user or prevents the display of the received content on the screen of the display device connected to the PC 3250.

Figure 33:
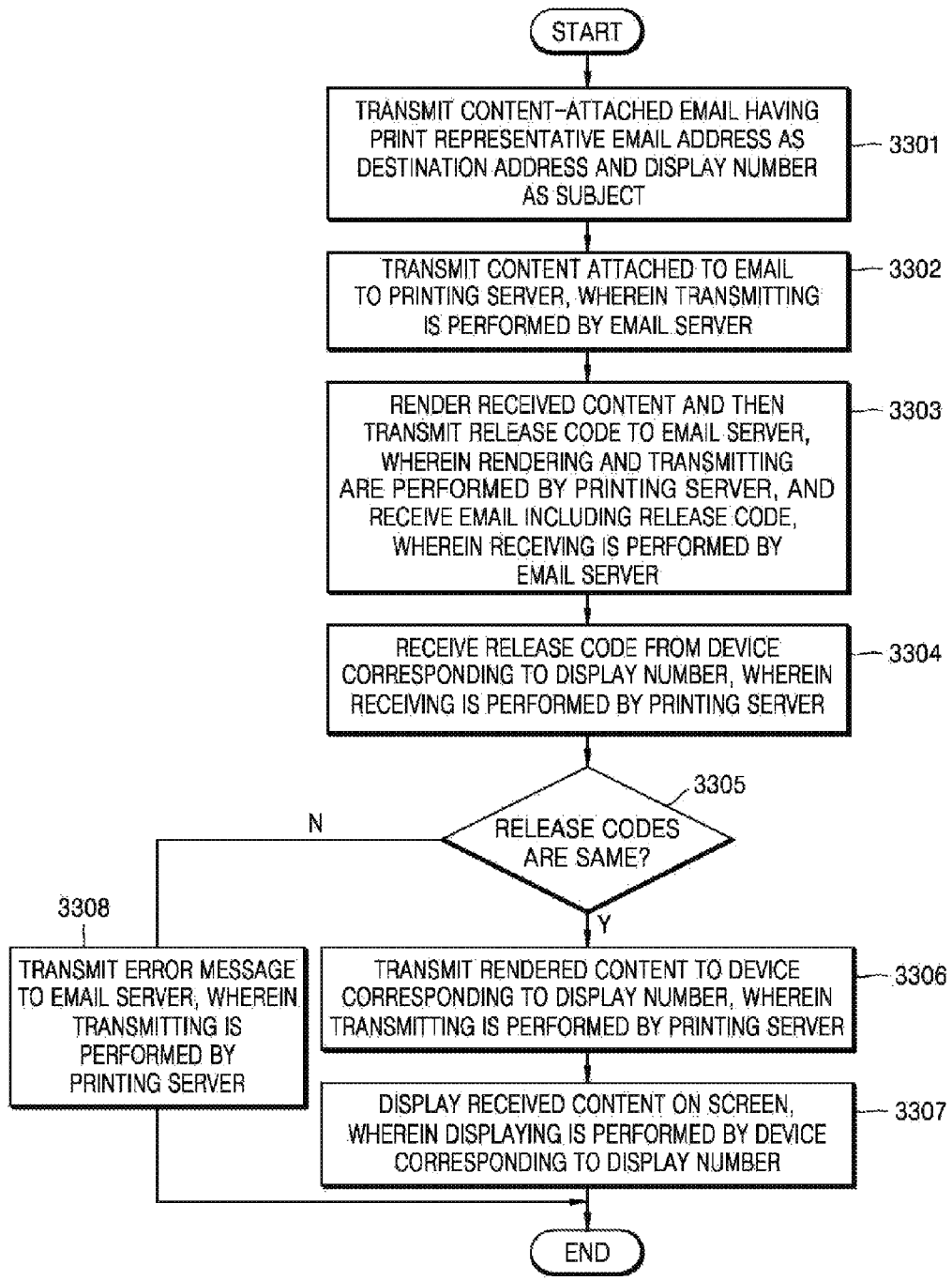
FIG. 33 is a flowchart for explaining a method of designating an output device for an email subject and outputting content by using a release code included in a reply email, according to an exemplary embodiment.

FIG. 33 is a flowchart for explaining a method of designating an output device for an email subject and outputting content by using a release code included in a reply email, according to an exemplary embodiment.

Referring to FIG. 33, in operation 3301, a user inputs a print representative email address to a destination address, inputs a management number assigned to an output device to an email subject line, attaches content to an email, and requests to transmit the email.

In operation 3302, when an email server receives the email to which the content is attached and that has the print representative email address as the destination address, the email server transmits the content attached to the email to a printing server. In this case, the email server may also transmit an email subject to the printing server, or the email server may determine an output device corresponding to the email subject and may transmit identification information (e.g., an IP address or a MAC address) of the determine output device to the printing server.

In operation 3303, the printing server renders the received content, generates a release code, and transmits the release code to the email server. The email server transmits a reply email including the received release code to the user. Accordingly, the user may access an email account of the user and may obtain the release code in the reply email.

When the user obtains the release code in the reply email and inputs the release code to the output device corresponding to the email subject, the output device transmits the release code to the printing server. Accordingly, in operation 3304, the printing server receives the release code from the output device corresponding to the email subject, that is, a display number.

In operation 3305, the printing server determines whether the release code received from the output device is the same as the release code transmitted to the email server in operation 3303.

When it is determined in operation 3305 that the release codes are the same, the method proceeds to operation 3306. In operation 3306, the printing server transmits the rendered content to the output device corresponding to the display number. Next, in operation 3307, the output device corresponding to the display number displays the received content on a screen.

However, when it is determined in operation 3305 that the release codes are not the same, the method proceeds to operation 3308. In operation 3308, the printing server transmits an error message to the email server.

Exemplary embodiments in which, without designating an output device for an email subject, an email to which content is attached is transmitted, a release code included in a reply email is input to a desired output device, and the content is output will now be explained with reference to FIGS. 34 and 35.

Figure 34:
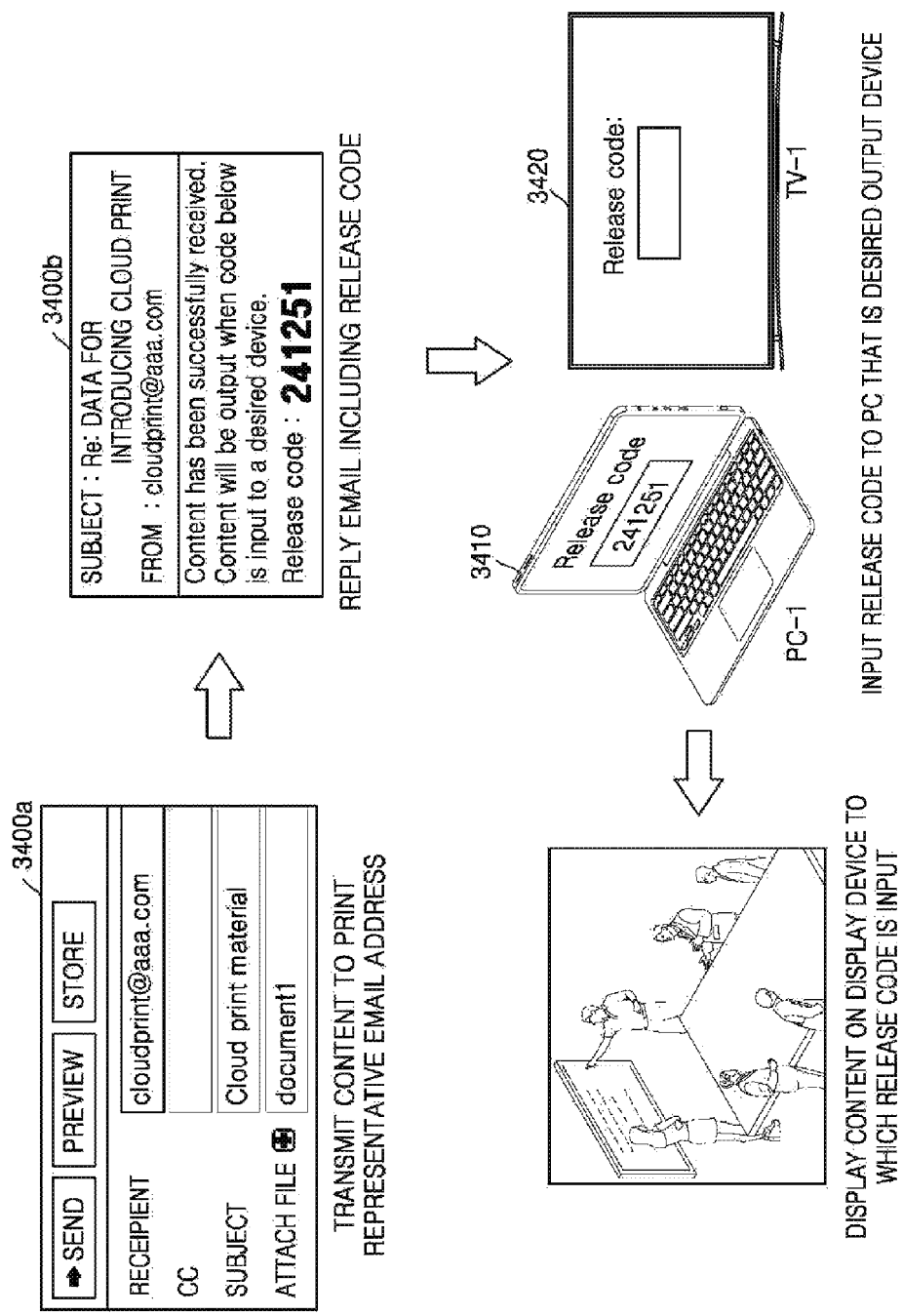
FIG. 34 is a view for explaining a method of, without designating an output device for an email subject, transmitting an email to which content is attached, inputting a release code included in a reply email to a desired output device, and outputting the content, according to an exemplary embodiment.

FIG. 34 is a view for explaining a method of, without designating an output device for an email subject, transmitting an email to which content is attached, inputting a release code included in a reply email to a desired output device, and outputting the content, according to an exemplary embodiment.

Referring to FIG. 34, a user inputs a print representative email address "cloudprint@aaa.com" to a destination address on a first screen 3400a for transmitting an email, attaches a file "document 1", and transmits an email. In this case, information for designating an output device is not input to an email subject line. Accordingly, although the user transmits the email to which the content is attached, an output device for outputting the attached content is not designated.

When the user transmits the email, the user receives a reply email including a release code "241251" for outputting content such as a second screen 3400b. A message indicating that when the release code "241251" is input to a desired output device, content is output from the desired output device may be included in the reply email.

When the user inputs the release code in the reply email to the desired output device, the desired output device outputs the content attached to the email. In FIG. 34, two output devices PC-1 3410 and TV-1 3420 exist. The user may input the release code to a device among the two output devices to output the content.

The output device that has received the release code from the user outputs the content attached to the email.

Figure 35:
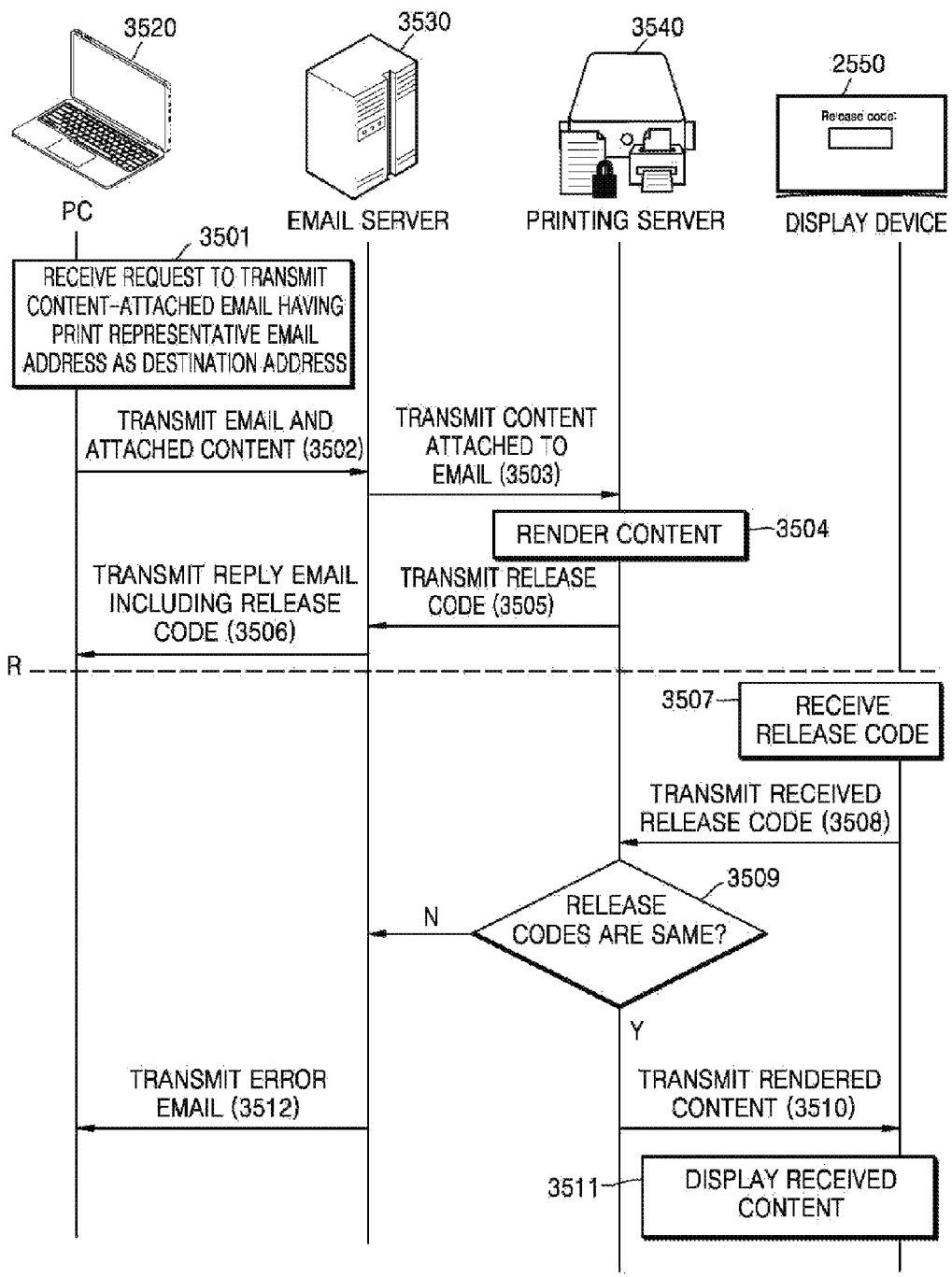
FIG. 35 is a view of a process of, without designating an output device for an email subject, transmitting an email to which content is attached, inputting a release code included in a reply email to a desired output device, and outputting the content, according to an exemplary embodiment.

FIG. 35 is a view of a process of, without designating an output device for an email subject, transmitting an email to which content is attached, inputting a release code included in a reply email to a desired output device, and outputting the content, according to an exemplary embodiment.

Referring to FIG. 35, in operation 3501, a user inputs a print representative email address to a destination address by using a PC 3520 and requests to transmit an email to which content is attached.

In operation 3502, the PC 3520 transmits the email and the content attached to the email to an email server 3530.

In operation 3503, the email server 3530 checks that the destination address of the email is the print representative email address, and transmits the content attached to the email to a printing server 3540.

In operation 3504, the printing server 3540 renders the received content into content in a displayable format.

In operation 3505, the printing server 3540 generates a release code for outputting content and transmits the release code to the email server 3530.

In operation 3506, the email server 3530 transmits a reply email including the received release code to the user of the PC 3520. Accordingly, the user may check the release code in the reply email received in an email account of the user.

In operation 3507, the user who has checked the release code inputs the release code to a desired display device 3550. In this case, the user may input the release code to another output device when the user wants the other output device to output content.

In operation 3508, the display device 3550 transmits the release code received from the user to the printing server 3540.

In operation 3509, the printing server 3540 determines whether the release code received from the display device 3550 is the same as the release code transmitted to the email server 3530 in operation 3505.

When it is determined in operation 3509 that the release codes are the same, the process proceeds to operation 3510. In operation 3510, the printing server 3540 transmits the rendered content to the display device 3550. Next, in operation 3511, the display device 3550 displays the received content on a screen.

However, when it is determined in operation 3509 that the release codes are not the same, the printing server 3540 notifies the email server 3530 that the release codes are not the same. In operation 3512, the email server 3530 transmits an error email to the user.

Exemplary embodiments in which a print option is set in an email subject line and content is printed will now be explained with reference to FIGS. 36 through 38.

Figure 36:
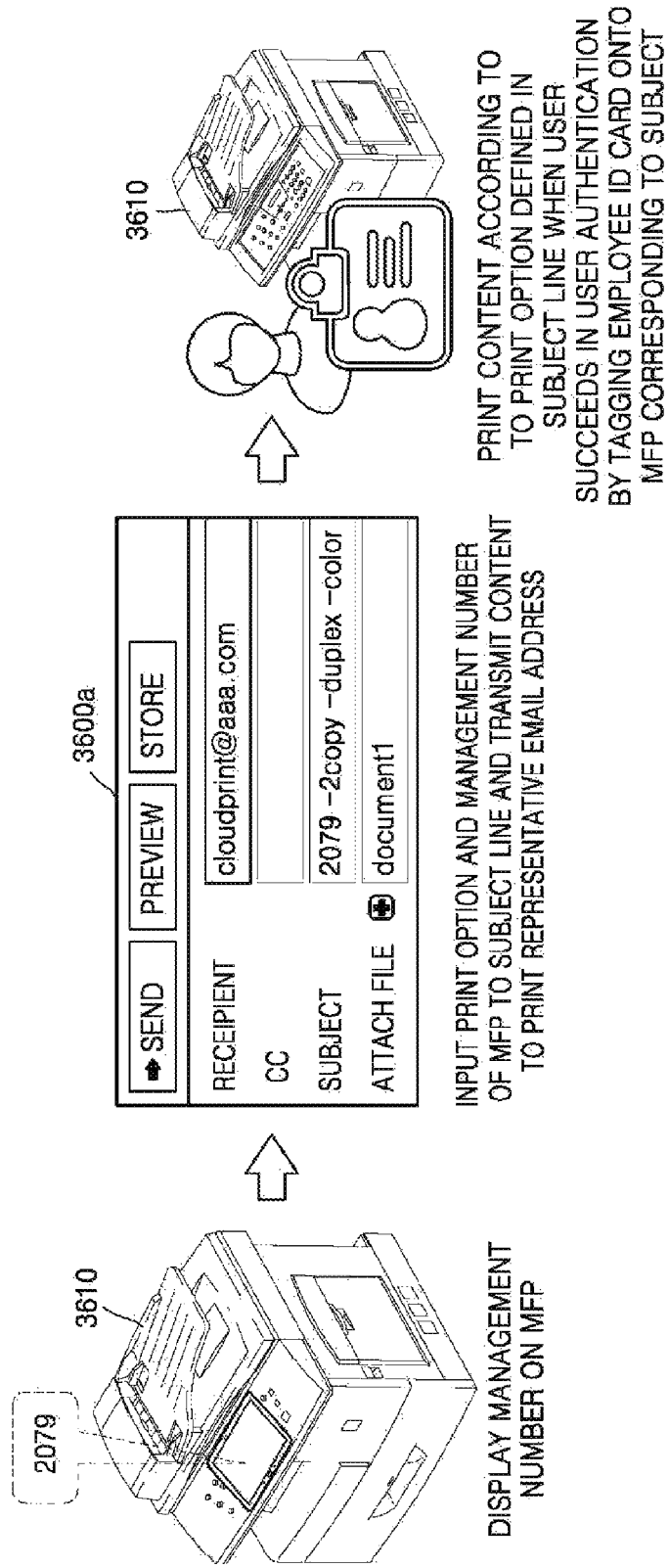
FIG. 36 is a view for explaining a method of setting a print option in an email subject line and printing content, according to an exemplary embodiment.

FIG. 36 is a view for explaining a method of setting a print option in an email subject line and printing content, according to an exemplary embodiment.

Referring to FIG. 36, a management number "2079" is displayed on an MFP 3610.

When a user attaches content to an email and transmits the email, the user may designate an output device for an email subject and may set a print option. The user inputs a print representative email address "cloudprint@aaa.com" to a destination address on a first screen 3600a, attaches a file "document 1", and transmits an email. In this case, the user inputs a setting value of a print option along with the management number "2079" of the MFP 3610 to an email subject line.

For example, in FIG. 36, "2079-2copy-duplex-color" is input to the email subject line. "2079" in the email subject line indicates that the MFP 3610 is designated as an output device for outputting content. "-2copy", which is a part for setting an option for the number of copies, indicates that it is set to print two copies per page. "-duplex", which is a part for setting an option for duplex printing, indicates that it is set to print both sides. "-color", which is a part for setting an option for color printing, indicates that it is set to print in color. Various other print options may be set in the email subject line.

When the user succeeds in user authentication by tagging an employee ID card through NFC onto the MFP 3610 corresponding to the management number "2079" included in the email subject line, the MFP 3610 prints the content attached to the email according to the print option set in the email subject line. Alternatively, the user authentication performed by tagging the employee ID card through NFC may be omitted.

Figure 37:
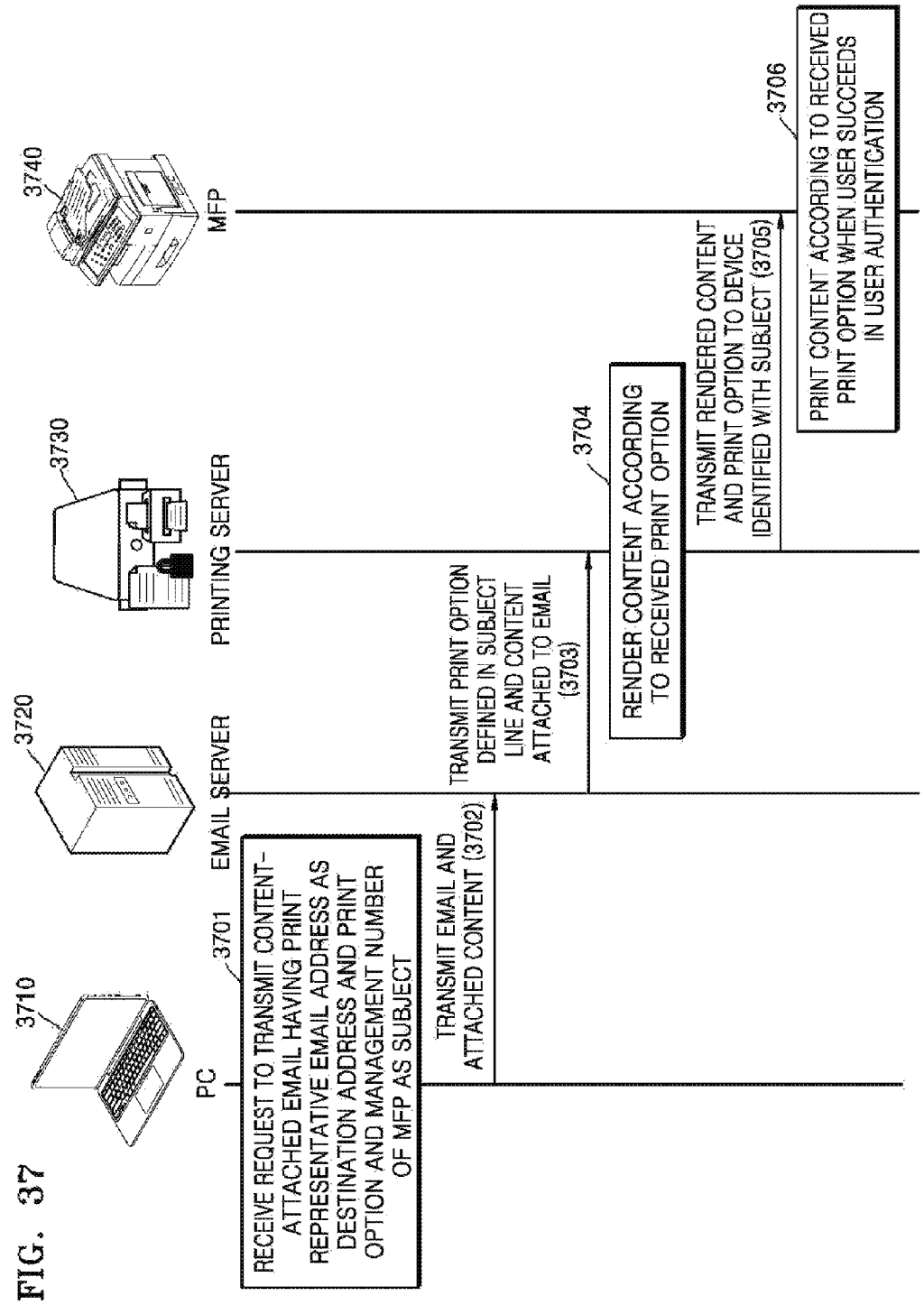
FIG. 37 is a view of a process of setting a print option in an email subject line and printing content, according to an exemplary embodiment.

FIG. 37 is a view of a process of setting a print option in an email subject line and printing content, according to an exemplary embodiment.

Referring to FIG. 37, in operation 3701, a user inputs a print representative email address to a destination address by using a PC 3710, inputs a setting value of a print option along with a management number of an MFP 3740 to an email subject line, and requests to transmit an email to which content is attached.

In operation 3702, the PC 3710 transmits the email and the content attached to the email to an email server 3720.

In operation 3703, the email server 3720 may check that the destination address of the email is the print representative email address, and may transmit the content attached to the email along with the print option defined in the email subject line to a printing server 3730. Alternatively, the email server 3720 may transmit an email subject itself along with the content attached to the email to the printing server 3730.

In operation 3704, the printing server 3730 renders the received content according to the received print option. Alternatively, the printing server 3730 may receive the email subject itself from the email server 3720, may recognize the set print option from the received email subject, and may render the received content according to the recognized print option.

In operation 3705, the printing server 3730 transmits the print option and the rendered content to the MFP 3740 that is an output device identified with the email subject.

In operation 3706, when the user succeeds in user authentication, the MFP 3740 prints the received content according to the received print option.

Figure 38:
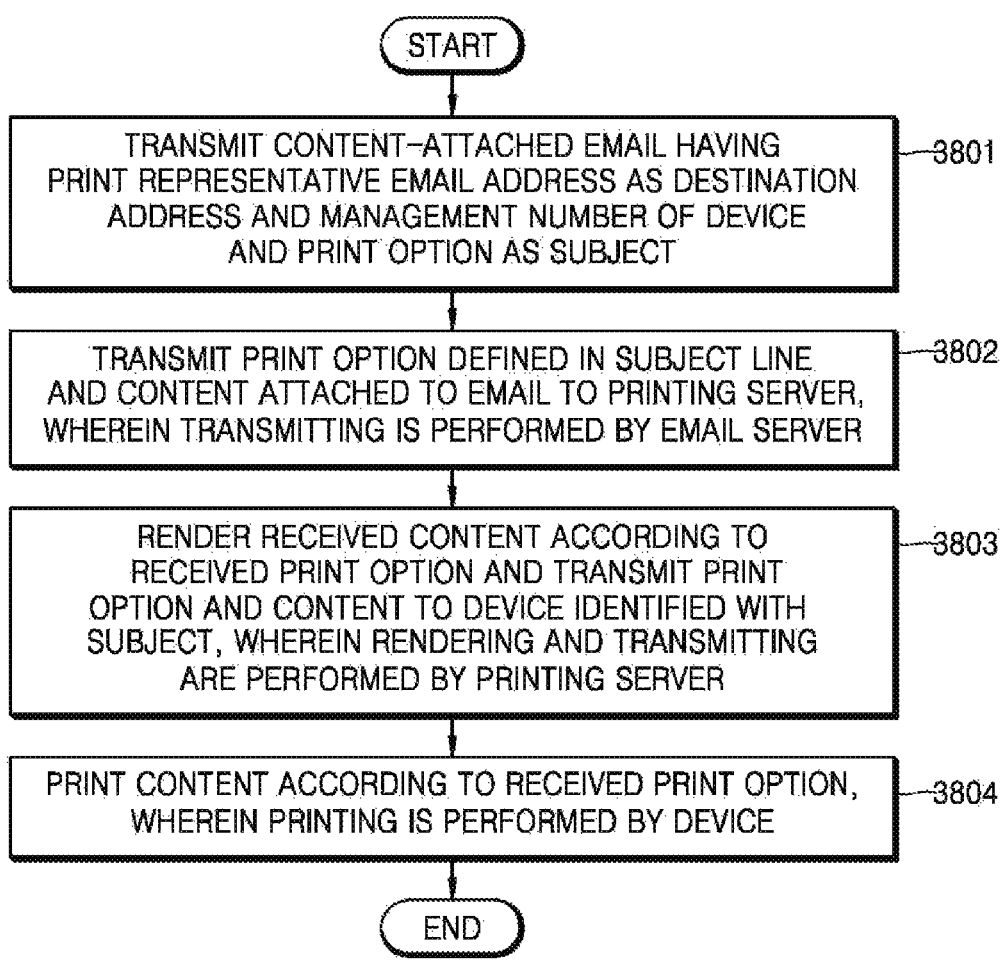
FIG. 38 is a flowchart for explaining a method of setting a print option in an email subject line and printing content, according to an exemplary embodiment.

FIG. 38 is a flowchart for explaining a method of setting a print option in an email subject line and printing content, according to an exemplary embodiment.

Referring to FIG. 38, in operation 3801, a user inputs a print representative email address to a destination address, inputs a management number of an output device and a setting value of a print option to an email subject line, attaches content, and transmits an email.

In operation 3802, an email server transmits the content attached to the email and the print option defined in the email subject line to a printing server.

In operation 3803, the printing server renders the received content according to the received print option, and then transmits the print option and the rendered content to an output device identified with an email subject.

In operation 3804, the output device that has received the print option and the rendered content prints the received content according to the received print option.

Figure 39:
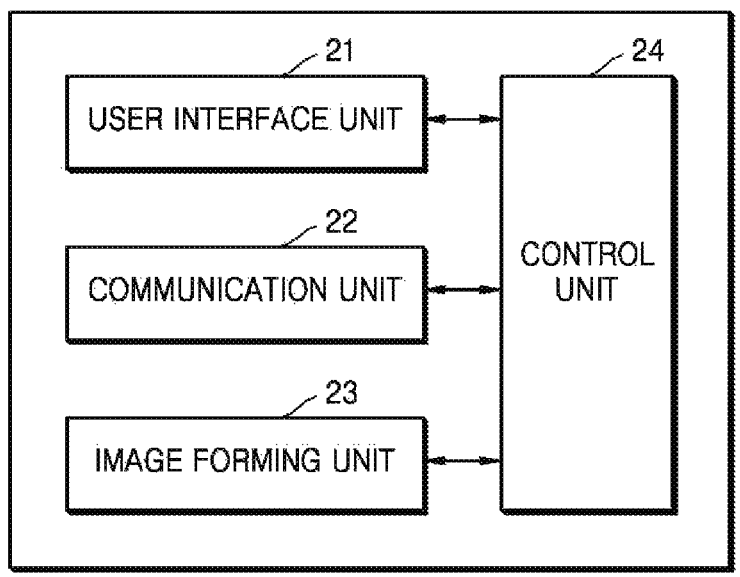
FIG. 39 is a block diagram illustrating a configuration of an image forming apparatus, according to an exemplary embodiment.

FIG. 39 is a block diagram illustrating a configuration of the MFP 20 according to an exemplary embodiment.

Referring to FIG. 39, the MFP 20 according to an exemplary embodiment may include a user interface unit 21, a communication unit 22, an image forming unit 23, and a control unit 24.

The user interface unit 21 including a display panel and a hard button may show a state or a task condition of the MFP 20 to a user and may receive a command input from the user.

The communication unit 22 for communicating with another device may support various communication methods such as Wi-Fi, NFC, and Bluetooth. The communication unit 22 may receive rendered content from a printing server in the previous exemplary embodiments.

The image forming unit 23 is an element for performing an image forming process such as printing, copying, and scanning.

The control unit 24 for controlling elements included in the MFP 20 may include a processor or a central processing unit (CPU).

Figure 40:
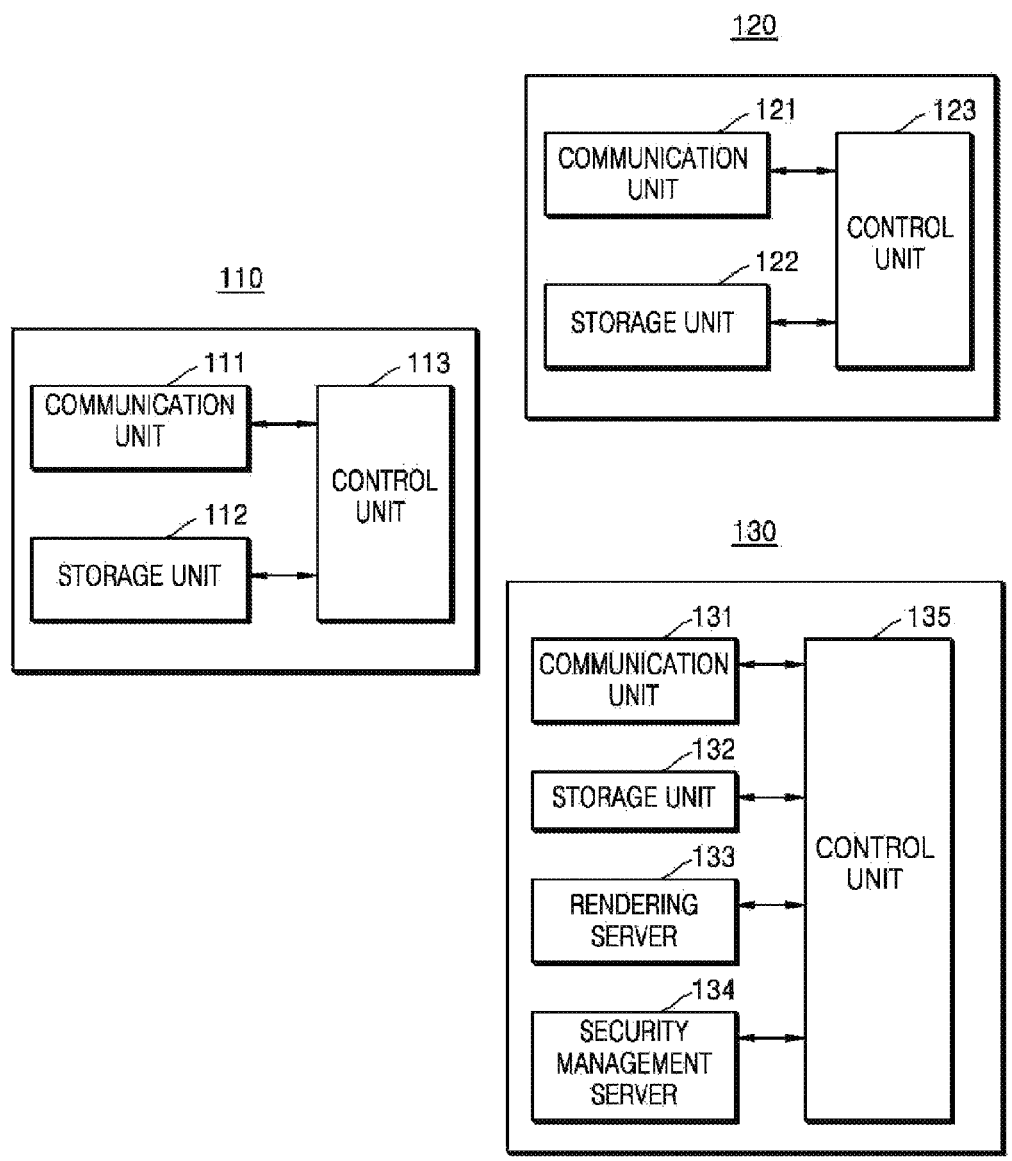
FIG. 40 is a block diagram illustrating configurations of an email server, a mobile relay server, and a printing server, according to an exemplary embodiment.

FIG. 40 is a block diagram illustrating configurations of the email server 110, the mobile relay server 120, and the printing server 130, according to an exemplary embodiment.

Referring to FIG. 40, the email server 110 may include a communication unit 111, a storage unit 112, and a control unit 113. Also, the mobile relay server 120 may include a communication unit 121, a storage unit 122, and a control unit 123. Also, the printing server 130 may include a communication unit 131, a storage unit 132, a rendering server 133, a security management server 134, and a control unit 135.

Each of the communication units 111, 121, and 131 of the email server 110, the mobile relay server 120, and the printing server 130 may communicate with another server or a mobile terminal/image forming apparatus.

Content and various data for performing tasks are stored in each of the storage units 112, 122, and 132 of the email server 110, the mobile relay server 120, and the printing server 130.

The control units 113, 123, and 135 of the email server 110, the mobile relay server 120, and the printing server 130 control operations of other elements included in the email server 110, the mobile relay server 120, and the printing server 130.

The rendering server 133 of the printing server 130 renders content received from the email server 110 to generate print data or converts the received content into content in a displayable format. Also, the security management server 134 of the printing server 130 applies security by attaching a watermark to the rendered content.

According to the one or more exemplary embodiments, in a network environment with increased security, content may be printed or displayed on a screen while the increased security may be maintained, thereby improving task convenience.

While the inventive concept has been particularly shown and described with reference to exemplary embodiments thereof, the embodiments have merely been used to explain the inventive concept and should not be construed as limiting the scope of the inventive concept as defined by the claims. The exemplary embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

The afore-described exemplary embodiments of the inventive concept may be implemented as a program that may be executed in a computer, and may be executed by a general-purpose digital computer that runs the program by using a non-transitory computer readable recording medium. Examples of the non-transitory computer-readable medium include storage media such as magnetic storage media (e.g., read only memories (ROMs), floppy discs, or hard discs), and optically readable media (e.g., compact disk-read only memories (CD-ROMs), or digital versatile disks (DVDs)).

What is claimed is:

1. A system for outputting content through a network, the system comprising:
   a first server configured to store content received in association with an account of a user; and
   a second server configured to obtain the content from the first server, convert the content into output data, and transmit the output data to an output device,
   the first server, the second server, and the output device being included in a secure network,
   in response to the second server receiving a request from a mobile terminal of the user to review the content and to output the content to the output device, the second server configured to determine whether the mobile terminal is included in the secure network, and
   in response to the second server determining the mobile device is not included in the secure network, the second server configured to convert the content into output data for transmitting the output data to the output device and to transmit a preview which is other than the content in entirety to the mobile terminal, the preview including at least one of a thumbnail, a summary file, a partial view, and an abstract of the content, to prevent transmission of the content to outside the secure network in response to the request from the mobile terminal.

2. The system of claim 1, wherein the second server comprises:
   a mobile relay server configured to transmit the preview of the content stored in the first server to the mobile terminal; and
   a printing server configured to render the content, apply security to the rendered content, and convert the secured content into the output data.

3. The system of claim 1, wherein, to transmit the output data to the output device, the second server
   receives identification information of the output device from the mobile terminal,
   determines an output device corresponding to the identification information, and
   transmits the output data to the determined output device corresponding to the received identification information.

4. The system of claim 3, wherein the output device displays the identification information of the output device on at least one of a display panel provided in the output device and a display device connected to the output device.

5. The system of claim 3, wherein the second server converts the obtained content into the output data according to a type of the output device corresponding to the received identification information, wherein
   when the received identification information is a display number, the obtained content is converted into displayable output data, and when the received identification information is a printer number, the obtained content is converted into printable output data, and the second server transmits the converted output data to the output device.

6. The system of claim 1, wherein the second server receives user information from the mobile terminal and transmits the user information to the output device, and when the user information received from the mobile terminal is authenticated, the output device outputs the output data.

7. The system of claim 6, wherein when the mobile terminal is located within a predetermined distance of the output device, the user is authenticated via near-field communication (NFC).

8. The system of claim 1, wherein when the second server receives a request to perform print spooling from the mobile terminal, the second server converts the content into content in a preset format and stores the content converted into the preset format as a print job, and when the second server receives a request to print the stored print job from the mobile terminal, the second server converts the content in the preset format into the output data and transmits the output data to the output device.

9. The system of claim 1, wherein when the second server receives, from the mobile terminal, a request to check an output result of the output data on the output device, the second server transmits to the mobile terminal a result obtained after handling the output request from a point of time when the request has been received to a preset point of time.

10. A method of outputting content through a network, the method comprising:

by a first server, receiving content in association with an account of a user; and by a second server, converting the content into output data and transmitting the output data to an output device, the first server, the second server, and the output device being included in a secure network, and by the second server:
determining whether a mobile terminal is included in the secure network, in response to the second server receiving a request to review the content from the mobile terminal and to output the content to the output device; and converting the content into output data for transmitting the output data to the output device and transmitting, to the mobile terminal, a preview of the content, which is other than the content in entirety, the preview including at least one of a thumbnail, a summary file, a partial view, and an abstract of the content, in response to the second server determining that the mobile device is not included in the secure network, to prevent transmission of the content to outside the secure network in response to the request from the mobile terminal.

11. The method of claim 10, wherein the transmitting of the output data to the output device comprises:

determining an output device corresponding to identification information received from the mobile terminal and transmitting the output data to the determined output device.

12. The method of claim 11, wherein the identification information is displayed on at least one of a display panel provided in the output device and a display device connected to the output device.

13. The method of claim 11, wherein the transmitting of the output data to the output device comprises:

converting the content into the output data according to a type of the output device corresponding to the received identification information, wherein when the received identification information is a display number, the content is converted into displayable output data, and when the received identification information is a printer number, the obtained content is converted into printable output data; and transmitting the converted output data to the output device.

14. The method of claim 10, further comprising:

by the second server, receiving user information from the mobile terminal and transmitting the user information to the output device; and when the user information received from the mobile terminal is authenticated, outputting the output data, wherein the outputting is performed by the output device.

15. The method of claim 14, wherein when the mobile terminal is located within a predetermined distance from the output device, the user is authenticated via near-field communication (NFC).

16. The method of claim 10, wherein the transmitting of the output data to the output device comprises:

when a request to perform print spooling is received from the mobile terminal, converting the content into content in a preset format and storing the content converted into the preset format as a print job; and when a request to print the stored print job is received from the mobile terminal, converting the content in the preset format into the output data and transmitting the output data to the output device.

17. The method of claim 10, further comprising, by the second server, when a request to check an output result of the output data on the output device is received from the mobile terminal, transmitting to the mobile terminal a result obtained after handling the output request from a point of time when the request has been received to a preset point of time.

18. A non-transitory computer-readable recording medium having embodied thereon a program for executing the method of claim 10 in a computer.

* * * * *

UNITED STATES PATENT AND TRADEMARK OFFICE
CERTIFICATE OF CORRECTION

PATENT NO. : 9,743,415 B2
APPLICATION NO. : 14/970664
DATED : August 22, 2017
INVENTOR(S) : Jeong-jin Park et al.

Page 1 of 1

It is certified that error appears in the above-identified patent and that said Letters Patent is hereby corrected as shown below:

On the Title Page

Item [72] (Inventors), Line 10:
Delete "Seongman-si" and insert -- Seongnam-si --, therefore.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*